United States Patent
Liu et al.

(10) Patent No.: US 12,228,101 B2
(45) Date of Patent: Feb. 18, 2025

(54) PORTABLE STANDBY STARTING DEVICE AND STANDBY STARTING TOOL FOR VEHICLE

(71) Applicant: GUANGDONG BOLTPOWER ENERGY CO., LTD., Guangdong (CN)

(72) Inventors: Ziyuan Liu, Guangdong (CN); Yuefei Liao, Guangdong (CN)

(73) Assignee: GUANGDONG BOLTPOWER ENERGY C0., LTD., Dongguan (CN)

(*) Notice: Subject to any disclaimer, the term of this patent is extended or adjusted under 35 U.S.C. 154(b) by 0 days.

(21) Appl. No.: 18/599,181

(22) Filed: Mar. 7, 2024

(65) Prior Publication Data

US 2024/0209823 A1   Jun. 27, 2024

Related U.S. Application Data

(63) Continuation-in-part of application No. 17/818,185, filed on Aug. 8, 2022, now Pat. No. 11,971,003.

(30) Foreign Application Priority Data

Aug. 11, 2021  (CN) .......................... 202110917728.0
Aug. 11, 2021  (CN) .......................... 202121875316.5
(Continued)

(51) Int. Cl.
*F02N 11/12* (2006.01)
*F02N 11/08* (2006.01)
(Continued)

(52) U.S. Cl.
CPC .......... *F02N 11/12* (2013.01); *F02N 11/0862* (2013.01); *F02N 11/087* (2013.01);
(Continued)

(58) Field of Classification Search
None
See application file for complete search history.

(56) References Cited

U.S. PATENT DOCUMENTS 8,891,210 B2 * 11/2014 Itou .......................... H02P 27/06
                                                          320/132
9,397,513 B2 *  7/2016 Butler ...................... H02J 7/342
(Continued)

FOREIGN PATENT DOCUMENTS

AU   2015258229 A1 * 1/2016 .............. B60L 53/14
AU   2016269555 A1 * 1/2017 .............. B60L 53/14
(Continued)

*Primary Examiner* — Kevin R Steckbauer
(74) *Attorney, Agent, or Firm* — Westbridge IP LLC

(57) ABSTRACT

The present disclosure provides a portable standby starting device for a vehicle. The portable standby starting device includes a battery circuit, a load access detecting circuit, and a vehicle starting circuit, wherein the battery circuit is coupled to the load access detecting circuit and the vehicle starting circuit, and is configured to supply power to the load access detecting circuit and the vehicle starting circuit; the load access detecting circuit is coupled to the vehicle starting circuit, and is configured to detect whether the vehicle starting circuit is connected to a vehicle load; the vehicle starting circuit is configured to, when the load access detecting circuit detects the connection of the vehicle load, output a vehicle starting current for controlling an ignition operation performed for the vehicle.

18 Claims, 40 Drawing Sheets

(30) Foreign Application Priority Data

Sep. 27, 2021 (CN) .......................... 202111138746.5
Sep. 27, 2021 (CN) .......................... 202122358818.9
May 17, 2022 (CN) .......................... 202210538354.6
May 17, 2022 (CN) .......................... 202221195012.0

(51) Int. Cl.
  *H01R 11/24* (2006.01)
  *H02J 1/10* (2006.01)
  *H02J 7/00* (2006.01)

(52) U.S. Cl.
  CPC .............. *H01R 11/24* (2013.01); *H02J 1/122* (2020.01); *H02J 7/00034* (2020.01); *H02J 7/00304* (2020.01); *H02J 7/00308* (2020.01); *H02J 7/0034* (2013.01); *H02J 7/0063* (2013.01); *F02N 2200/063* (2013.01); *F02N 2300/106* (2013.01); *F02N 2300/2011* (2013.01); *H02J 7/0036* (2013.01); *H02J 2310/46* (2020.01); *H02J 2310/70* (2020.01)

(56) References Cited

U.S. PATENT DOCUMENTS

| | | | | |
|---|---|---|---|---|
| 9,954,391 | B2* | 4/2018 | Lei | H02J 1/122 |
| 10,087,904 | B2* | 10/2018 | Butler | B60L 53/20 |
| 10,801,460 | B2* | 10/2020 | Butler | H01M 10/425 |
| 10,981,452 | B2* | 4/2021 | Nook | H01M 10/441 |
| 11,031,797 | B2* | 6/2021 | Nook | H02J 7/0068 |
| 11,043,822 | B2* | 6/2021 | Lau | H01M 10/052 |
| 11,053,906 | B2* | 7/2021 | Koenen | H01M 50/249 |
| 11,205,907 | B2* | 12/2021 | Nook | H01M 10/46 |
| 11,205,920 | B2* | 12/2021 | Lei | B60R 16/033 |
| 11,245,274 | B2* | 2/2022 | Nook | F02N 11/0866 |
| 11,245,280 | B2* | 2/2022 | Wekwert | F02N 11/12 |
| 11,254,213 | B2* | 2/2022 | Nook | B60L 3/0046 |
| 11,374,429 | B2* | 6/2022 | Wood | H02J 7/345 |
| 11,448,176 | B2* | 9/2022 | Butler | H02J 7/342 |
| 11,462,928 | B2* | 10/2022 | Nook | H02J 7/007 |
| 11,482,860 | B1* | 10/2022 | Zhu | H02J 7/342 |
| 11,502,509 | B2* | 11/2022 | Zhu | H01M 10/425 |
| 11,527,897 | B1* | 12/2022 | Brumley, Jr. | H02J 7/342 |
| 11,611,222 | B2* | 3/2023 | Nook | H01H 19/025 |
| 11,652,359 | B2* | 5/2023 | Lei | H02J 1/122 |
| | | | | 307/10.6 |
| 11,752,894 | B2* | 9/2023 | Wekwert | H02J 7/342 |
| | | | | 320/105 |
| 11,971,003 | B2* | 4/2024 | Liu | H02J 1/122 |
| 12,003,100 | B2* | 6/2024 | Zhu | H02J 7/0034 |
| 2006/0244456 | A1* | 11/2006 | Henningson | G01R 31/007 |
| | | | | 324/378 |
| 2012/0098470 | A1* | 4/2012 | Itou | H02P 29/0241 |
| | | | | 307/9.1 |
| 2015/0273607 | A1* | 10/2015 | Denis | F02N 11/0807 |
| | | | | 219/133 |
| 2015/0340907 | A1* | 11/2015 | Lei | H02J 9/04 |
| | | | | 307/66 |
| 2016/0049819 | A1* | 2/2016 | Butler | H02J 7/02 |
| | | | | 320/105 |
| 2016/0297311 | A1* | 10/2016 | Butler | H01M 10/425 |
| 2017/0226980 | A1* | 8/2017 | Butler | H02J 7/0068 |
| 2020/0028368 | A1* | 1/2020 | Nook | H02J 1/122 |
| 2020/0072177 | A1* | 3/2020 | Clarke | H02J 7/0068 |
| 2020/0259340 | A1* | 8/2020 | Nook | H01M 10/0525 |
| 2020/0295575 | A1* | 9/2020 | Nook | H02J 7/0048 |
| 2020/0295592 | A1* | 9/2020 | Lei | H02J 7/0031 |
| 2020/0386200 | A1* | 12/2020 | Butler | H02J 7/0068 |
| 2021/0075235 | A1* | 3/2021 | Nook | F02N 11/14 |
| 2021/0135466 | A1* | 5/2021 | Rumbaugh | H02J 1/122 |
| 2021/0155096 | A1* | 5/2021 | Nook | H01M 10/425 |
| 2022/0045505 | A1* | 2/2022 | Zhu | H02H 1/0007 |
| 2022/0069574 | A1* | 3/2022 | Liao | H02J 7/0029 |
| 2022/0077714 | A1* | 3/2022 | Lei | H02J 7/0031 |
| 2022/0111756 | A1* | 4/2022 | Ye | H02J 7/0063 |
| 2023/0009406 | A1* | 1/2023 | Butler | B60L 53/20 |
| 2023/0053161 | A1* | 2/2023 | Liu | F02N 11/0862 |
| 2023/0187932 | A1* | 6/2023 | Cai | H03K 17/78 |
| | | | | 320/105 |
| 2023/0198255 | A1* | 6/2023 | Zhu | H02J 7/00711 |
| | | | | 320/105 |
| 2023/0208149 | A1* | 6/2023 | Liu | H02J 7/007194 |
| | | | | 320/109 |
| 2023/0256840 | A1* | 8/2023 | Nook | H02J 1/122 |
| | | | | 320/105 |
| 2023/0302928 | A1* | 9/2023 | Nook | B60L 53/14 |
| 2024/0017634 | A1* | 1/2024 | Wu | H02J 7/04 |
| 2024/0017688 | A1* | 1/2024 | Wu | H02M 3/1582 |
| 2024/0209823 | A1* | 6/2024 | Liu | H02J 7/00308 |

FOREIGN PATENT DOCUMENTS

| | | | | |
|---|---|---|---|---|
| AU | 2015301449 A1 | * | 3/2017 | ............. B60L 53/20 |
| AU | 2015301449 B2 | * | 7/2018 | ............. B60L 53/20 |
| AU | 2016269555 B2 | * | 12/2018 | ............. B60L 53/14 |
| AU | 2018241093 B2 | * | 12/2019 | ............. B60L 53/20 |
| AU | 2019201559 B9 | * | 12/2019 | ............. B60L 53/14 |
| AU | 2018243593 A2 | * | 3/2020 | ............. B60L 3/0046 |
| AU | 2020201222 A1 | * | 3/2020 | ............. B60L 53/14 |
| AU | 2020201224 A1 | * | 3/2020 | ............. B60L 53/14 |
| AU | 2018338196 A1 | * | 4/2020 | ............. F02N 11/0866 |
| AU | 2020201223 C1 | * | 1/2021 | ............. B60L 53/14 |
| AU | 2018243593 B2 | * | 9/2021 | ............. B60L 3/0046 |
| AU | 2018338196 B2 | * | 10/2021 | ............. F02N 11/0866 |
| AU | 2021232723 A1 | * | 10/2021 | ............. B60R 16/033 |
| AU | 2018336821 B2 | * | 11/2021 | ............. B60R 16/033 |
| AU | 2020201222 B2 | * | 11/2021 | ............. B60L 53/14 |
| AU | 2020201589 B2 | * | 11/2021 | ............. B60L 53/20 |
| AU | 2018403192 B2 | * | 2/2022 | ............. B60S 5/04 |
| AU | 2022200449 A1 | * | 2/2022 | ............. F02N 11/0866 |
| AU | 2022200459 A1 | * | 2/2022 | ............. B60R 16/033 |
| AU | 2022200612 A1 | * | 2/2022 | ............. B60L 53/14 |
| AU | 2022200746 A1 | * | 2/2022 | ............. B60L 53/14 |
| AU | 2021258059 B2 | * | 3/2022 | ............. B60L 53/14 |
| AU | 2022200744 A1 | * | 3/2022 | ............. B60L 53/20 |
| AU | 2022201338 A1 | * | 3/2022 | ............. B60L 53/14 |
| AU | 2022202497 A1 | * | 5/2022 | ............. B60S 5/04 |
| AU | 2022204065 A1 | * | 6/2022 | ............. B60L 53/14 |
| CA | 3065290 A1 | * | 10/2018 | ............. B60L 3/0046 |
| CA | 3076344 A1 | * | 3/2019 | ............. B60R 16/033 |
| CA | 3076499 A1 | * | 3/2019 | ............. F02N 11/0866 |
| CA | 3072515 C | * | 1/2022 | ............. B60R 16/033 |
| CA | 3071703 C | * | 4/2022 | ............. B60R 16/033 |
| CA | 3212190 A1 | * | 9/2022 | ............. F02N 11/087 |
| CA | 3213633 A1 | * | 9/2022 | ............. B60L 53/30 |
| CA | 3076344 C | * | 3/2023 | ............. B60R 16/033 |
| CN | 109995103 A | * | 7/2019 | ............. B60R 16/033 |
| CN | 111386644 A | * | 7/2020 | ............. F02N 11/0866 |
| CN | 111868373 A | * | 10/2020 | ............. B60S 5/04 |
| CN | 216709232 U | * | 6/2022 | |
| CN | 114962112 A | * | 8/2022 | |
| CN | 115395596 A | * | 11/2022 | ............. B60S 5/04 |
| CN | 115596590 A | * | 1/2023 | ............. F02N 11/08 |
| DE | 202014011413 U1 | * | 6/2020 | ............. B60L 53/14 |
| DE | 202014011416 U1 | * | 6/2020 | ............. B60L 53/14 |
| DE | 102014114997 B4 | * | 10/2020 | ............. B60L 53/14 |
| EP | 3180848 B1 | * | 2/2021 | ............. B60L 53/20 |
| EP | 3951161 A1 | * | 2/2022 | ............. B60S 5/00 |
| EP | 4135142 A2 | * | 2/2023 | ............. F02N 11/08 |
| GB | 2527858 A | * | 1/2016 | ............. B60L 53/14 |
| GB | 2605117 A | * | 9/2022 | ............. B60R 16/033 |
| JP | 3022346 B2 | * | 3/2000 | |
| JP | 4168550 B2 | * | 10/2008 | ............. F02N 11/0825 |
| JP | 7003234 B2 | * | 1/2022 | ............. F02N 11/0866 |
| JP | 7018507 B2 | * | 2/2022 | ............. B60S 5/04 |
| JP | 2022058458 A | * | 4/2022 | ............. F02N 11/0866 |
| JP | 2022078019 A | * | 5/2022 | ............. B60S 5/04 |
| JP | 2023026356 A | * | 2/2023 | ............. F02N 11/08 |
| RU | 2726148 C2 | * | 7/2020 | ............. B60L 50/10 |
| TW | 202135417 A | * | 9/2021 | ............. F02N 11/12 |
| WO | WO-2016003471 A1 | * | 1/2016 | ............. B60L 53/14 |
| WO | WO-2016025869 A1 | * | 2/2016 | ............. B60L 53/20 |

(56) References Cited

FOREIGN PATENT DOCUMENTS

| WO | WO-2018183864 A1 | * | 10/2018 | ............ B60L 3/0046 |
| WO | WO-2019060472 A1 | * | 3/2019 | ........... B60R 16/033 |
| WO | WO-2019060699 A1 | * | 3/2019 | .......... F02N 11/0866 |
| WO | WO-2019143427 A1 | * | 7/2019 | ................ B60S 5/04 |
| WO | WO-2019190588 A1 | * | 10/2019 | ............ B60L 3/0046 |
| WO | WO-2021091895 A1 | * | 5/2021 | .............. F02N 11/12 |
| WO | WO-2022187450 A1 | * | 9/2022 | ............ F02N 11/087 |

* cited by examiner

Starting control module

Reverse-charge detecting module

Temperature detecting module

Alarm module

Microprocessor module

Reverse-charge detecting module

Over-current detecting module

Battery voltage detecting module

Battery voltage detecting module

Temperature detecting module

Alarm module

Reverse-charge detecting module

Display module

PORTABLE STANDBY STARTING DEVICE AND STANDBY STARTING TOOL FOR VEHICLE

CROSS-REFERENCE TO RELATED APPLICATION

This application is a continuation-in-part application of U.S. patent application Ser. No. 17/818,185, filed on Aug. 8, 2022, which is incorporated by reference in its entirety.

TECHNICAL FIELD

The present disclosure relates to the field of electrical devices, and in particular, to a portable standby starting device and a standby starting tool for a vehicle.

BACKGROUND ART

With the rapid development of society, there are more and more private cars appearing on roads. However, most cars need to be started by ignition, which makes it necessary to perform the ignition operation only under the condition that the battery of the automobile is charged. However, it has been found in practice that there are always some unexpected situations that make it impossible to carry out the ignition operation for the cars, for example, when the battery is out of power. Thus, in this case, people usually have to wait for roadside assistance, resulting in waste of time and money.

SUMMARY

An embodiment of the present disclosure provides a portable standby starting device for a vehicle, wherein the portable standby starting device includes a battery circuit, a load access detecting circuit, and a vehicle starting circuit, wherein the battery circuit is coupled to the load access detecting circuit and the vehicle starting circuit, and is configured to supply power to the load access detecting circuit and the vehicle starting circuit;

the load access detecting circuit is coupled to the vehicle starting circuit, and is configured to generate a control signal according to a detected vehicle load connection state; and the vehicle starting circuit is configured to, when detecting the control signal, control whether the vehicle starting circuit outputs a vehicle starting current or not according to the control signal; and the vehicle starting current is used for performing an ignition operation for the vehicle.

An embodiment of the present disclosure further provides a portable standby starting device for a vehicle, wherein the portable standby starting device includes a battery circuit, a load access detecting circuit, and a vehicle starting circuit, wherein the battery circuit is coupled to the load access detecting circuit and the vehicle starting circuit, and is configured to supply power to the load access detecting circuit and the vehicle starting circuit; and the load access detecting circuit is coupled to the vehicle starting circuit, and is configured to detect whether the vehicle starting circuit is connected to the vehicle load, and control the vehicle starting circuit to be prohibited from outputting the vehicle starting current for controlling the ignition operation performed for the vehicle when the load access detecting circuit detects that the vehicle load is not connected.

An embodiment of the present disclosure further provides a standby starting tool for a vehicle, wherein the standby starting tool includes a clamp (clip) and the portable standby starting device according to any one of the preceding, wherein the clamp is connected to the portable standby starting device, and is configured to connect the portable standby starting device and a vehicle load of the vehicle.

BRIEF DESCRIPTION OF DRAWINGS

In order to illustrate technical solutions of embodiments of the present disclosure more clearly, accompanying drawings which need to be used in the embodiments of the present disclosure will be introduced briefly below, and it should be understood that the accompanying drawings below merely show some embodiments of the present disclosure, and therefore should not be considered as limitation to the scope. Those ordinarily skilled in the art still could obtain other relevant accompanying drawings according to these accompanying drawings, without using any creative effort.

Figure 1:
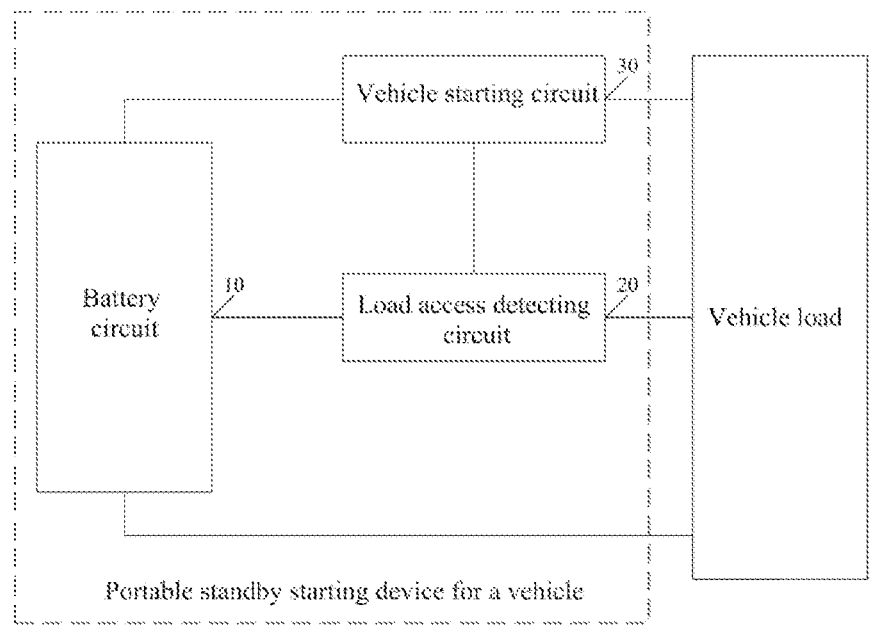
FIG. 1 is a structural schematic view of a portable standby starting device for a vehicle provided in an embodiment of the present disclosure.

Reference signs: 100—portable standby starting device; 10—battery circuit; 11—battery; 12—voltage regulating circuit; 13—battery voltage detecting circuit; 20—load access detecting circuit; 30—vehicle starting circuit; 40—reverse-connection short-circuit detecting circuit; 50—load voltage detecting circuit; 60—reverse-charge detecting circuit; 70—over-current detecting circuit; 80—temperature detecting circuit; 91—alarm circuit; 92—display circuit; 93—microprocessor; 200—clamp.

DETAILED DESCRIPTION OF EMBODIMENTS

The technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure, as described and shown in the accompanying drawings herein, may be arranged and designed in various different configurations. Therefore, the detailed descriptions below of the embodiments of the present disclosure provided in the accompanying drawings are not intended to limit the scope of the present disclosure claimed, but merely illustrate chosen embodiments of the present disclosure. Based on the embodiments of the present disclosure, all of other embodiments obtained by those skilled in the art without any creative effort shall fall within the scope of protection of the present disclosure.

In the present disclosure, orientation or positional relationships indicated by terms such as "upper", "lower", "left", "right", "front", "rear", "top", "bottom", "inner", "outer", "middle", "vertical", "horizontal", "transverse", and "longitudinal" are based on orientation or positional relationships as shown in the accompanying drawings. These terms are used mainly for better describing the present disclosure and embodiments thereof, rather than being intended to limit that the device, element, or component referred to must be in a specific orientation, or be constructed and operated in a specific orientation.

Moreover, in addition to the orientation or positional relationships, a part of the above terms may be used to indicate other meanings, for example, the term "upper" also may be used to indicate a certain attachment relationship or connection relationship in some cases. For those ordinarily skilled in the art, specific meanings of these terms in the present disclosure could be understood according to specific cases.

Besides, the terms "install", "set", "provided with", "connect", and "join" should be understood in a broad sense. For example, it may be a fixed connection, a detachable connection, or an integral connection; it may be a mechanical connection, and also may be an electrical connection; it may be a direct connection, indirect connection through an intermediary, or inner communication between two devices, elements or components. For those ordinarily skilled in the art, specific meanings of the above-mentioned terms in the present disclosure could be understood according to specific circumstances.

Besides, terms such as "first" and "second" are mainly used to distinguish different devices, elements or components (specific types and structures may be the same or different), rather than indicating or implying the relative importance or quantity of the device, element or component referred to. "Multiple (a plurality of)" means two or more, unless otherwise indicated.

Objective of the present disclosure lie in providing a portable standby starting device and a standby starting tool for a vehicle. The problem of how to conveniently perform ignition for the automobiles can be solved, and meanwhile the ignition safety is improved, and the time and money wasted for calling for roadside assistance are saved.

An embodiment of the present disclosure provides a portable standby starting device for a vehicle, wherein the portable standby starting device includes a battery circuit, a load access detecting circuit, and a vehicle starting circuit, wherein the battery circuit is coupled to the load access detecting circuit and the vehicle starting circuit, and is configured to supply power to the load access detecting circuit and the vehicle starting circuit;

the load access detecting circuit is coupled to the vehicle starting circuit, and is configured to generate a control signal according to a detected vehicle load connection state; and the vehicle starting circuit is configured to, when detecting the control signal, control whether the vehicle starting circuit outputs a vehicle starting current or not according to the control signal; and the vehicle starting current is used for performing an ignition operation for the vehicle.

In the above implementation process, the portable standby starting device for a vehicle includes the battery circuit, the load access detecting circuit, and the vehicle starting circuit. In the above, the battery circuit includes a battery or a battery pack, and battery-related accessories, and the load access detecting circuit, when receiving the power supply of the battery circuit, detects whether the load is connected, and when the load is connected, the ignition operation is performed for the vehicle through the vehicle starting circuit. It can thus be seen that by implementing such embodiment, the detection and ignition for the vehicle load can be completed without any microprocessor; moreover, the complete portable standby starting device further can be constituted by the combination of the three parts above, so as to achieve the effect of convenient ignition for the automobiles.

In one or more embodiments, the load access detecting circuit is specifically configured to, when a detected vehicle load connection state is a connected state, generate a starting control signal; or when the vehicle load connection state is an unconnected state, generate a starting prohibition signal;

the vehicle starting circuit is specifically configured to, when detecting the starting control signal, control the vehicle starting circuit to output the vehicle starting current; and the vehicle starting circuit is further configured to, when detecting the starting prohibition signal, control the vehicle starting circuit to be prohibited from outputting the vehicle starting current.

In one or more embodiments, the load access detecting circuit includes a voltage type load detecting sub-circuit and/or a resistance type load detecting sub-circuit.

In one or more embodiments, the portable standby starting device further includes a reverse-connection short-circuit detecting circuit, wherein the reverse-connection short-circuit detecting circuit is coupled to the load access detecting circuit and is configured to detect whether the vehicle load is in a reverse-connection state or a short-circuit state, and generate a starting prohibition signal when the vehicle load is in the reverse-connection state or the short-circuit state; and the vehicle starting circuit is further configured to, when detecting the starting prohibition signal, control the vehicle starting circuit to be prohibited from outputting the vehicle starting current.

In the above implementation process, the portable standby starting device further may include a reverse-connection short-circuit detecting circuit, and when the portable standby starting device is provided therein with the reverse-connection short-circuit detecting circuit, the portable standby starting device can automatically control the ignition operation according to the connection state of the vehicle load, so as to ensure the safety ignition of the vehicle and improve the safety of the vehicle starting.

In one or more embodiments, the portable standby starting device further includes a load voltage detecting circuit, wherein the load voltage detecting circuit is coupled to the load access detecting circuit, and is configured to detect whether the vehicle load is in a high-voltage state or a low-voltage state, and generate the starting prohibition signal when the vehicle load is in the high-voltage state or the low-voltage state; and the vehicle starting circuit is further configured to, when detecting the starting prohibition signal, control the vehicle starting circuit to be prohibited from outputting the vehicle starting current.

In the above implementation process, the load voltage detecting circuit included in the portable standby starting device can react to the load voltage, so as to feed back to the vehicle starting circuit through the circuit result, thus the vehicle starting circuit stops the power supply or is prohibited from supplying power, consequently, the safety protection is carried out based on the load voltage.

In one or more embodiments, the portable standby starting device further includes a reverse-charge detecting circuit, wherein the reverse-charge detecting circuit is coupled to the load access detecting circuit, and is configured to detect whether the voltage of the vehicle load is higher than an output voltage of the battery circuit or not, and generate the starting prohibition signal when the voltage of the vehicle load is higher than the output voltage of the battery circuit; and the vehicle starting circuit is further configured to, when detecting the starting prohibition signal, control the vehicle starting circuit to be prohibited from outputting the vehicle starting current.

In the above implementation process, the reverse-charge detecting circuit included in the portable standby starting device can compare the battery voltage and the load voltage, and when the load voltage is higher than the battery voltage, feed back to the vehicle starting circuit in the portable standby starting device through the circuit structure, so that the vehicle starting circuit is prohibited from outputting the vehicle starting circuit.

In one or more embodiments, the portable standby starting device further includes an over-current detecting circuit, wherein the over-current detecting circuit is coupled to the vehicle starting circuit, and is configured to detect whether the vehicle starting current output by the vehicle starting circuit is greater than a preset current threshold value, and generate the starting prohibition signal when the vehicle starting current output by the vehicle starting circuit is greater than the preset current threshold value; and the vehicle starting circuit is further configured to, when detecting the starting prohibition signal, control the vehicle starting circuit to be prohibited from outputting the vehicle starting current.

In the above implementation process, the over-current detecting circuit in the portable standby starting device can make automatic adjustment according to the output vehicle starting current, so that the portable standby starting device cannot output a vehicle starting current greater than the preset current threshold value, thus ensuring that the output vehicle starting current is a safe current.

In one or more embodiments, the portable standby starting device further includes a time delay circuit, wherein the time delay circuit is coupled to the vehicle starting circuit, and is configured to control the vehicle starting circuit to be started in a delayed way or to be disconnected in a delayed way.

In one or more embodiments, the time delay circuit includes a first time delay circuit and/or a second time delay circuit, and the first time delay circuit and/or the second time delay circuit are coupled to the vehicle starting circuit, wherein the first time delay circuit is configured to control the vehicle starting circuit to be disconnected in a delayed way;

the second time delay circuit is configured to control the vehicle starting circuit to be started in a delayed way; and In one or more embodiments, the portable standby starting device further includes a temperature detecting circuit, wherein the temperature detecting circuit is coupled to the vehicle starting circuit, and is configured to detect whether the portable standby starting device is in a preset high-temperature state, and generate the starting prohibition signal when the portable standby starting device is in the high-temperature state; and the vehicle starting circuit is further configured to, when detecting the starting prohibition signal, control the vehicle starting circuit to be prohibited from outputting the vehicle starting current.

In the above implementation process, the temperature detecting circuit included in the portable standby starting device can carry out real-time detection on the temperature of the portable standby starting device, so that when the temperature of the portable standby starting device is too high, the power supply to the vehicle starting circuit is timely stopped, thus ensuring the use safety of the portable standby starting device.

In one or more embodiments, the portable standby starting device further includes an alarm circuit, wherein the alarm circuit is coupled to the vehicle starting circuit, and is configured to control a buzzer to send out an alarm when the vehicle starting circuit detects the starting prohibition signal.

In the above implementation process, the alarm circuit included in the portable standby starting device can control the buzzer to give an alarm when any of the above circuits detects a problem, so that it is easier for the user to know that the portable standby starting device cannot operate normally.

In one or more embodiments, the portable standby starting device further includes a display circuit, wherein the display circuit is coupled to the vehicle starting circuit, and is configured to display an indicator light corresponding to an operation state of the portable standby starting device.

In the above implementation process, the display circuit can display the operation state of the portable standby starting device in a visual manner, so that the user can conveniently know the same.

In one or more embodiments, the portable standby starting device further includes a forced starting circuit, wherein the forced starting circuit is coupled to the load access detecting circuit and is configured generate a forced starting signal according to a forced starting operation of a user; and the vehicle starting circuit is further configured to, when detecting the forced starting signal, control the vehicle starting circuit to immediately output the vehicle starting current.

In one or more embodiments, the battery circuit includes a battery, a voltage regulating circuit, and a battery voltage detecting circuit, wherein the battery is coupled to the voltage regulating circuit and the battery voltage detecting circuit, and is configured to supply power to other circuits;

the voltage regulating circuit is configured to regulate an output voltage of the battery; and the battery voltage detecting circuit is configured to detect whether the battery is in a high-voltage state or a low-voltage state, and control the vehicle starting circuit to be prohibited from outputting the vehicle starting current when the battery is in the high-voltage state or the low-voltage state.

In the above implementation process, the battery circuit usually includes a battery or a battery pack, a DC-DC circuit, and a battery voltage detecting circuit. In the above, the battery circuit supplies power through the battery, adjusts an output voltage value through the DC-DC circuit, and outputs an appropriate voltage under the monitoring of the battery voltage detecting circuit, so that the vehicle starting circuit can ensure the output of an appropriate vehicle starting current.

In one or more embodiments, the portable standby starting device further includes a voltage bias switch circuit.

In one or more embodiments, the battery voltage detecting circuit includes a battery under-voltage detecting sub-circuit and/or a battery over-voltage detecting sub-circuit connected to each other.

In one or more embodiments, the portable standby starting device further includes a microprocessor, wherein the microprocessor is coupled to the vehicle starting circuit and is configured to generate a drive signal; and the vehicle starting circuit is specifically configured to, when detecting the drive signal and the control signal, control the vehicle starting circuit to output the vehicle starting current or not according to the drive signal and the control signal; and the vehicle starting current is used to perform an ignition operation for the vehicle.

In one or more embodiments, the load access detecting circuit is specifically configured to, when a detected vehicle load connection state is a connected state, generate a starting control signal; or when the vehicle load connection state is an unconnected state, generate a starting prohibition signal;

the microprocessor is specifically configured to generate a starting drive signal when the detected vehicle load connection state is the connected state; or generate a drive prohibition signal when the vehicle load connection state is an unconnected state;

the vehicle starting circuit is specifically configured to, when detecting the starting drive signal and the starting control signal, control the vehicle starting circuit to output the vehicle starting current; and the vehicle starting circuit is further configured to, when detecting the starting prohibition signal or the drive prohibition signal, control the vehicle starting circuit to be prohibited from outputting the vehicle starting current.

In one or more embodiments, the portable standby starting device further includes a reverse-connection short-circuit detecting circuit, wherein the reverse-connection short-circuit detecting circuit is coupled to the load access detecting circuit and is configured to detect whether a vehicle load is in a reverse-connection state or a short-circuit state, and generate a starting prohibition signal when the vehicle load is in the reverse-connection state or the short-circuit state;

the microprocessor is further configured to generate the drive prohibition signal when detecting the starting prohibition signal; and the vehicle starting circuit is further configured to, when detecting the starting prohibition signal or the drive prohibition signal, control the vehicle starting circuit to be prohibited from outputting the vehicle starting current.

In one or more embodiments, the portable standby starting device further includes a load voltage detecting circuit, wherein the load voltage detecting circuit is coupled to the load access detecting circuit, and is configured to detect whether the vehicle load is in a high-voltage state or a low-voltage state, and generate the starting prohibition signal when the vehicle load is in the high-voltage state or the low-voltage state;

the microprocessor is further configured to generate the drive prohibition signal when detecting the starting prohibition signal; and the vehicle starting circuit is further configured to, when detecting the starting prohibition signal or the drive prohibition signal, control the vehicle starting circuit to be prohibited from outputting the vehicle starting current.

In one or more embodiments, the portable standby starting device further includes a reverse-charge detecting circuit, wherein the reverse-charge detecting circuit is coupled to the load access detecting circuit, and is configured to detect whether the voltage of the vehicle load is higher than an output voltage of the battery circuit or not, and generate the starting prohibition signal when the voltage of the vehicle load is higher than the output voltage of the battery circuit;

the microprocessor is further configured to generate the drive prohibition signal when detecting the starting prohibition signal; and the vehicle starting circuit is further configured to, when detecting the starting prohibition signal or the drive prohibition signal, control the vehicle starting circuit to be prohibited from outputting the vehicle starting current.

In one or more embodiments, the portable standby starting device further includes an over-current detecting circuit, wherein the over-current detecting circuit is coupled to the vehicle starting circuit, and is configured to detect whether the vehicle starting current output by the vehicle starting circuit is greater than a preset current threshold value, and generate the starting prohibition signal when the vehicle starting current output by the vehicle starting circuit is greater than the preset current threshold value;

the microprocessor is further configured to generate the drive prohibition signal when detecting the starting prohibition signal; and the vehicle starting circuit is further configured to, when detecting the starting prohibition signal or the drive prohibition signal, control the vehicle starting circuit to be prohibited from outputting the vehicle starting current.

In one or more embodiments, the portable standby starting device further includes a voltage-stabilized power supply, wherein the voltage-stabilized power supply is coupled to the microprocessor, and is configured to supply power to the microprocessor.

An embodiment of the present disclosure further provides a standby starting tool for a vehicle, and the standby starting tool includes a clamp and the portable standby starting device mentioned in the preceding, wherein the clamp is connected to the portable standby starting device, and is configured to connect the portable standby starting device and a vehicle load of the vehicle.

In the above implementation process, when the clamp in the standby starting tool is connected to the vehicle load, the portable standby starting device can detect whether the load is connected.

If the load is connected to the circuit through the clamp, the portable standby starting device can perform the ignition operation for the vehicle. Thus, it is time-saving and labor-saving to implement such embodiment.

In one or more embodiments, all of the circuits in the portable standby starting device are provided in a housing.

In one or more embodiments, a clamp connection port is provided on the housing, and the clamp is connected to the portable standby starting device through the clamp connection port.

In one or more embodiments, in the portable standby starting device, the battery circuit is provided in a first housing, and the other circuits are provided in a second housing.

In one or more embodiments, the second housing is provided thereon with the clamp connection port, and the clamp is connected to the portable standby starting device through the clamp connection port.

An embodiment of the present disclosure further provides a portable standby starting device for a vehicle, wherein the portable standby starting device includes a battery circuit, a load access detecting circuit, and a vehicle starting circuit, wherein the battery circuit is coupled to the load access detecting circuit and the vehicle starting circuit, and is configured to supply power to the load access detecting circuit and the vehicle starting circuit; and the load access detecting circuit is coupled to the vehicle starting circuit, and is configured to detect whether the vehicle starting circuit is connected to the vehicle load; and the load access detecting circuit, when detecting that the vehicle load is connected, controls the vehicle starting circuit to output a vehicle starting current for controlling the ignition operation performed for the vehicle, and the load access detecting circuit, when detecting that the vehicle load is not connected, controls the vehicle starting circuit to be prohibited from outputting the vehicle starting current for controlling the ignition operation performed for the vehicle.

In the above implementation process, the portable standby starting device for a vehicle includes the battery circuit, the load access detecting circuit, and the vehicle starting circuit. In the above, the battery circuit includes a battery or a battery pack, and battery-related accessories, and the load access detecting circuit, when receiving the power supply of the battery circuit, detects whether the load is connected, and when the load is connected, the ignition operation is performed for the vehicle through the vehicle starting circuit. It can thus be seen that by implementing such embodiment, the detection and ignition for the vehicle load can be completed without any microprocessor; moreover, the complete portable standby starting device further can be constituted by the combination of the three parts above, so as to achieve the effect of convenient ignition for the automobile.

In one or more embodiments, the portable standby starting device further includes a reverse-connection short-circuit detecting circuit, wherein the reverse-connection short-circuit detecting circuit is coupled to the load access detecting circuit and is configured to detect whether the vehicle load is in a reverse-connection state or a short-circuit state, and control the vehicle starting circuit to be prohibited from outputting the vehicle starting current when the vehicle load is in the reverse-connection state or the short-circuit state.

In the above implementation process, the portable standby starting device further may include the reverse-connection short-circuit detecting circuit, and when the portable standby starting device is provided therein with the reverse-connection short-circuit detecting circuit, the portable standby starting device can automatically control the ignition operation according to the connection state of the vehicle load, so as to ensure the safety ignition of the vehicle and improve the safety of the vehicle starting.

In one or more embodiments, the portable standby starting device further includes a load voltage detecting circuit, wherein the load voltage detecting circuit is coupled to the load access detecting circuit, and is configured to detect whether the vehicle load is in a high-voltage state or a low-voltage state, and control the vehicle starting circuit to be prohibited from outputting the vehicle starting current when the vehicle load is in the high-voltage state or the low-voltage state.

In the above implementation process, the load voltage detecting circuit included in the portable standby starting device can react to the load voltage, so as to feed back to the vehicle starting circuit through the circuit result, thus the vehicle starting circuit stops the power supply or is prohibited from supplying power, consequently, the safety protection is carried out based on the load voltage.

In one or more embodiments, the portable standby starting device further includes a reverse-charge detecting circuit, wherein the reverse-charge detecting circuit is coupled to the load access detecting circuit, and is configured to detect whether the voltage of the vehicle load is higher than an output voltage of the battery circuit or not, and control the vehicle starting circuit to be prohibited from outputting the vehicle starting current when the voltage of the vehicle load is higher than the output voltage of the battery circuit.

In the above implementation process, the reverse-charge detecting circuit included in the portable standby starting device can compare the battery voltage and the load voltage, and when the load voltage is higher than the battery voltage, feed back to the vehicle starting circuit in the portable standby starting device through the circuit structure, so that the vehicle starting circuit is prohibited from outputting the vehicle starting circuit.

In one or more embodiments, the portable standby starting device further includes an over-current detecting circuit, wherein the over-current detecting circuit is coupled to the vehicle starting circuit, and is configured to detect whether the vehicle starting current output by the vehicle starting circuit is greater than a preset current threshold value, and control the vehicle starting circuit to be prohibited from outputting the vehicle starting current when the vehicle starting current output by the vehicle starting circuit is greater than the preset current threshold value.

In the above implementation process, the over-current detecting circuit in the portable standby starting device can make automatic adjustment according to the output vehicle starting current, so that the portable standby starting device cannot output a vehicle starting current greater than the preset current threshold value, thus ensuring that the output vehicle starting current is a safe current.

In one or more embodiments, the portable standby starting device further includes a forced starting circuit, wherein the forced starting circuit includes:

a $36^{th}$ diode, wherein an input end of the $36^{th}$ diode is connected to the load access detecting circuit; an output end of the $36^{th}$ diode is connected to both an output end of the $32^{nd}$ diode and one end of the first switch;

the $32^{nd}$ diode, with an input end being connected to the load access detecting circuit; and the first switch, with the other end being connected to the ground terminal.

In one or more embodiments, the battery circuit includes a battery, a voltage regulating circuit, and a battery voltage detecting circuit, wherein the battery is coupled to the voltage regulating circuit and the battery voltage detecting circuit, and is configured to supply power to other circuits;

the voltage regulating circuit is configured to regulate an output voltage of the battery; and the battery voltage detecting circuit is configured to detect whether the battery is in a high-voltage state or a low-voltage state, and control the vehicle starting circuit to be prohibited from outputting the vehicle starting current when the battery is in the high-voltage state or the low-voltage state.

In the above implementation process, the battery circuit usually includes a battery or a battery pack, a DC-DC circuit, and a battery voltage detecting circuit. In the above, the battery circuit supplies power through the battery, adjusts an output voltage value through the DC-DC circuit, and outputs an appropriate voltage under the monitoring of the battery voltage detecting circuit, so that the vehicle starting circuit can ensure the output of an appropriate vehicle starting current.

In one or more embodiments, the portable standby starting device further includes a temperature detecting circuit, wherein the temperature detecting circuit is coupled to the vehicle starting circuit, and is configured to detect whether the portable standby starting device is in a preset high-temperature state, and control the vehicle starting circuit to be prohibited from outputting the vehicle starting current when the portable standby starting device is in the high-temperature state.

In the above implementation process, the temperature detecting circuit included in the portable standby starting device can carry out real-time detection on the temperature of the portable standby starting device, so that when the temperature of the portable standby starting device is too high, the power supply to the vehicle starting circuit is timely stopped, thus ensuring the use safety of the portable standby starting device.

In one or more embodiments, the portable standby starting device further includes an alarm circuit, wherein the alarm circuit is coupled to the vehicle starting circuit, and is configured to control a buzzer to send out an alarm when the vehicle starting circuit is in a state of being prohibited from outputting the vehicle starting current.

In the above implementation process, the alarm circuit included in the portable standby starting device can control the buzzer to give an alarm when any of the above circuits detects a problem, so that it is easier for the user to know that the portable standby starting device cannot operate normally.

In one or more embodiments, the portable standby starting device further includes a display circuit, wherein the display circuit is coupled to the vehicle starting circuit, and is configured to display an indicator light corresponding to an operation state of the portable standby starting device.

In the above implementation process, the display circuit can display the operation state of the portable standby starting device in a visual manner, so that the user can conveniently know the same.

In one or more embodiments, the load access detecting circuit further includes:

a ninth triode, having an emitter being connected to a ground terminal and one end of a $61^{st}$ resistor, a base being connected to both the other end of the $61^{st}$ resistor and one end of a $59^{th}$ resistor, and a collector being connected to the vehicle starting circuit;

an eighth triode, having an emitter being connected to the ground terminal and one end of a $57^{th}$ resistor, a base being connected to both the other end of the $57^{th}$ resistor and one end of a $48^{th}$ resistor, and a collector being connected to the vehicle starting circuit;

the $59^{th}$ resistor, with the other end being connected to an output end of a $24^{th}$ diode;

the $24^{th}$ diode, with an input end being connected to a collector of the $10^{th}$ triode;

the $48^{th}$ resistor, with the other end being connected to both an input end of a $21^{st}$ diode and one end of a $65^{th}$ resistor;

the $65^{th}$ resistor, with the other end being connected to a fourth access operational amplifier;

the $21^{st}$ diode, an output end of the $21^{st}$ diode and an output end of a $32^{nd}$ diode both being connected to a first switch;

the first switch, connected to one end of a $53^{rd}$ resistor, one end of a $54^{th}$ resistor, one end of a $55^{th}$ resistor, one end of a $56^{th}$ resistor, and the ground terminal;

the $53^{rd}$ resistor, with the other end being connected to a $47^{th}$ resistor;

the $54^{th}$ resistor, with the other end being connected to a $49^{th}$ resistor;

the $55^{th}$ resistor, with the other end being connected to a $50^{th}$ resistor;

the $56^{th}$ resistor, with the other end being connected to a $51^{st}$ resistor;

the four, i.e. the $47^{th}$ resistor, the $49^{th}$ resistor, the $50^{th}$ resistor, and the $51^{st}$ resistor, being all connected to the drive voltage end;

a $32^{nd}$ diode, having an input end being connected to a collector of a $10^{th}$ triode;

the $10^{th}$ triode, having an emitter being connected to both the ground terminal and one end of a $14^{th}$ capacitor; and a base being connected to the three, i.e. one end of a $60^{th}$ resistor, one end of a $64^{th}$ resistor, and the other end of the $14^{th}$ capacitor; and the $60^{th}$ resistor, with the other end being connected to the vehicle starting circuit.

In one or more embodiments, the reverse-charge detecting circuit includes:

the fourth detection operational amplifier, having a positive input end being connected to both one end of a $24^{th}$ resistor and one end of a $35^{th}$ resistor;

the $24^{th}$ resistor, with the other end being connected to the ground terminal;

the $35^{th}$ resistor, with the other end being connected to the three, i.e. an output end of a fifth detection operational amplifier, one end of a $69^{th}$ resistor, and a $16^{th}$ capacitor;

the fifth detection operational amplifier, having a negative input end being connected to one end of a $68^{th}$ resistor, the other end of the $69^{th}$ resistor, and the other end of the $16^{th}$ capacitor;

a positive input end of the fifth detection operational amplifier being connected to both one end of a $66^{th}$ resistor and one end of a $67^{th}$ resistor;

the $66^{th}$ resistor, with the other end being connected to the drive voltage end; and the $67^{th}$ resistor, with the other end being connected to the ground terminal.

In one or more embodiments, the display circuit includes:

a first light-emitting diode, wherein an input end of the first light-emitting diode is connected to the drive voltage end;

an output end of the first light-emitting diode being connected to one end of a $33^{rd}$ resistor;

the $33^{rd}$ resistor, with the other end being connected to a collector of a fifth triode;

the fifth triode, having an emitter being connected to the ground terminal and one end of a $71^{st}$ resistor; a base of the fifth triode being connected to one end of a $70^{th}$ resistor and the other end of the $71^{st}$ resistor;

a $32^{nd}$ resistor, one end of the $32^{nd}$ resistor being connected to the vehicle starting circuit;

the other end of the $32^{nd}$ resistor being connected to an input end of a second light-emitting diode;

the second light-emitting diode, with an output end being connected to the ground terminal;

a $62^{nd}$ resistor, one end of the $62^{nd}$ resistor being connected to the drive voltage end; and the other end of the $62^{nd}$ resistor being connected to an input end of a third light-emitting diode; and the third light-emitting diode, with an output end being connected to the ground terminal.

In one or more embodiments, the portable standby starting device further includes a voltage bias switch circuit, and the voltage bias switch circuit includes:

a $22^{nd}$ resistor, wherein one end of the $22^{nd}$ resistor is connected to the four, i.e. a source of a fourth field-effect transistor, one end of a $37^{th}$ resistor, an emitter of a sixth triode, and an input end of a $28^{th}$ diode; the other end of the $22^{nd}$ resistor, a drain of the fourth field-effect transistor, and the voltage regulating circuit are connected;

the fourth field-effect transistor, having a gate being connected to the other end of the $37^{th}$ resistor, an output end of a $27^{th}$ diode, and a collector of the sixth triode;

the $27^{th}$ diode, with an input end being connected to one end of a $14^{th}$ resistor;

the $14^{th}$ resistor, with the other end being connected to the drive voltage end;

the sixth triode, with a base being connected to the three, i.e. one end of a $20^{th}$ resistor, an output end of a $28^{th}$ diode, and one end of a $29^{th}$ resistor;

the $20^{th}$ resistor, with the other end being connected to the ground terminal;

the $29^{th}$ resistor, with the other end being connected to an output end of the $29^{th}$ diode; and the $29^{th}$ diode, with an input end being connected to the second access operational amplifier.

In one or more embodiments, the battery voltage detecting circuit includes:

a first access operational amplifier, having a positive input end being connected to one end of a $46^{th}$ resistor and the 1.6 V voltage end; a negative input end being connected to both one end of a $25^{th}$ resistor and one end of a $19^{th}$ resistor; and an output end being connected to both the output end of a $30^{th}$ diode and an output end of a $23^{rd}$ diode;

the $30^{th}$ diode, with an input end being connected to the other end of the $46^{th}$ resistor; and the $25^{th}$ resistor, with the other end being connected to the ground terminal.

An embodiment of the present disclosure further provides a standby starting tool for a vehicle, and the standby starting tool includes a clamp and the above portable standby starting device, wherein the clamp is connected to the portable standby starting device, and is configured to connect the portable standby starting device and a vehicle load of the vehicle.

In one or more embodiments, the load access detecting circuit includes a voltage type load detecting sub-circuit and/or a resistance type load detecting sub-circuit.

In one or more embodiments, the portable standby starting device further includes a first time delay circuit and/or a second time delay circuit, and the first time delay circuit and/or the second time delay circuit are both coupled to the vehicle starting circuit, wherein the first time delay circuit is configured to control the vehicle starting circuit to be disconnected in a delayed way; and the second time delay circuit is configured to control the vehicle starting circuit to be started in a delayed way.

In one or more embodiments, the battery voltage detecting circuit includes a battery under-voltage detecting sub-circuit and/or a battery over-voltage detecting sub-circuit connected to each other.

In the above implementation process, when the clamp in the standby starting tool is connected to the vehicle load, the portable standby starting device can detect whether the load is connected.

If the load is connected to the circuit through the clamp, the portable standby starting device can perform the ignition operation for the vehicle. Thus, it is time-saving and labor-saving to implement such embodiment.

The embodiments of the present disclosure are further described in detail below with reference to the accompanying drawings.

Referring to FIG. 1, FIG. 1 is a structural schematic view of a portable standby starting device for a vehicle provided in an embodiment of the present disclosure. In the above, a portable standby starting device 100 includes a battery circuit 10, a load access detecting circuit 20, and a vehicle starting circuit 30, wherein the battery circuit 10 is coupled to the load access detecting circuit 20 and the vehicle starting circuit 30, and is configured to supply power to the load access detecting circuit 20 and the vehicle starting circuit 30;

the load access detecting circuit 20 is coupled to the vehicle starting circuit 30, and is configured to generate a control signal according to a detected vehicle load connection state; and the vehicle starting circuit 30 is configured to, when detecting the control signal, control whether the vehicle starting circuit 30 outputs a vehicle starting current or not according to the control signal; and the vehicle starting current is used for performing an ignition operation for the vehicle.

As an optional embodiment, the load access detecting circuit 20 is specifically configured to, when the detected vehicle load connection state is a connected state, generate a starting control signal; or when the vehicle load connection state is an unconnected state, generate a starting prohibition signal;

the vehicle starting circuit 30 is specifically configured to, when detecting the starting control signal, control the vehicle starting circuit 30 to output the vehicle starting current; and the vehicle starting circuit 30 is further specifically configured to, when detecting the starting prohibition signal, control the vehicle starting circuit 30 to be prohibited from outputting the vehicle starting current.

In the present embodiment, the term "couple" is used to indicate that an output end and an input end of this circuit are both connected to another circuit.

In the present embodiment, the term "couple" is specifically used to indicate that the output end of this circuit and an output end of the another circuit are both connected to the same position of a further circuit, and that the input end of this circuit and an input end of the another circuit are also both connected to the same position of the further circuit.

As an optional embodiment, the load access detecting circuit 20 includes:
- a ninth triode, having an emitter being connected to a ground terminal and one end of a $61^{st}$ resistor, a base being connected to both the other end of the $61^{st}$ resistor and one end of a $59^{th}$ resistor, and a collector being connected to the vehicle starting circuit 30;
- an eighth triode, having an emitter being connected to the ground terminal and one end of a $57^{th}$ resistor, a base being connected to both the other end of the $57^{th}$ resistor and one end of a $48^{th}$ resistor, and a collector being connected to the vehicle starting circuit 30;
- the $59^{th}$ resistor, with the other end being connected to an output end of a $24^{th}$ diode;
- the $24^{th}$ diode, with an input end being connected to a collector of the $10^{th}$ triode;
- the $48^{th}$ resistor, with the other end being connected to both an output end of a $21^{st}$ diode and an output end of a $23^{rd}$ diode;
- the $21^{st}$ diode, having an input end being connected to a fourth access operational amplifier;
- the $23^{rd}$ diode, having an input end being connected to a first access operational amplifier;
- an output end of the $21^{st}$ diode and an output end of the $23^{rd}$ diode both being connected to a collector of the $10^{th}$ triode;
- the $10^{th}$ triode, having an emitter being connected to the ground terminal and one end of a $62^{th}$ resistor, and a base being connected to both the other end of the $62^{th}$ resistor and one end of a $60^{th}$ resistor; and the $60^{th}$ resistor, with the other end being connected to the vehicle starting circuit 30.

Figure 2:
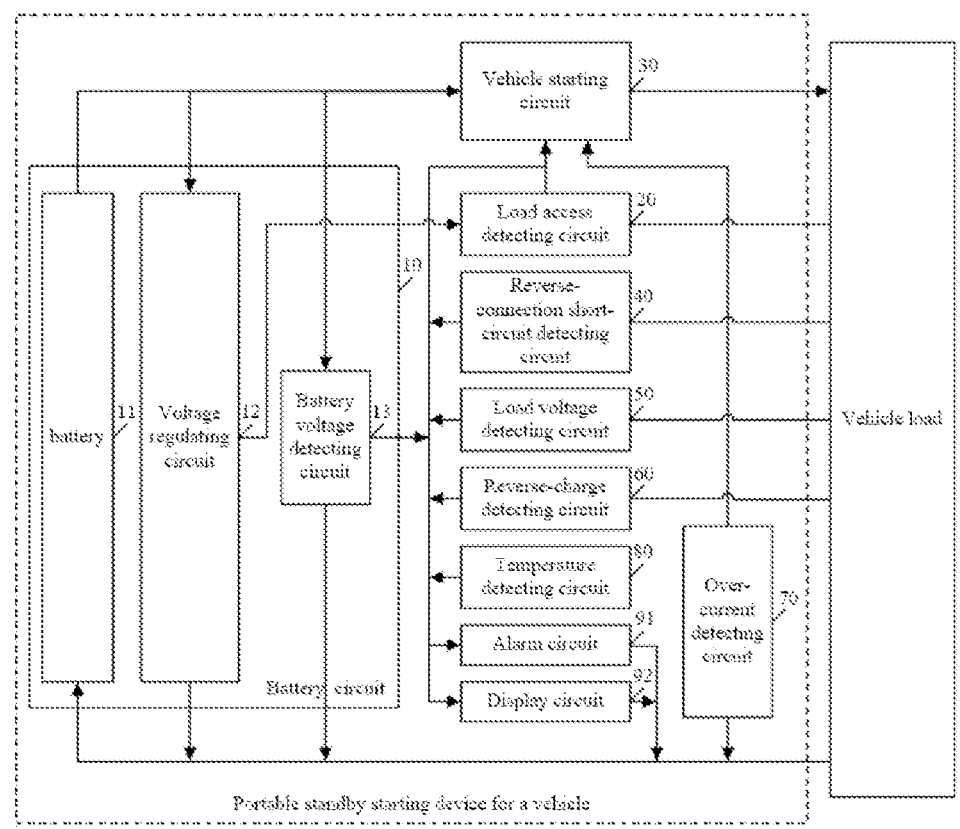
FIG. 2 is a structural schematic view of an improved portable standby starting device provided in an embodiment of the present disclosure.

Referring to FIG. 2, FIG. 2 is a structural schematic view of an improved portable standby starting device 100 provided in an embodiment of the present disclosure. It can be seen from FIG. 2 that the portable standby starting device 100 further may include multiple types of circuits having different functions, and for a specific circuit structure, reference can be made to subsequent contents in the present embodiment.

As an optional embodiment, the load access detecting circuit 20 includes a voltage type load detecting sub-circuit and/or a resistance type load detecting sub-circuit.

As an optional embodiment, the portable standby starting device 100 further includes a reverse-connection short-circuit detecting circuit 40, wherein the reverse-connection short-circuit detecting circuit 40 is coupled to the load access detecting circuit 20 and is configured to detect whether a vehicle load is in a reverse-connection state or a short-circuit state, and generate a starting prohibition signal when the vehicle load is in the reverse-connection state or the short-circuit state; and the vehicle starting circuit 30 is further configured to, when detecting the starting prohibition signal, control the vehicle starting circuit 30 to be prohibited from outputting the vehicle starting current.

In the present embodiment, the reverse-connection short-circuit detecting circuit 40 is connected to the battery circuit 10.

As an optional embodiment, the reverse-connection short-circuit detecting circuit 40 includes:
- a second access operational amplifier, having an output end being connected to one end of a $35^{th}$ resistor and an input end of a $18^{th}$ diode, and an input end being connected to the load access detecting circuit 20;
- the $35^{th}$ resistor, with the other end being connected to a drive voltage end;
- the $18^{th}$ diode, having an output end being connected to the load access detecting circuit 20;
- a third voltage stabilizing diode, having an input end being connected to the ground terminal, and an output end being connected to the load access detecting circuit 20;
- a $20^{th}$ diode, having an input end being connected to the ground terminal, and an output end being connected to the load access detecting circuit 20;
- a $38^{th}$ resistor, having one end being connected to the ground terminal, and the other end being connected to the load access detecting circuit 20; and
- a $34^{th}$ resistor, having one end being connected to the vehicle load, and the other end being connected to the load access detecting circuit 20.

As an optional embodiment, the portable standby starting device 100 further includes a load voltage detecting circuit 50, wherein the load voltage detecting circuit 50 is coupled to the load access detecting circuit 20, and is configured to detect whether the vehicle load is in a high-voltage state or a low-voltage state, and generate the starting prohibition signal when the vehicle load is in the high-voltage state or the low-voltage state; and the vehicle starting circuit 30 is further configured to, when detecting the starting prohibition signal, control the vehicle starting circuit 30 to be prohibited from outputting the vehicle starting current.

In the present embodiment, the load voltage detecting circuit 50 is connected to the battery circuit 10.

As an optional embodiment, the load voltage detecting circuit 50 includes:
- a $58^{th}$ resistor, having one end being connected to both an output end of a $22^{nd}$ diode and the load access detecting circuit 20, and the other end being connected to the load access detecting circuit 20;
- the $22^{nd}$ diode, having an output end connected to the load access detecting circuit 20, and an input end of the load access detecting circuit 20 and one end of a $46^{th}$ resistor, which are connected to each other, being connected an output end of a third access operational amplifier;
- the $46^{th}$ resistor, with the other end being connected to the drive voltage end;
- the third access operational amplifier, having an input end being connected to one end of a $52^{nd}$ resistor and one end of a $44^{th}$ resistor;
- the $52^{nd}$ resistor, with the other end being connected to the ground terminal; and
- the $44^{th}$ resistor, with the other end being connected to the vehicle starting circuit 30.

Figure 3:
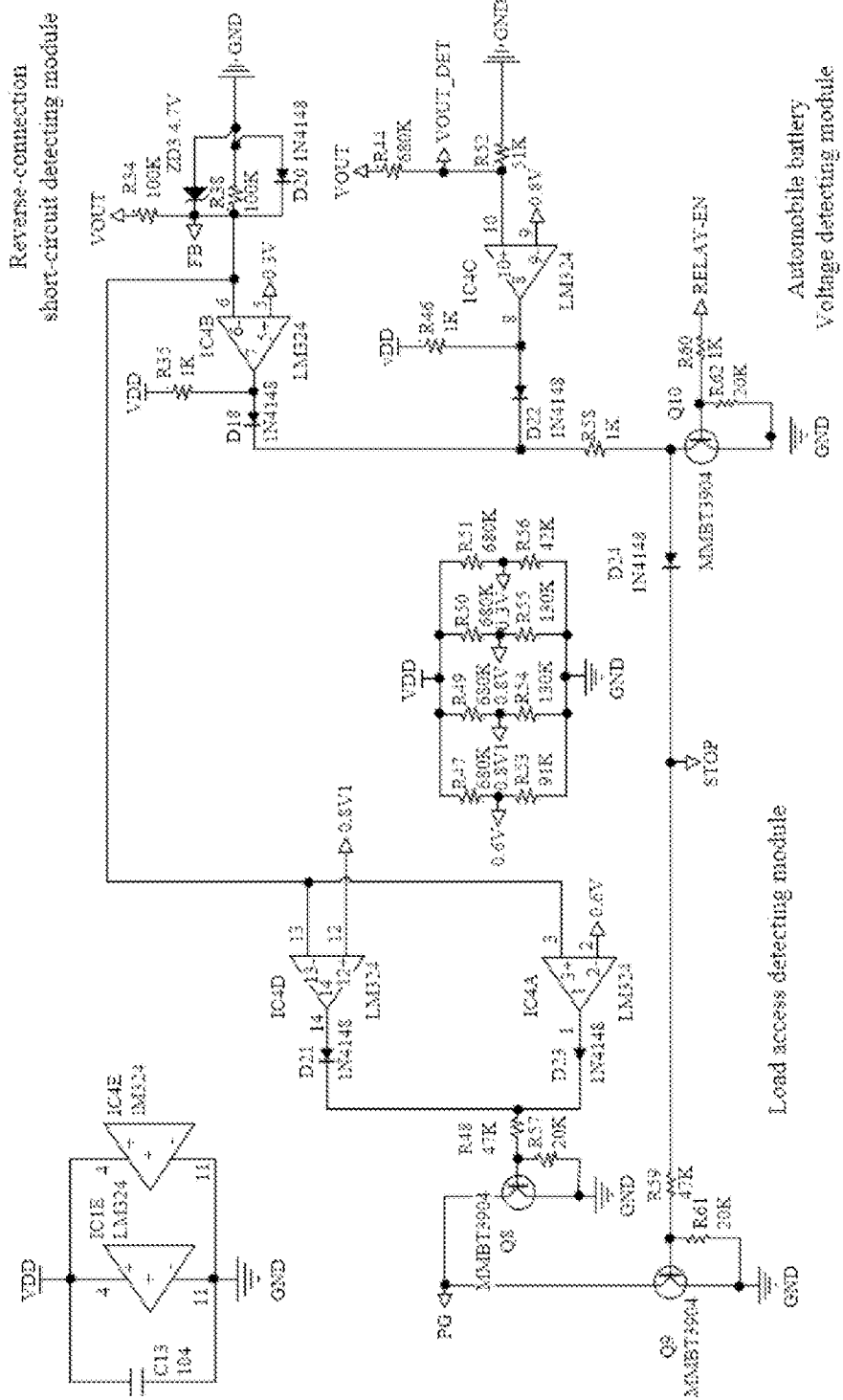
FIG. 3 is a schematic view of a combined circuit structure of the three, i.e., a load access detecting circuit, a load voltage detecting circuit, and a reverse-connection short-circuit detecting circuit provided in an embodiment of the present disclosure.

Referring to FIG. 3, FIG. 3 shows a schematic view of a combined circuit structure of the three, i.e. the load access detecting circuit 20, the load voltage detecting circuit 50, and the reverse-connection short-circuit detecting circuit 40.

In the above, the load access detecting circuit 20 is also called as a load detecting module, and is composed of peripheral components such as IC4D/IC4A/R47/R53/R49/R54. When positive and negative poles of an output end of a clamp 200 are connected to a load, voltages of PIN13 of the IC4D and PIN3 of the IC4A will correspondingly change, so that level of the PIN14 of the IC4D or PIN1 of the IC4A flips to change from a high level to a low level. This low level makes Q8 cut off. After the Q8 is cut off, the PIN3 of a starting control module IC1A is at a high level, and the relay K1 for output of clamp 200 is closed. Specifically, the IC4D, the D21, and other peripheral components constitute the voltage type load detecting sub-circuit. The other peripheral components include R47, R49, R50, R51, R53, R54, R55, and R56; and the IC4A, the D23, and other peripheral components constitute the resistance type load detecting sub-circuit. The other peripheral components include R47, R49, R50, R51, R53, R54, R55, and R56.

In the above, the reverse-connection short-circuit detecting circuit 40 is also called as a reverse-connection short-circuit detecting module, and is composed of IC4B/R34/R38/R51/R56/ZD3/D20, etc. When a battery 11 (i.e., the vehicle load) connected to an automobile is reversely connected or short-circuited, a high level output from PIN7 of the IC4B passes through D18 to turn on the Q9, so that the PIN3 of the starting control module IC1A is at a low level, then the relay K1 for output of clamp 200 is open.

In the above, as the vehicle load is the battery 11 of the automobile, the load voltage detecting circuit 50 is also called as an automobile voltage detecting module. The load voltage detecting circuit 50 is composed of IC4C/R44/R52/R50/R55, etc. When the voltage of the battery 11 connected to the automobile is higher than 11 V, a high level output from PIN8 of the IC4B passes through D22 to turn on the Q9, so that the PIN3 of the starting control module IC1A is at a low level, the relay K1 for output of clamp 200 is open.

As an optional embodiment, the portable standby starting device 100 further includes a forced starting circuit, wherein the forced starting circuit is coupled to the load access detecting circuit 20 and is configured generate a forced starting signal according to a forced starting operation of a user; and the vehicle starting circuit 30 is further configured to, when detecting the forced starting signal, control the vehicle starting circuit 30 to immediately output the vehicle starting current.

Figure 4:
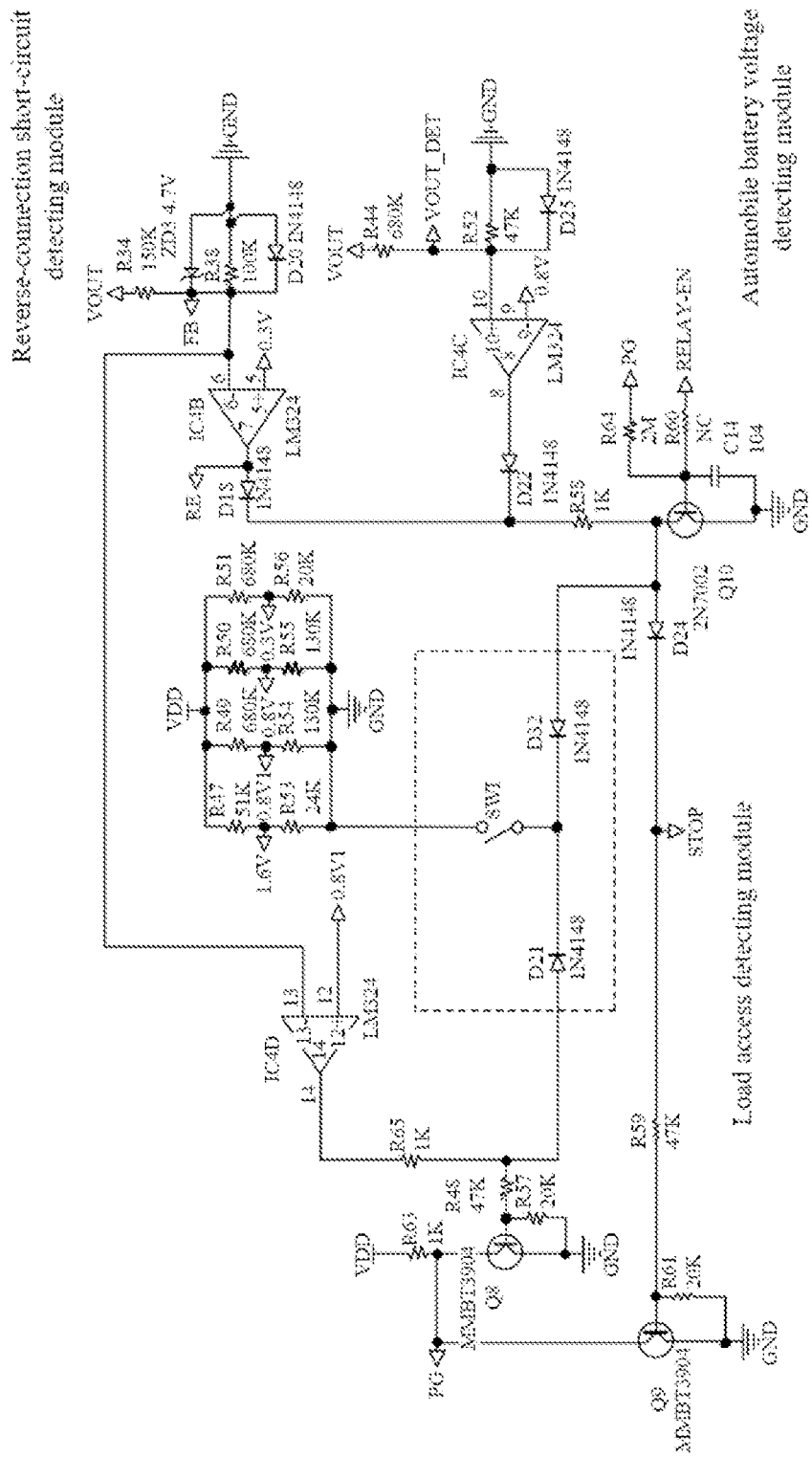
FIG. 4 is another schematic view of the combined circuit structure of the three, i.e., the load access detecting circuit, the load voltage detecting circuit, and the reverse-connection short-circuit detecting circuit provided in an embodiment of the present disclosure.
Figure 5:
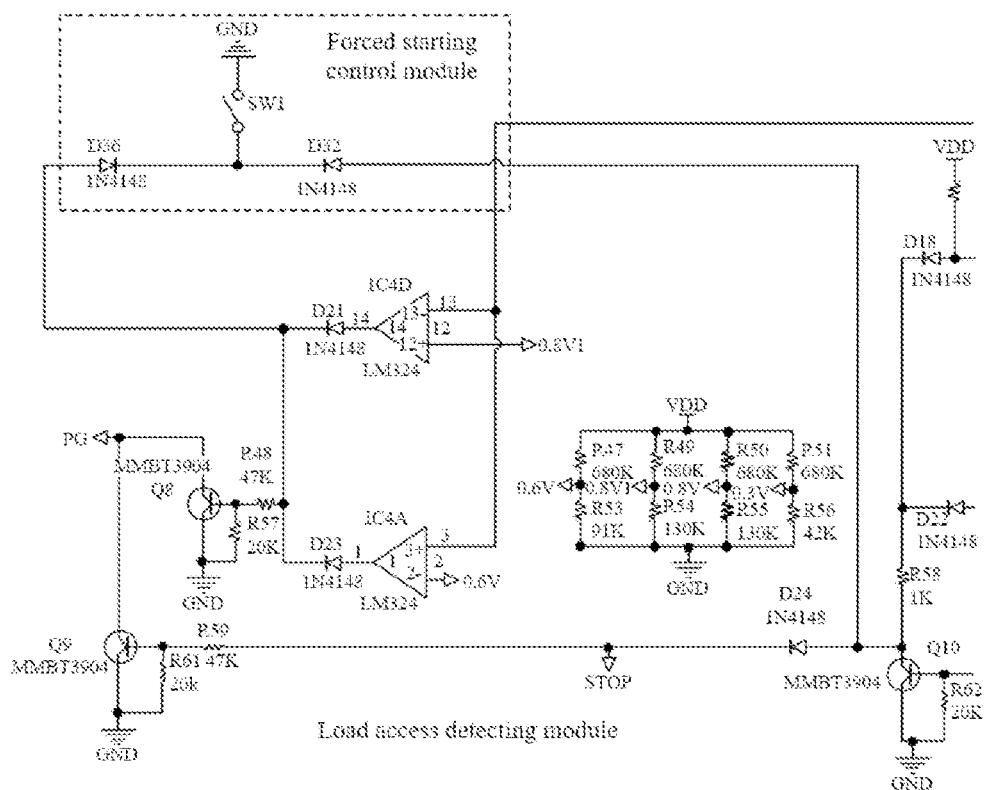
FIG. 5 is a schematic view of a circuit combination of the load access detecting circuit and a forced starting circuit provided in an embodiment of the present disclosure.

Referring to FIG. 4, a forced starting function can be added to the circuit structure shown in FIG. 4, so that the clamp 200 still can be opened to ignite the automobile when the battery 11 of the automobile is 0 V. In the above, the working principle of the circuit with the forced starting function is as follows: the forced starting circuit is composed of the 21$^{st}$ diode D21, the 32$^{nd}$ diode D32, and a first switch SW1. When the first switch SW1 is closed, positive poles of the 21$^{st}$ diode D21 and the 32$^{nd}$ diode D32 are short-circuited to the ground, a negative pole of the 21$^{st}$ diode D21 is connected to the base of the eighth triode Q8 via the 48$^{th}$ resistor R48, a negative pole of the 32$^{nd}$ diode D32 is connected to the base of the ninth triode Q9 via the 24$^{th}$ diode D24 and the 59$^{th}$ resistor R59, which is equivalent to connecting the bases of the eighth triode Q8 and the ninth triode Q9 to the ground, so that the eighth triode Q8 and the ninth triode Q9 enter an off state, the PIN3 of the starting first access operational amplifier IC1A is at a high level, the relay K1 for output of clamp 200 is closed. Referring to FIG. 5, FIG. 5 shows a schematic view of a circuit combination of the load access detecting circuit 20 and the forced starting circuit. In the above, the forced starting control module is just the forced starting circuit.

Figure 6:
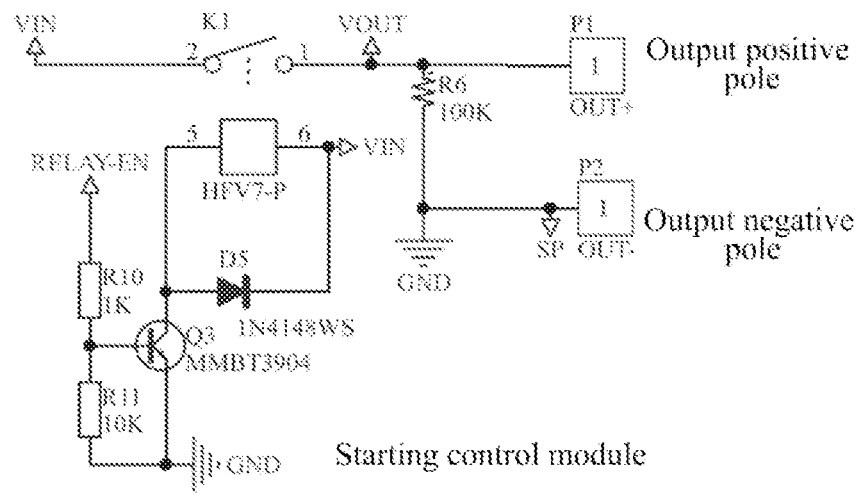
FIG. 6 is a schematic view of a circuit structure of the vehicle starting circuit provided in an embodiment of the present disclosure.

Referring to FIG. 6, FIG. 6 shows a schematic view of a circuit structure of the vehicle starting circuit 30. In the above, the vehicle starting circuit 30 is also called as a starting control module, and may be composed of peripheral components such as K1/Q3/R10/R11/IC1A/IC1B.

When the PIN3 of the IC1A is at a high level, the PIN3 of the IC1A outputs a high level, Q3 is turned on, the relay K1 is closed, the positive pole of the battery 11 is connected to an output positive pole of the clamp 200 through the relay, and the output positive and negative poles of the clamp 200 are correctly connected to the battery 11 of the automobile, respectively, then the ignition can be performed. When the PIN3 of the IC1A is at a low level, the relay K1 is open, and the positive pole of the clamp 200 outputs.

As an optional embodiment, the portable standby starting device 100 further includes a reverse-charge detecting circuit 60, wherein the reverse-charge detecting circuit 60 is coupled to the load access detecting circuit 20, and is configured to detect whether the voltage of the vehicle load is higher than an output voltage of the battery circuit 10 or not, and generate the starting prohibition signal when the voltage of the vehicle load is higher than the output voltage of the battery circuit 10; and the vehicle starting circuit 30 is further configured to, when detecting the starting prohibition signal, control the vehicle starting circuit 30 to be prohibited from outputting the vehicle starting current.

In the present embodiment, the reverse-charge detecting circuit 60 is connected to the battery circuit 10.

As an optional embodiment, the reverse-charge detecting circuit 60 includes:

a third diode, having an output end being connected to the load access detecting circuit 20, and an input end being connected to an output end of a reverse-charge operational amplifier;

a fourth detection operational amplifier, having a positive input end being connected to the vehicle load, and a negative input end of the reverse-charge operational amplifier being connected to both one end of a fourth resistor and one end of the seventh resistor;

the fourth resistor, with the other end being connected to the battery circuit 10; and the seventh resistor, with the other end being connected to the ground terminal.

Figure 7:
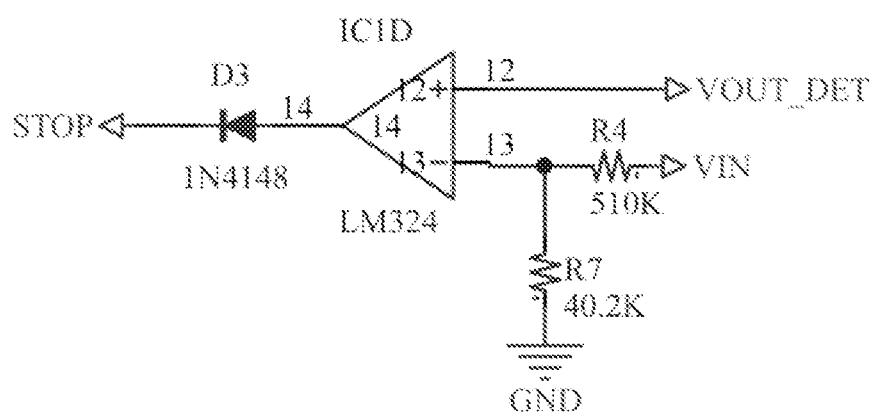
FIG. 7 is a schematic view of a circuit structure of a reverse-charge detecting circuit provided in an embodiment of the present disclosure.

Referring to FIG. 7, FIG. 7 shows a schematic view of a circuit structure of the reverse-charge detecting circuit 60. In the above, the reverse-charge detecting circuit 60 is also called as a reverse-charge detecting module, and is specifically composed of peripheral components such as IC1D/R4/R7/D3. When the voltage of the battery 11 connected to the automobile is higher than the voltage input into the battery 11 by 0.5 V, a high level output from the PIN14 of the IC1D passes the D22 to turn on the Q9, so that the PIN3 of the starting control module IC1A is at a low level, the relay K1 for output of clamp 200 is open.

As an optional embodiment, the reverse-charge detecting circuit 60 includes:

the fourth detection operational amplifier, having a positive input end being connected to both one end of the 24$^{th}$ resistor and one end of the 35$^{th}$ resistor;

the 24$^{th}$ resistor, with the other end being connected to the ground terminal;

the 35$^{th}$ resistor, with the other end being connected to the three, i.e. an output end of a fifth detection operational amplifier, one end of a 69$^{th}$ resistor, and a 16$^{th}$ capacitor;

the fifth detection operational amplifier, having a negative input end being connected to the three one end of a 68$^{th}$ resistor, the other end of the 69$^{th}$ resistor, and the other end of the 16$^{th}$ capacitor;

a positive input end of the fifth detection operational amplifier being connected to both one end of a 66$^{th}$ resistor and one end of a 67$^{th}$ resistor;

the 66$^{th}$ resistor, with the other end being connected to the drive voltage end; and the 67$^{th}$ resistor, with the other end being connected to the ground terminal.

Figure 8:
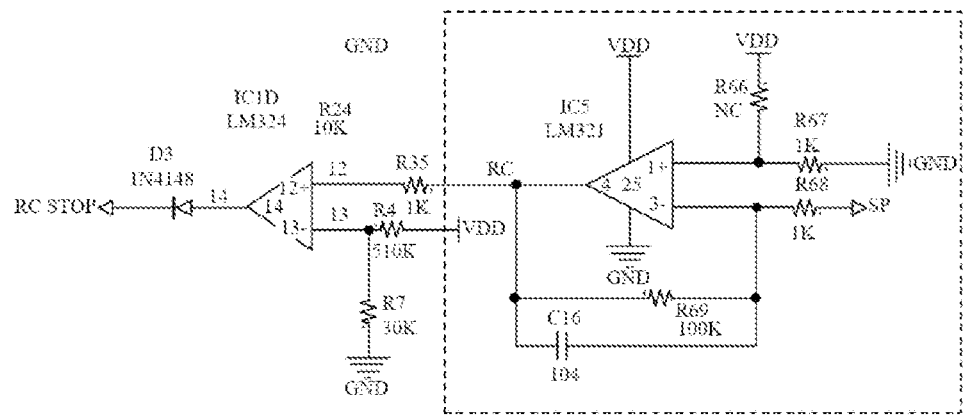
FIG. 8 is another schematic view of the circuit structure of the reverse-charge detecting circuit provided in an embodiment of the present disclosure.

Referring to FIG. 8, the reverse-charge protection in the reverse-charge detecting circuit 60 shown in FIG. 8 is changed from an original voltage detection mode to a current detection mode, because the current detection mode facilitates production and test. Therefore, a reverse-charge current detecting circuit composed of IC5, R67, R68, R69, C16 etc. is added. In the above, the working principle of the reverse-charge detecting module is as follows: the reverse-charge detecting module is composed of peripheral components such as IC1D, R4, R7, D3, IC5, R67, R68, R69, and C16. After the clamp 200 is opened and the automobile is successfully started, when the voltage of the battery 11 of the automobile is higher than the voltage input into the battery 11, the reverse-charge current flows through a negative wire, then is sent from R67 to PIN1 of IC5 to be amplified, and then sent to PIN12 of IC1D. Compared with the PIN13 of the IC1D, when a signal after the reverse-charge current is amplified is higher than the voltage of the PIN13 of the IC1D, a high level output from PIN14 of the IC1D is sent to PIN10 of the IC1C through D3, R36, and R40, so that PIN8 of the IC1C outputs a high level to turn on Q7, and PIN3 of the starting control module IC1A is at a low level, the relay K1 for output of clamp 200 is open.

As an optional embodiment, the portable standby starting device 100 further includes an over-current detecting circuit 70, wherein the over-current detecting circuit 70 is coupled to the vehicle starting circuit 30, and is configured to detect whether the vehicle starting current output by the vehicle starting circuit 30 is greater than a preset current threshold value, and generate the starting prohibition signal when the vehicle starting current output by the vehicle starting circuit 30 is greater than the preset current threshold value; and the vehicle starting circuit 30 is further configured to, when detecting the starting prohibition signal, control the vehicle starting circuit 30 to be prohibited from outputting the vehicle starting current.

As an optional embodiment, the over-current detecting circuit 70 includes:

a seventh triode, having a collector being connected to the vehicle starting circuit 30, an emitter being connected to the ground terminal, and a base being connected to an input end of a 19$^{th}$ diode, one end of a 43$^{rd}$ resistor, one end of a 11$^{th}$ capacitor, and one end of a 41$^{st}$ resistor;

the 43$^{rd}$ resistor, with the other end being connected to the ground terminal;

the 11$^{th}$ capacitor, with the other end being connected to the ground terminal;

the 19$^{th}$ diode, with an output end being connected to the four, i.e. one end of a 37$^{th}$ resistor, an input end of a 17$^{th}$ diode, the other end of the 41$^{st}$ resistor, and an output end of a third detection operational amplifier;

the 37$^{th}$ resistor, with the other end being connected to the drive voltage end;

the 17$^{th}$ diode, with an output end being connected to one end of a 36$^{th}$ resistor;

the 36$^{th}$ resistor, with the other end being connected to both an input end of a 16$^{th}$ diode and one end of a 40$^{th}$ resistor;

the 16$^{th}$ diode, with an output end being connected to the vehicle starting circuit 30;

the 40$^{th}$ resistor, with the other end being connected to a positive input end of the third detection operational amplifier, one end of a 39$^{th}$ resistor, and one end of a 12$^{th}$ capacitor;

the 39$^{th}$ resistor, with the other end being connected to the vehicle starting circuit 30;

the third detection operational amplifier, with a negative input end being connected to both one end of a 45$^{th}$ resistor and one end of a 42$^{nd}$ resistor;

the 45$^{th}$ resistor, with the other end being connected to the ground terminal; and the 42$^{nd}$ resistor, with the other end being connected to the drive voltage end.

As an optional embodiment, the portable standby starting device 100 further includes a forced starting circuit, wherein the forced starting circuit includes:

a 36$^{th}$ diode, wherein an input end of the 36$^{th}$ diode is connected to the load access detecting circuit 20; an output end of the 36$^{th}$ diode is connected to both an output end of the 32$^{nd}$ diode, and one end of the first switch;

the 32$^{nd}$ diode, with an input end being connected to the load access detecting circuit 20; and the first switch, with the other end being connected to the ground terminal.

Figure 9:
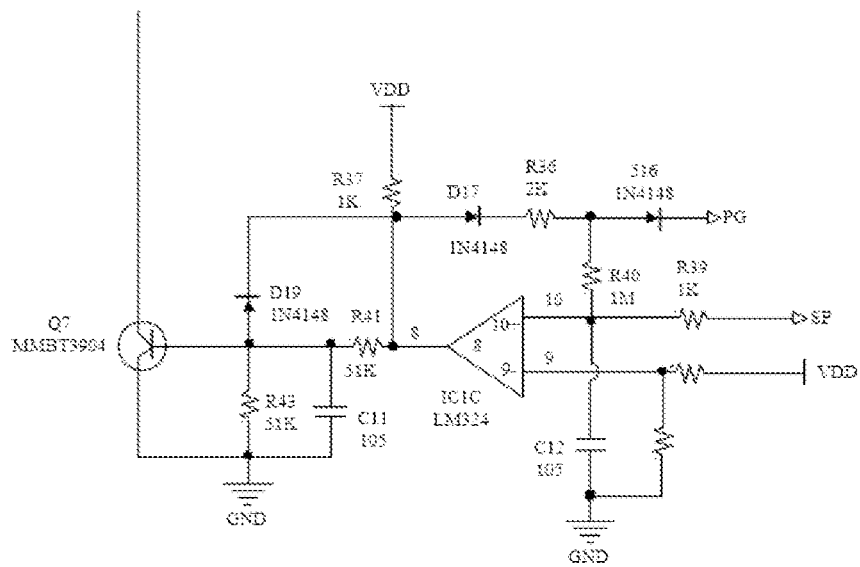
FIG. 9 is a schematic view of a circuit structure of an over-current detecting circuit provided in an embodiment of the present disclosure.

Referring to FIG. 9, FIG. 9 shows a schematic view of a circuit structure of an over-current detecting circuit 70. In the above, the over-current detecting circuit 70 is also called as an over-current detecting module, and may be composed of peripheral components such as IC1C/R40/R39/R42/R45/R36/D17/R41/R43/D19/Q7. When the output current is detected to be too large, the voltage of PIN10 of IC1C rises, a high level output from the PIN8 of the IC1C turns on Q7, so that the PIN3 of the starting control module IC1A is at a low level, the relay K1 for output of clamp 200 is open.

As an optional embodiment, the portable standby starting device 100 further includes a time delay circuit, wherein the time delay circuit is coupled to the vehicle starting circuit 30, and is configured to control the vehicle starting circuit 30 to be started in a delayed way or to be disconnected in a delayed way.

As a further optional embodiment, the time delay circuit includes a first time delay circuit and/or a second time delay circuit, and the first time delay circuit and/or the second time delay circuit are coupled to the vehicle starting circuit 30, wherein the first time delay circuit is configured to control the vehicle starting circuit 30 to be disconnected in a delayed way; and the second time delay circuit is configured to control the vehicle starting circuit 30 to be started in a delayed way.

In the present embodiment, the first time delay circuit may be a 30-second time delay circuit, and this circuit mainly plays a timing function. In the above, when the first time delay circuit completes the timing, the vehicle starting circuit 30 is turned off, thus realizing the effect of disconnecting the output.

In the present embodiment, the second time delay circuit may be a 3-second time delay circuit, and this circuit mainly plays a role of delaying the starting. In the above, there is a slight time delay when the clamp 200 is connected to the vehicle load, thus achieving the effect of eliminating contact sparks.

Figure 10:
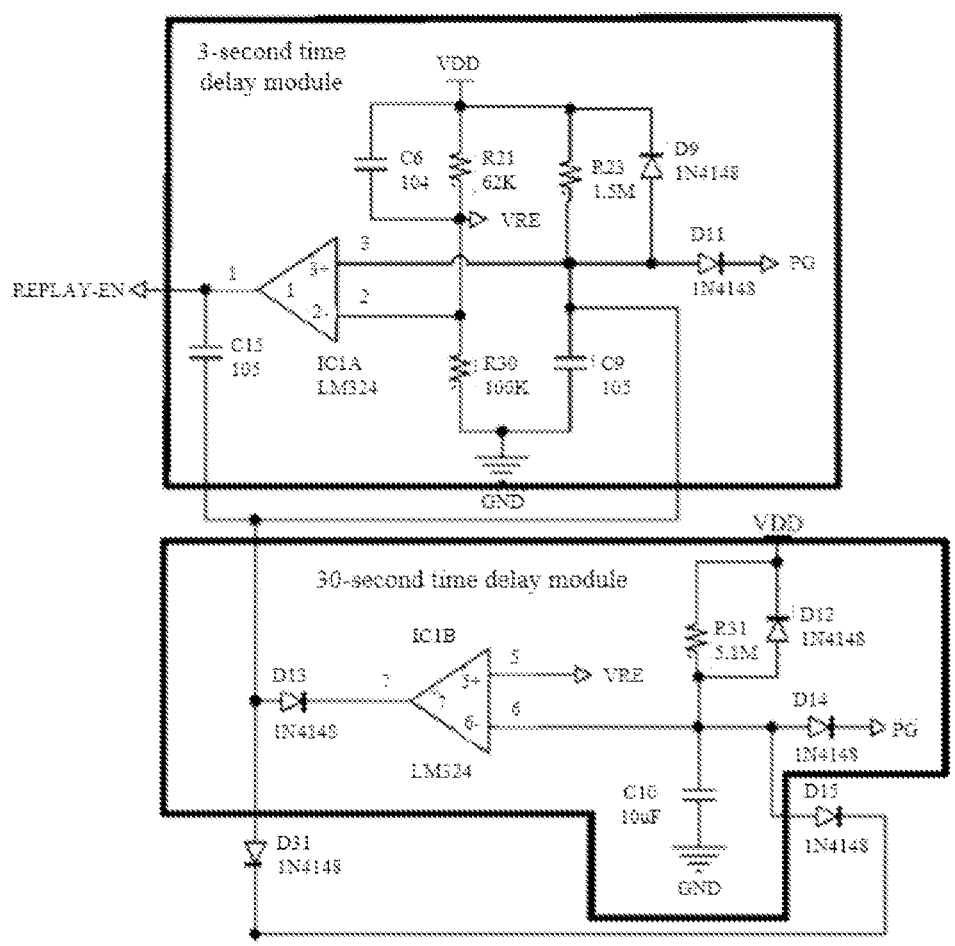
FIG. 10 is a schematic view of a circuit structure of a first time delay circuit and a second time delay circuit provided in an embodiment of the present disclosure.

Referring to FIG. 10, FIG. 10 shows a schematic view of a circuit structure of the first time delay circuit and the second time delay circuit. In the above, the first time delay circuit is a 30-second time delay sub-circuit, and the second time delay circuit is a 3-second time delay sub-circuit.

As an optional embodiment, the portable standby starting device 100 further includes a temperature detecting circuit 80, wherein the temperature detecting circuit 80 is coupled to the vehicle starting circuit 30, and is configured to detect whether the portable standby starting device 100 is in a preset high-temperature state, and generate the starting prohibition signal when the portable standby starting device 100 is in the high-temperature state; and the vehicle starting circuit 30 is further configured to, when detecting the starting prohibition signal, control the vehicle starting circuit 30 to be prohibited from outputting the vehicle starting current.

In the present embodiment, the temperature detecting circuit 80 is connected to the battery circuit 10.

Figure 11:
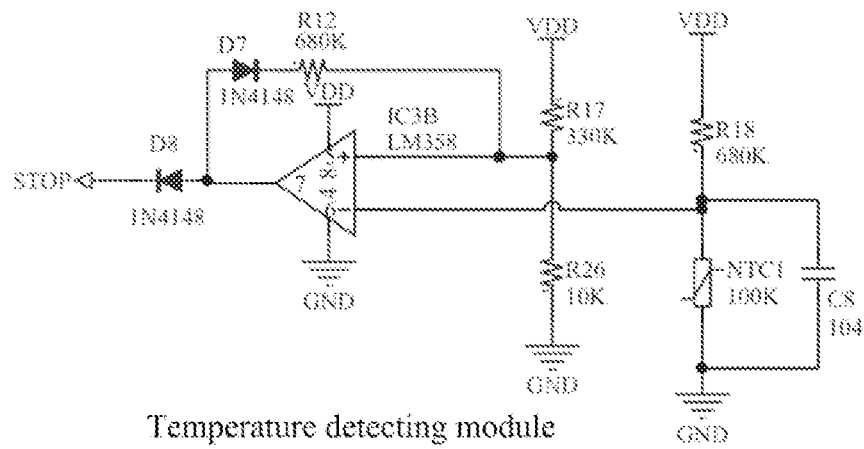
FIG. 11 is a schematic view of a circuit structure of a temperature detecting circuit provided in an embodiment of the present disclosure.

Referring to FIG. 11, FIG. 11 shows a schematic view of a circuit structure of the temperature detecting circuit 80. In the above, the temperature detecting circuit 80 is also called as a temperature detecting module, and may be specifically composed of peripheral components such as IC3B/R17/R26/R18/NTC1/D8. When an NTC sensor detects that the temperature is too high, the voltage of PIN6 of the IC3B becomes low, a high level output from PIN7 of the IC3B passes through the D22 to turn on Q9, so that the PIN3 of the starting control module IC1A is at a low level, the relay K1 for output of clamp 200 is open.

As an optional embodiment, the portable standby starting device 100 further includes an alarm circuit 91, wherein the alarm circuit 91 is coupled to the vehicle starting circuit 30, and is configured to control a buzzer to send out an alarm when the vehicle starting circuit 30 detects the starting prohibition signal.

Figure 12:
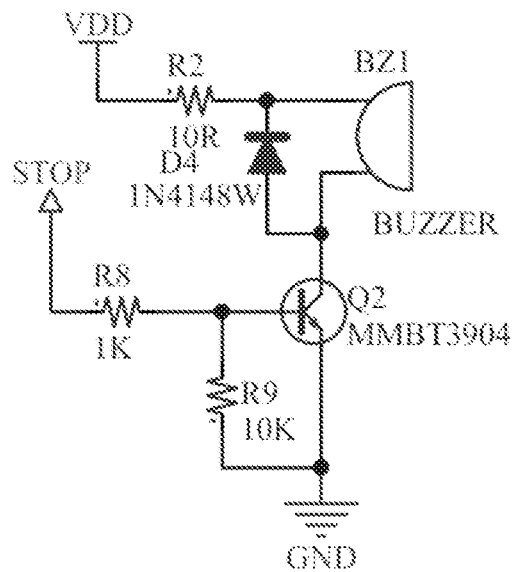
FIG. 12 is a schematic view of a circuit structure of an alarm circuit provided in an embodiment of the present disclosure.

In the present embodiment, the alarm circuit 91 is connected to the battery circuit 10. Referring to FIG. 12, FIG. 12 shows a schematic view of a circuit structure of the alarm circuit 91. In the above, the alarm circuit 91 is also called as an alarm module, and may be specifically composed of R2/BZ1/D4/Q2/R8/R9 etc. When an access error occurs or other protection takes place, a B pole of the Q2 will input a high level, to turn on Q2, so that a buzzer BZ1 sends out an alarm sound.

As an optional embodiment, the portable standby starting device 100 further includes a display circuit 92, wherein the display circuit 92 is coupled to the vehicle starting circuit 30, and is configured to display an indicator light corresponding to an operation state of the portable standby starting device 100.

In the present embodiment, the display circuit 92 is connected to the battery circuit 10.

Figure 13:
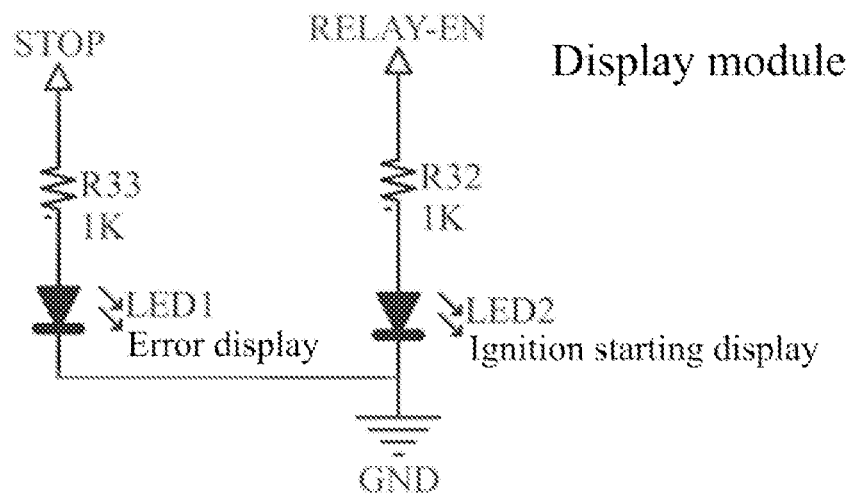
FIG. 13 is a schematic view of a circuit structure of a display circuit provided in an embodiment of the present disclosure.

Referring to FIG. 13, FIG. 13 shows a schematic view of a circuit structure of the display circuit 92. In the above, the display circuit 92 is also called as a display module, and is composed of LED1/R33/LED2/R32. LED1 is configured for error display. When an error occurs, STOP is at a high level, and LED1 is lighted. LED2 is configured for normal display. When the relay is closed, the PIN3 of the IC1A is at a high level, and LED2 is lighted.

As an optional embodiment, the display circuit 92 includes:

a first light-emitting diode, wherein an input end of the first light-emitting diode is connected to the drive voltage end;

an output end of the first light-emitting diode being connected to one end of a $33^{rd}$ resistor;

the $33^{rd}$ resistor, with the other end being connected to a collector of a fifth triode;

the fifth triode, having an emitter being connected to the ground terminal and one end of a $71^{st}$ resistor; a base of the fifth triode being connected to one end of a $70^{th}$ resistor and the other end of the $71^{st}$ resistor;

a $32^{nd}$ resistor, one end of the $32^{nd}$ resistor being connected to the vehicle starting circuit 30;

the other end of the $32^{nd}$ resistor being connected to an input end of a second light-emitting diode;

the second light-emitting diode, with an output end being connected to the ground terminal;

a $62^{nd}$ resistor, one end of the $62^{nd}$ resistor being connected to the drive voltage end; and the other end of the $62^{nd}$ resistor being connected to an input end of a third light-emitting diode; and the third light-emitting diode, with an output end being connected to the ground terminal.

Figure 14:
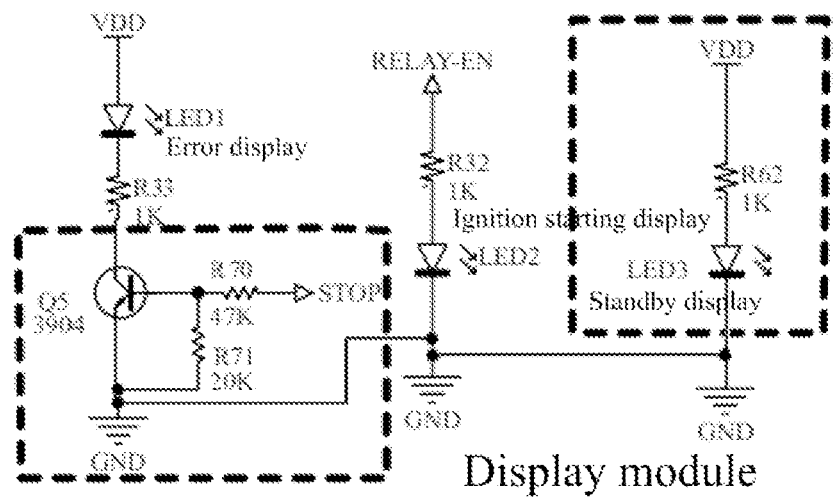
FIG. 14 is another schematic view of the circuit structure of the display circuit provided in an embodiment of the present disclosure.

Referring to FIG. 14, a standby display circuit 92 is added to the display circuit 92 shown in FIG. 14, then the display is more intuitive and meanwhile it is convenient to adjust randomly.

In the present embodiment, for the luminance of the LED1 for error display, a separate drive circuit for the LED1 is also added.

In the present embodiment, the working principle of the standby display circuit 92 is as follows: standby display is composed of LED3/R62, when the battery 11 is connected, a DC-DC circuit voltage stabilizing circuit composed of U1 supplies power to the LED3 in a current-limited manner through R62, so as to make the LED3 to be lighted.

In the present embodiment, the working principle of the error display circuit 92 is as follows: when an error occurs, STOP is at a high level and turns on the LED1 by turning on Q5 via R70/R71. The brightness of the LED1 can be adjusted by adjusting a resistance value of R33.

As an optional embodiment, the battery circuit 10 includes the battery 11, a voltage regulating circuit 12, and a battery voltage detecting circuit 13, wherein the battery 11 is coupled to the voltage regulating circuit 12 and the battery voltage detecting circuit 13, and is configured to supply power to other circuits;

the voltage regulating circuit 12 is configured to regulate an output voltage of the battery 11; and the battery voltage detecting circuit 13 is configured to detect whether the battery 11 is in a high-voltage state or a low-voltage state, and control the vehicle starting circuit 30 to be prohibited from outputting the vehicle starting current when the battery 11 is in the high-voltage state or the low-voltage state.

Figure 15:
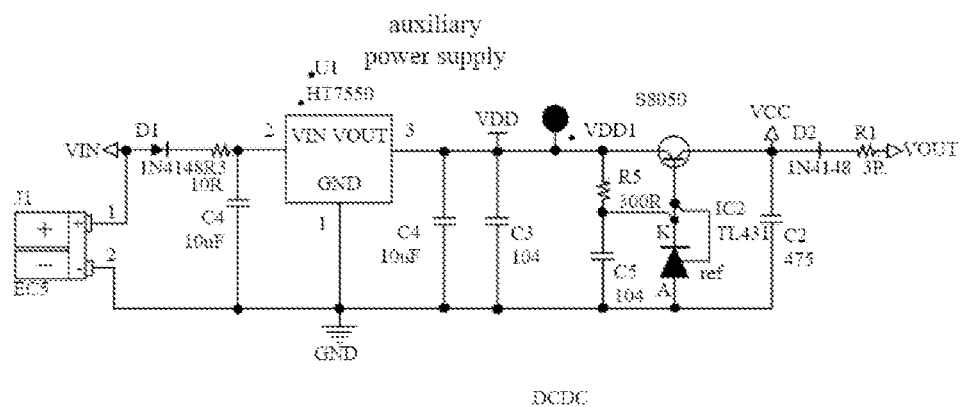
FIG. 15 is a schematic view of a circuit structure of a voltage regulating circuit provided in an embodiment of the present disclosure.

Referring to FIG. 15, FIG. 15 shows a schematic view of a circuit structure of the voltage regulating circuit 12. In the above, the voltage regulating circuit 12 is a DC-DC circuit, and is also called as a DC-DC module. In this circuit, the voltage of the battery 11 passes through a linear step-down circuit composed of D1/R3/U1/C4, etc. to output a stable 5 V voltage to various circuits.

As an optional embodiment, the battery voltage detecting circuit 13 includes a battery 11 under-voltage detecting sub-circuit and/or a battery 11 over-voltage detecting sub-circuit connected to each other.

Figure 16:
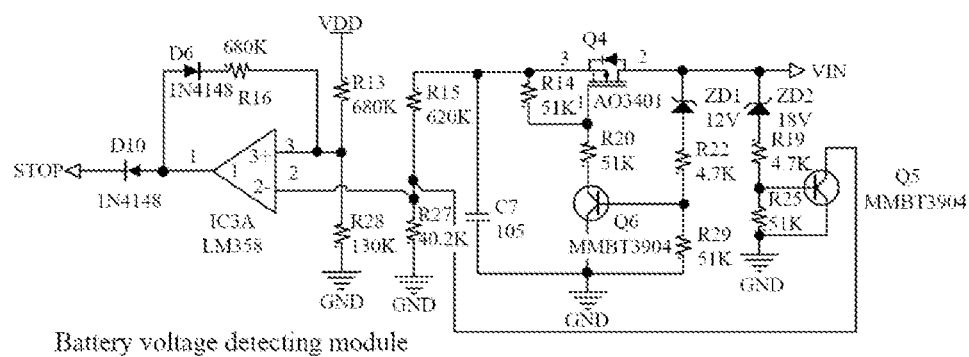
FIG. 16 is a schematic view of a circuit structure of a battery voltage detecting circuit provided in an embodiment of the present disclosure.

Referring to FIG. 16, FIG. 16 shows a schematic view of a circuit structure of the battery voltage detecting circuit 13. In the above, the battery voltage detecting circuit 13 is also called as a battery 11 voltage detecting module, and is specifically composed of peripheral components such as IC3A/R13/R28/R15/R27/Q4/Q6/ZD1/R22/R29/ZD2/R19/R25/Q5/D10. When the voltage of the battery 11 is too low or high, the voltage of PIN2 of the IC3A becomes low, so that a high level output from the PIN1 of the IC3A passes through the D22 to turn on the Q9, so that the PIN3 of the starting control module IC1A is at a low level, the relay K1 for output of clamp 200 is open.

In FIG. 16, the battery 11 under-voltage detecting sub-circuit includes: IC3A, D6, D10, R16, R13, R28, R27, R15, R14, Q4, R20, Q6, R29, R22, C7, and ZD1.

In FIG. 16, the battery 11 over-voltage detecting sub-circuit further includes: ZD2, R19, R25, and Q5.

Figure 17:
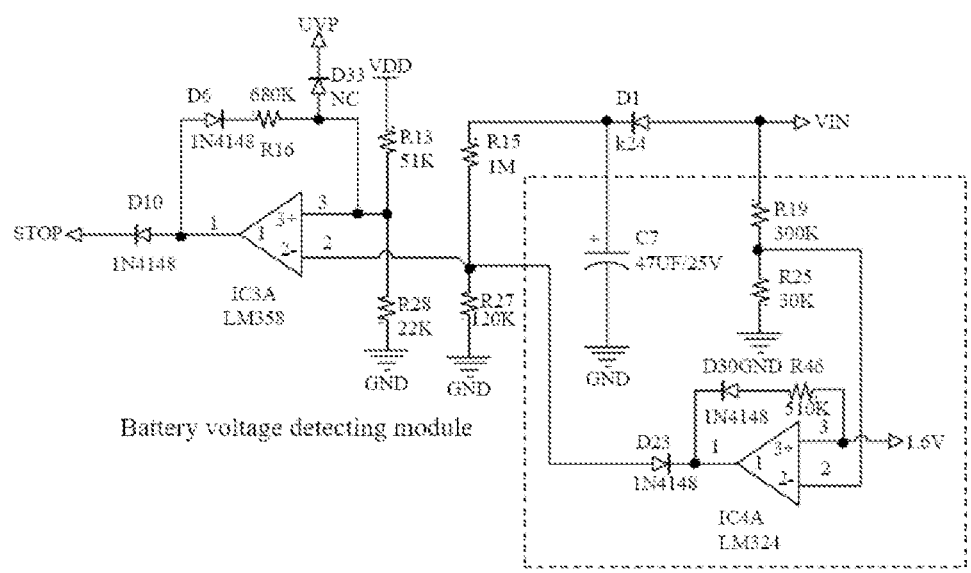
FIG. 17 is another schematic view of the circuit structure of the battery voltage detecting circuit provided in an embodiment of the present disclosure.

Referring to FIG. 17, a voltage detecting circuit of the battery 11 shown in FIG. 17 uses an operational amplifier as a hysteresis voltage comparator, and can solve the problem of flickering when switching the LED lamps when the high voltage protection is critical. Meanwhile, in order to save the costs, the IC4A originally for the load access detection is used as a high-voltage detecting circuit of the battery 11.

In the present embodiment, the working principle of the battery 11 voltage detecting module is as follows: the battery 11 voltage detecting module is composed of peripheral components, such as IC3A, R13, R28, R15, R27, R19, R25, R46, IC4A, D1, D23, D30, and D10. When the voltage of the battery 11 is too low or high, the voltage of PIN2 of the IC3A becomes low, so that a high level output from the PIN1 of the IC3A passes through D10 to turn on Q9, so that the PIN3 of the starting control module IC1A is at a low level, and the relay K1 for output of clamp 200 is open.

In FIG. 17, the battery 11 under-voltage detecting sub-circuit includes: IC3A, D6, D10, D33, R13, R28, R27, R15, D1, and C7.

In FIG. 17, the battery 11 over-voltage detecting sub-circuit further includes: R19, R25, IC4A, R46, D30, and D23.

As an optional embodiment, the battery voltage detecting circuit 13 includes:

a first access operational amplifier, having a positive input end being connected to one end of a $46^{th}$ resistor and a 1.6 V voltage end; a negative input end being connected to both one end of a $25^{th}$ resistor and one end of a $19^{th}$ resistor; and an output end being connected to both an output end of a $30^{th}$ diode and an output end of a $23^{rd}$ diode;

the $30^{th}$ diode, with an input end being connected to the other end of the $46^{th}$ resistor; and the $25^{th}$ resistor, with the other end being connected to the ground terminal.

As a further optional embodiment, the battery voltage detecting circuit 13 includes a battery 11 over-voltage detecting sub-circuit, and the battery 11 over-voltage detecting sub-circuit includes:

the first access operational amplifier, having the positive input end being connected to one end of the $46^{th}$ resistor and the 1.6 V voltage end; the negative input end being connected to both one end of the $25^{th}$ resistor and one end of the $19^{th}$ resistor; and the output end being connected to both the output end of the $30^{th}$ diode and the output end of the $23^{rd}$ diode;

the $30^{th}$ diode, with an input end being connected to the other end of the $46^{th}$ resistor; and the $25^{th}$ resistor, with the other end being connected to the ground terminal.

In the present embodiment, in order to save the costs, four pull-up resistors R35, R46, R24, and R37, i.e., R35 originally connected to the IC4B, R46 originally connected to the IC4C, R24 originally connected to the IC1A, and R37 originally connected to the IC1A, are all moved to other places for use.

As an optional embodiment, the portable standby starting device 100 further includes a voltage bias switch circuit.

As an optional embodiment, the portable standby starting device 100 further includes a voltage bias switch circuit, wherein the voltage bias switch circuit includes:

a $22^{th}$ resistor, wherein one end of the $22^{nd}$ resistor is connected to the four, i.e. a source of a fourth field-effect transistor, one end of a $37^{th}$ resistor, an emitter of a sixth triode, and an input end of a $28^{th}$ diode; the other end of the $22^{nd}$ resistor, a drain of the fourth field-effect transistor, and the voltage regulating circuit 12 are connected;

the fourth field-effect transistor, having a gate being connected to the other end of the $37^{th}$ resistor, an output end of a $27^{th}$ diode, and a collector of the sixth triode;

the $27^{th}$ diode, with an input end being connected to one end of a $14^{th}$ resistor;

the $14^{th}$ resistor, with the other end being connected to the drive voltage end;

the sixth triode, with a base being connected to the three, i.e. one end of a $20^{th}$ resistor, an output end of a $28^{th}$ diode, and one end of a $29^{th}$ resistor;

the $20^{th}$ resistor, with the other end being connected to the ground terminal;

the $29^{th}$ resistor, with the other end being connected to an output end of the $29^{th}$ diode; and the $29^{th}$ diode, with an input end being connected to the second access operational amplifier.

Figure 18:
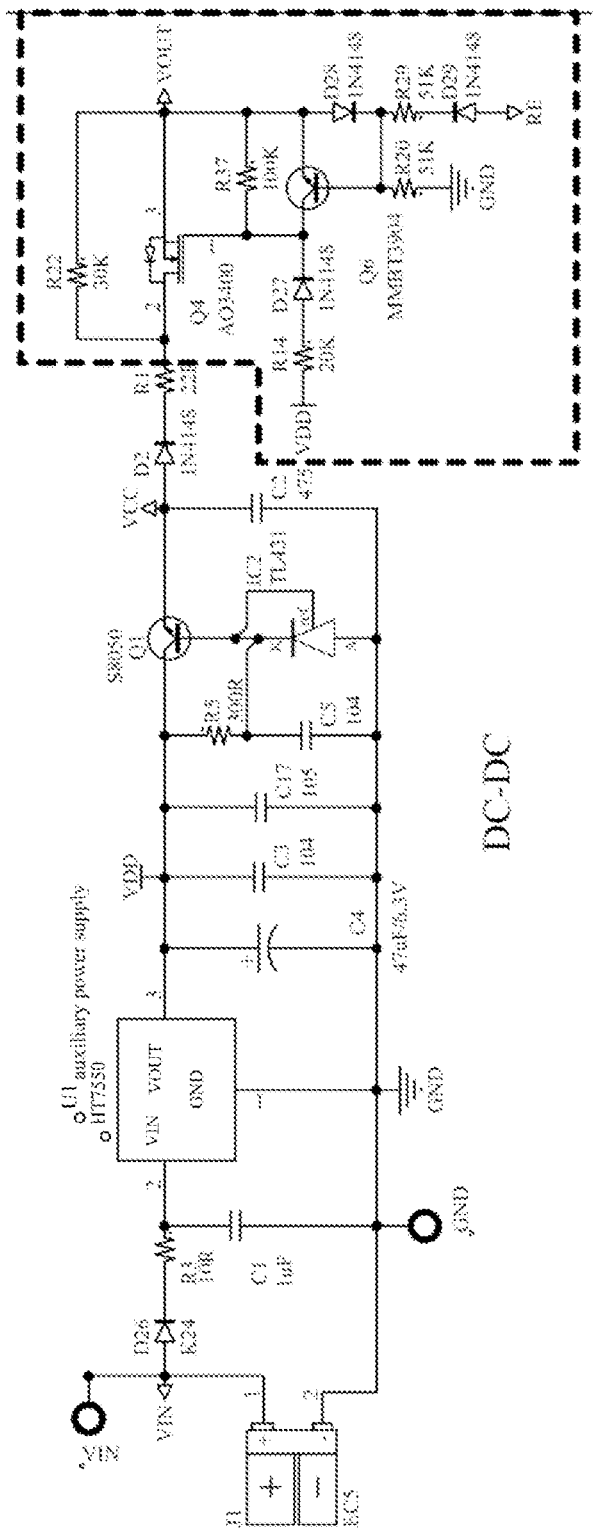
FIG. 18 is a schematic view of a circuit combination of a voltage bias switch circuit and a voltage regulating circuit provided in an embodiment of the present disclosure.

Referring to FIG. 18, an electronic switch circuit can be added to the circuit, so as to reduce the problem of excessive power consumption when U1 is reversely connected or short-circuited at an output end of the clamp 200.

In the present embodiment, the working principle of the bias voltage electronic switch circuit is as follows: the bias voltage electronic switch circuit is composed of R22, R14, R20, R29, R37, D27, D28, D29, Q4, Q6, etc. When reverse connection or short circuit occurs, a high level output from PIN7 of the IC4B passes through D29, R29, and R20 to turn on Q6, and Q4 is cut off, and the voltage output of the bias circuit is turned off, thus achieving the effect of reducing the power consumption of U1.

In the present embodiment, reference can be made to the contents of the accompanying drawings for the chip model, and details are not repeatedly described in the present embodiment.

It should be noted that terms of order ($xx^{th}$) described in the present embodiment correspondingly refer to elements in corresponding accompanying drawings, for example, the ninth triode is corresponding to Q9, and the $23^{rd}$ diode is corresponding to D23.

More particularly, the first access operational amplifier is corresponding to IC4A, the second access operational amplifier is corresponding to IC4B, the third access operational amplifier is corresponding to IC4C, and the fourth access operational amplifier is corresponding to IC4D; the first detection operational amplifier is corresponding to IC1A, the second detection operational amplifier is corresponding to IC1B, the third detection operational amplifier is corresponding to IC1C, and the fourth detection operational amplifier is corresponding to IC1D.

It can thus be seen that by implementing the portable standby starting device 100 for a vehicle described in the present embodiment, the detection and ignition for the vehicle load can be completed without any microprocessor 93; meanwhile, the portable standby starting device 100 further can constitute a complete device based on three parts of circuits, so as to achieve the effect of convenient ignition for the automobile.

Figure 19:
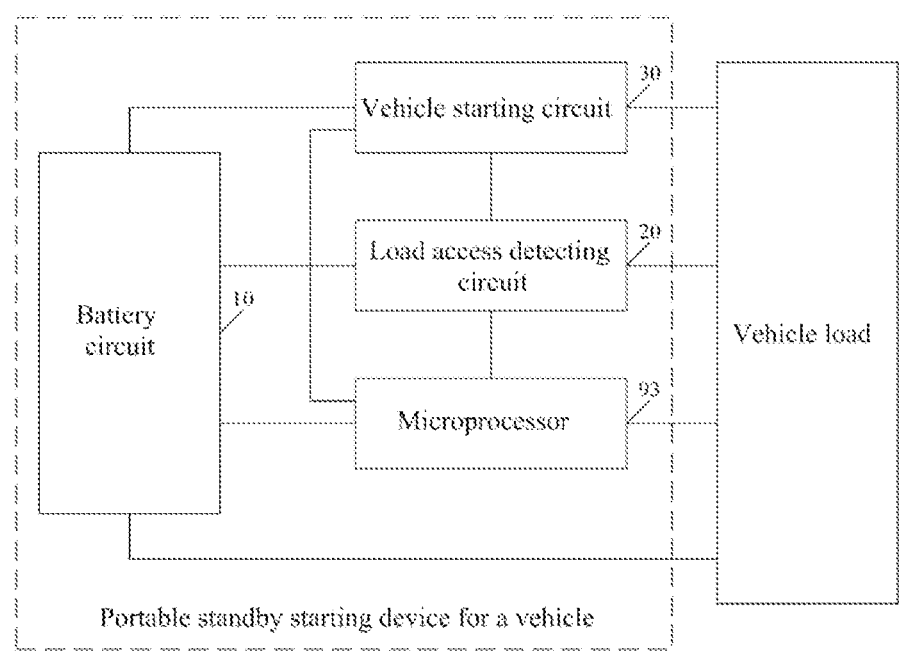
FIG. 19 is a structural schematic view of a portable standby starting device with a microprocessor provided in an embodiment of the present disclosure.

Referring to FIG. 19, FIG. 19 is a structural schematic view of a portable standby starting device for a vehicle provided in an embodiment of the present disclosure. In the above, the portable standby starting device 100 includes a battery circuit 10, a load access detecting circuit 20, a vehicle starting circuit 30, and a microprocessor 93, wherein the microprocessor 93 is coupled to the vehicle starting circuit 30 and is configured to generate a drive signal; and the vehicle starting circuit 30 is specifically configured to, when detecting the drive signal and a control signal, control the vehicle starting circuit 30 to output a vehicle starting current or not according to the drive signal and the control signal; and the vehicle starting current is used to perform an ignition operation for the vehicle.

As an optional embodiment, the load access detecting circuit 20 is specifically configured to, when a detected vehicle load connection state is a connected state, generate a starting control signal; or when the vehicle load connection state is an unconnected state, generate a starting prohibition signal;

the microprocessor 93 is specifically configured to generate a starting drive signal when the detected vehicle load connection state is the connected state; or generate a drive prohibition signal when the vehicle load connection state is an unconnected state;

the vehicle starting circuit 30 is specifically configured to, when detecting the starting drive signal and the starting control signal, control the vehicle starting circuit 30 to output the vehicle starting current; and the vehicle starting circuit 30 is further specifically configured to, when detecting the starting prohibition signal or the drive prohibition signal, control the vehicle starting circuit 30 to be prohibited from outputting the vehicle starting current.

As an optional embodiment, the portable standby starting device 100 further includes a reverse-connection short-circuit detecting circuit 40, a load voltage detecting circuit 50, a reverse-charge detecting circuit 60, and an over-current detecting circuit 70, wherein the microprocessor 93 is further configured to acquire the starting prohibition signal generated by any one of the reverse-connection short-circuit detecting circuit 40, the load voltage detecting circuit 50, the reverse-charge detecting circuit 60, and the over-current detecting circuit 70; and the microprocessor 93 is further configured to send the starting prohibition signal to the vehicle starting circuit 30.

As an optional embodiment, the portable standby starting device further includes a reverse-connection short-circuit detecting circuit 40, wherein the reverse-connection short-circuit detecting circuit 40 is coupled to the load access detecting circuit 20 and is configured to detect whether the vehicle load is in a reverse-connection state or a short-circuit state, and generate the starting prohibition signal when the vehicle load is in the reverse-connection state or the short-circuit state;

the microprocessor 93 is further configured to generate the drive prohibition signal when detecting the starting prohibition signal; and the vehicle starting circuit 30 is further configured to, when detecting the starting prohibition signal or the drive prohibition signal, control the vehicle starting circuit 30 to be prohibited from outputting the vehicle starting current.

As an optional embodiment, the portable standby starting device further includes a load voltage detecting circuit 50, wherein the load voltage detecting circuit 50 is coupled to the load access detecting circuit 20, and is configured to detect whether the vehicle load is in a high-voltage state or a low-voltage state, and generate the starting prohibition signal when the vehicle load is in the high-voltage state or the low-voltage state;

the microprocessor 93 is further configured to generate the drive prohibition signal when detecting the starting prohibition signal; and the vehicle starting circuit 30 is further configured to, when detecting the starting prohibition signal or the drive prohibition signal, control the vehicle starting circuit 30 to be prohibited from outputting the vehicle starting current.

As an optional embodiment, the portable standby starting device further includes a reverse-charge detecting circuit 60, wherein the reverse-charge detecting circuit 60 is coupled to the load access detecting circuit 20, and is configured to detect whether the voltage of the vehicle load is higher than an output voltage of the battery circuit 10 or not, and generate the starting prohibition signal when the voltage of the vehicle load is higher than the output voltage of the battery circuit 10;

the microprocessor 93 is further configured to generate the drive prohibition signal when detecting the starting prohibition signal; and the vehicle starting circuit 30 is further configured to, when detecting the starting prohibition signal or the drive prohibition signal, control the vehicle starting circuit 30 to be prohibited from outputting the vehicle starting current.

As an optional embodiment, the portable standby starting device further includes an over-current detecting circuit 70, wherein the over-current detecting circuit 70 is coupled to the vehicle starting circuit 30, and is configured to detect whether the vehicle starting current output by the vehicle starting circuit 30 is greater than a preset current threshold value, and generate the starting prohibition signal when the vehicle starting current output by the vehicle starting circuit 30 is greater than the preset current threshold value;

the microprocessor 93 is further configured to generate the drive prohibition signal when detecting the starting prohibition signal; and the vehicle starting circuit 30 is further configured to, when detecting the starting prohibition signal or the drive prohibition signal, control the vehicle starting circuit 30 to be prohibited from outputting the vehicle starting current.

As an optional embodiment, the portable standby starting device 100 further includes a voltage-stabilized power supply, wherein the voltage-stabilized power supply is coupled to the microprocessor 93, and is configured to supply power to the microprocessor 93.

Figure 20:
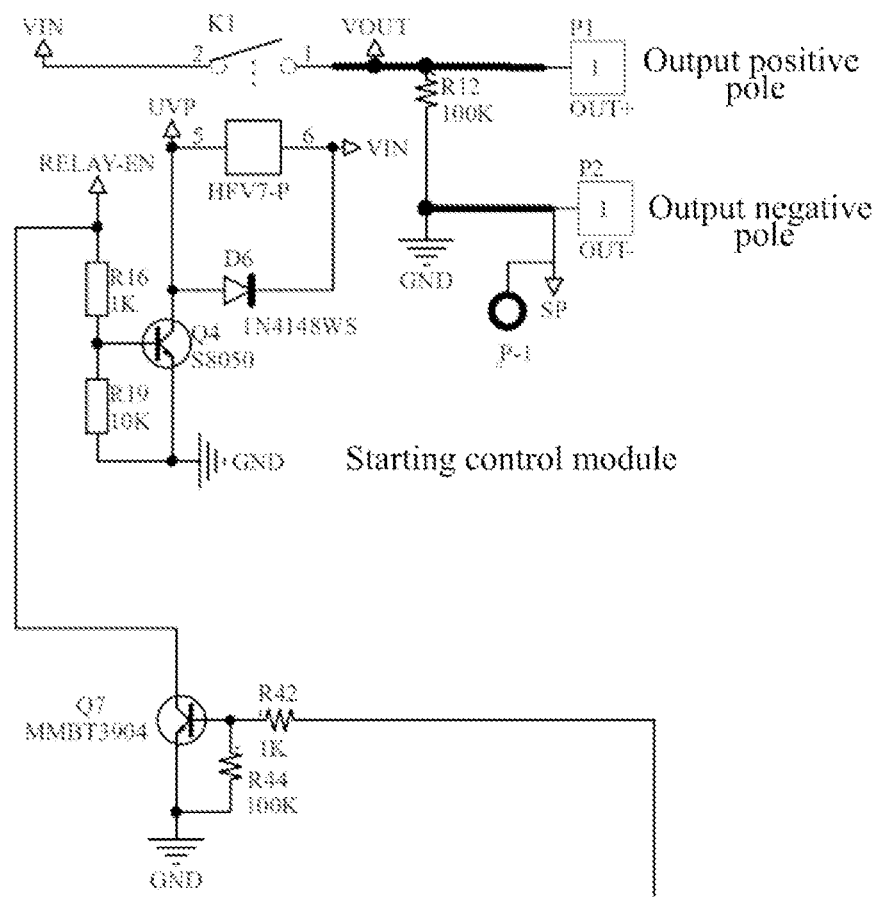
FIG. 20 is a schematic view of a circuit structure of a vehicle starting circuit in case of having a microprocessor provided in an embodiment of the present disclosure.

Referring to FIG. 20, FIG. 20 shows a schematic view of a circuit structure of the vehicle starting circuit. The vehicle starting circuit is also called as a starting control module. In the above, the vehicle starting circuit includes a first relay K1, a fourth triode Q4, a seventh triode Q7, an 11th triode Q11, a 12th resistor R12, a 16th resistor R16, a 19th resistor R19, a 42nd resistor R42, a 44th resistor R44, a 77th resistor R77, and a sixth diode D6, wherein
- an armature of the first relay K1 is connected to one end of the 12th resistor R12;
- one end of the 12th resistor R12 is an output positive pole, and the other end of the 12th resistor R12 is an output negative pole;
- an electromagnet of the first relay K1 is coupled to the sixth diode D6;
- an input end of the sixth diode D6 is connected to a collector of the fourth triode Q4;
- one end of the 19th resistor R19 is connected to a base of the fourth triode Q4;
- the other end of the 19th resistor R19 is connected to an emitter of the fourth triode Q4;
- the emitter of the fourth triode Q4 is grounded;
- one end of the 16th resistor R16 is connected to the base of the fourth triode Q4;
- one end of the 16th resistor R16 is further connected to a collector of the seventh triode Q7;
- the other end of the 16th resistor R16 is connected to an emitter of the 11th triode Q11;
- a collector of the 11th triode Q11 is connected to the microprocessor 93;
- one end of the 77th resistor R77 is connected to a base of the 11th triode Q11;
- one end of the 77th resistor R77 is further connected to the load access detecting circuit 20;
- the other end of the 77th resistor R77 is grounded;
- one end of the 42nd resistor R42 is connected to a base of the seventh triode Q7;
- the other end of the 42nd resistor R42 is connected to the microprocessor 93;
- one end of the 44th resistor R44 is connected to the base of the seventh triode Q7;
- the other end of the 44th resistor R44 is connected to an emitter of the seventh triode Q7; and
- the emitter of the seventh triode Q7 is grounded.

In the present embodiment, when the first relay K1 is closed, a positive pole of the battery 11 is connected to the output positive pole of the clamp 200 through the relay, and the output positive and negative poles of the clamp 200 are correctly connected to the battery 11 of the automobile, respectively, then the ignition can be performed.

Figure 21:
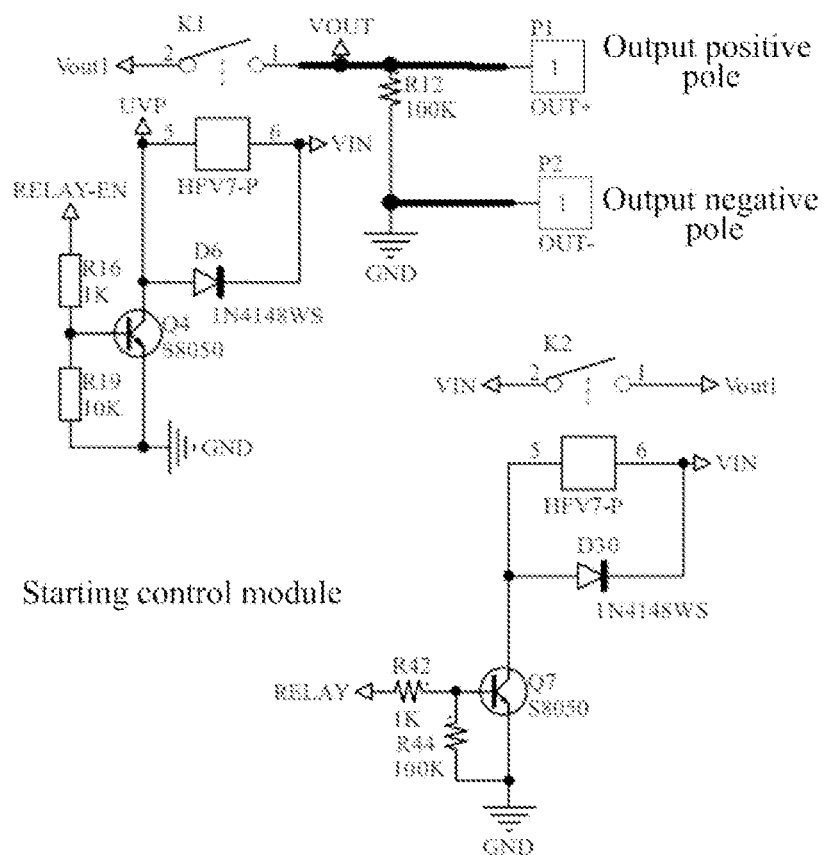
FIG. 21 is another schematic view of the circuit structure of the vehicle starting circuit in case of having a microprocessor provided in an embodiment of the present disclosure.

Referring to FIG. 21, FIG. 21 shows another schematic view of the circuit structure of the vehicle starting circuit. The vehicle starting circuit is also called as a starting control module. In the above, the vehicle starting circuit includes a first relay K1, a relay K2, a fourth triode Q4, a seventh triode Q7, a 12th resistor R12, a 16th resistor R16, a 19th resistor R19, a 42nd resistor R42, a 44th resistor R44, a sixth diode D6, and a 29th diode D29, wherein
- an armature of the first relay K1 is connected to one end of the 12th resistor R12;
- one end of the 12th resistor R12 is an output positive pole, and the other end of the 12th resistor R12 is an output negative pole;
- an electromagnet of the first relay K1 is coupled to the sixth diode D6;
- an input end of the sixth diode D6 is connected to a collector of the fourth triode Q4;
- one end of the 19th resistor R19 is connected to a base of the fourth triode Q4;
- the other end of the 19th resistor R19 is connected to an emitter of the fourth triode Q4;
- the emitter of the fourth triode Q4 is grounded;
- one end of the 16th resistor R16 is connected to the base of the fourth triode Q4;
- the other end of the 16th resistor R16 is connected to the microprocessor 93;
- an armature of the second relay K2 is coupled to the armature of the first relay K1;
- an electromagnet of the second relay K2 is coupled to the 29th diode D29;
- a collector of the seventh triode Q7 is connected to an input end of the 29th diode D29;
- one end of the 42nd resistor R42 is connected to a base of the seventh triode Q7;
- the other end of the 42nd resistor R42 is connected to the microprocessor 93;
- one end of the 44th resistor R44 is connected to the base of the seventh triode Q7;
- the other end of the 44th resistor R44 is connected to an emitter of the seventh triode Q7; and
- the emitter of the seventh triode Q7 is grounded.

In the present embodiment, when the first relay K1 or the second relay K2 is closed, a positive pole of the battery 11 is connected to the output positive pole of the clamp 200 through the relay, and the output positive and negative poles of the clamp 200 are correctly connected to the battery 11 of the automobile, respectively, then the ignition can be performed.

Figure 22:
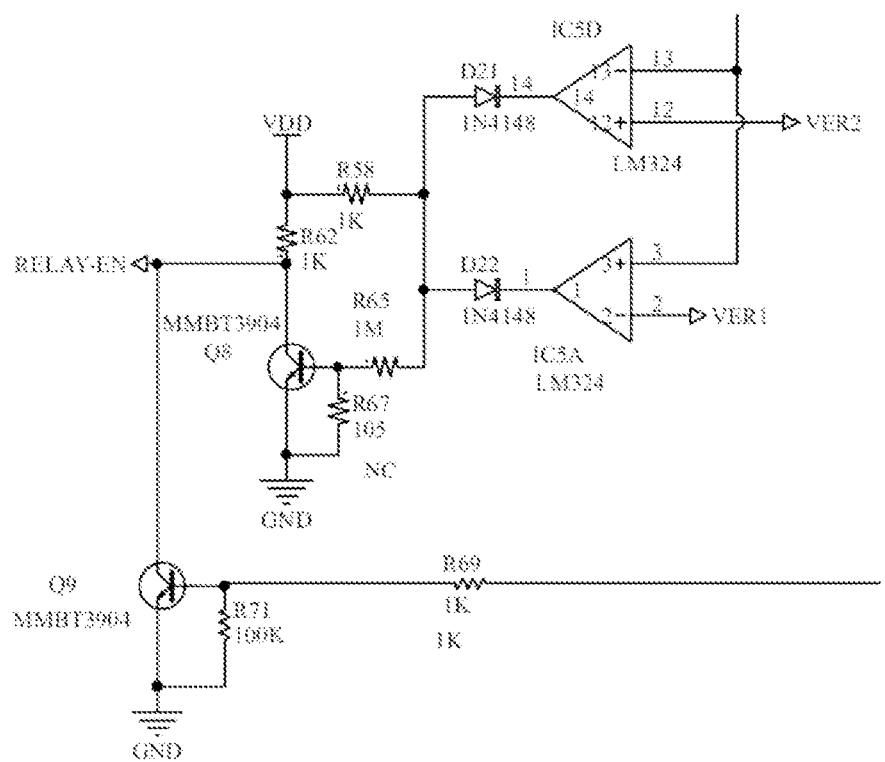
FIG. 22 is a schematic view of a circuit structure of a load access detecting circuit in case of having a microprocessor provided in an embodiment of the present disclosure.

Referring to FIG. 22, FIG. 22 shows a schematic view of a circuit structure of the load access detecting circuit 20. The load access detecting circuit 20 is also called as a load access detecting module. In the above, the load access detecting circuit 20 includes a first access operational amplifier IC5A, a fourth access operational amplifier IC5D, a 21st diode D21, a 22nd diode D22, a 58th resistor R58, a 62nd resistor R62, a 65th resistor R65, a 67th resistor R67, a 69th resistor R69, a 71st resistor R71, an eighth triode Q8, and a ninth triode Q9, wherein
- a positive input end of the first access operational amplifier IC5A is connected to the reverse-connection short-circuit detecting circuit 40;
- a negative input end of the first access operational amplifier IC5A is connected to the reverse-connection short-circuit detecting circuit 40 and the load voltage detecting circuit 50 through a coupling circuit;
- a negative input end of the fourth access operational amplifier IC5D is connected to the reverse-connection short-circuit detecting circuit 40;
- a positive input end of the fourth access operational amplifier IC5D is connected to the reverse-connection short-circuit detecting circuit 40 and the load voltage detecting circuit 50 through a coupling circuit;
- an output end of the 21st diode D21 is connected to an output end of the fourth access operational amplifier IC5D;
- an output end of the 22nd diode D22 is connected to an output end of the first access operational amplifier IC5A;
- an input end of the 21st diode D21 is connected to the microprocessor 93;
- an input end of the 22nd diode D22 is connected to the microprocessor 93;
- one end of a 58th resistor R58 is connected to the microprocessor 93;
- the other end of the 58th resistor R58 is connected to one end of the 62nd resistor R62;
- the other end of the 62nd resistor R62 is connected to the vehicle starting circuit;

one end of the 65$^{th}$ resistor R65 is connected to the microprocessor 93;

the other end of the 65$^{th}$ resistor R65 is connected to a base of the eighth triode Q8;

one end of the 67$^{th}$ resistor R67 is connected to the base of the eighth triode Q8;

the other end of the 67$^{th}$ resistor R67 is connected to an emitter of the eighth triode Q8;

the emitter of the eighth triode Q8 is grounded;

a collector of the eighth triode Q8 is connected to the other end of the 62$^{nd}$ resistor R62;

a collector of the ninth triode Q9 is connected to the other end of the 62$^{nd}$ resistor R62;

an emitter of the ninth triode Q9 is grounded;

one end of the 71$^{st}$ resistor R71 is connected to a base of the ninth triode Q9;

the other end of the 71$^{st}$ resistor R71 is grounded;

one end of a 69$^{th}$ resistor R69 is connected to the base of the ninth triode Q9; and the other end of the 69$^{th}$ resistor R69 is connected to the microprocessor 93.

Figure 23:
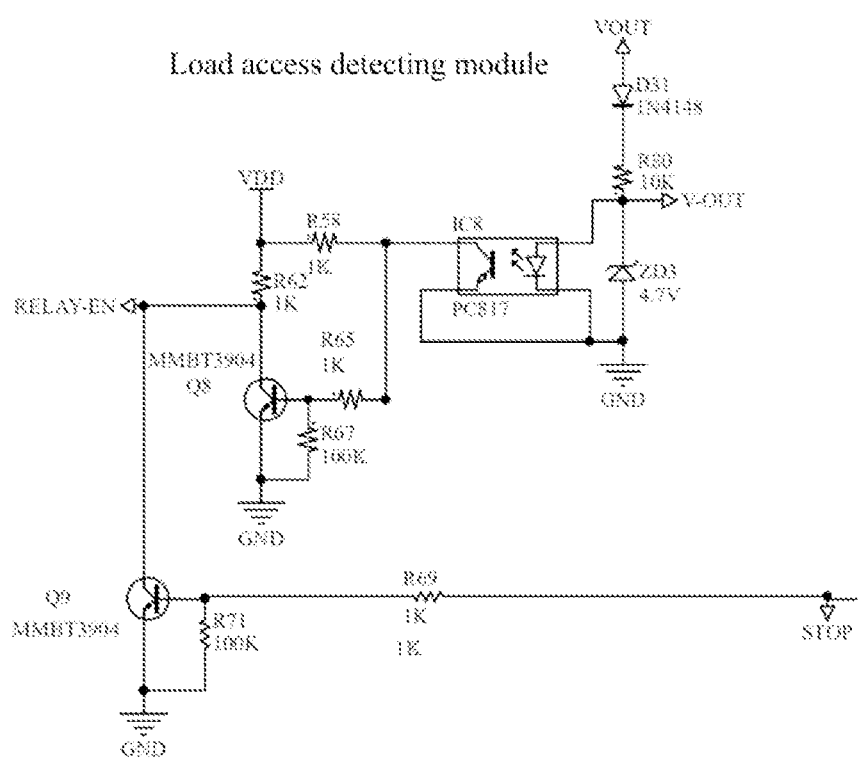
FIG. 23 is another schematic view of the circuit structure of the load access detecting circuit in case of having a microprocessor provided in an embodiment of the present disclosure.

Referring to FIG. 23, FIG. 23 shows another schematic view of the circuit structure of the load access detecting circuit 20. The load access detecting circuit 20 is also called as a load access detecting module. In the above, the load access detecting circuit 20 includes a 31$^{st}$ diode D31, a 58$^{th}$ resistor R58, a 62$^{nd}$ resistor R62, a 69$^{th}$ resistor R69, a 71$^{st}$ resistor R71, an 80$^{th}$ resistor R80, a third voltage stabilizing diode ZD3, an eighth photoelectric coupler IC8, an eighth triode Q8, and a ninth triode Q9, wherein an input end of the 31$^{st}$ diode D31 is connected to the microprocessor 93;

an output end of the 31$^{st}$ diode D31 is connected to one end of the 80$^{th}$ resistor R80;

the other end of the 80$^{th}$ resistor R80 is connected to the eighth photoelectric coupler IC8;

the other end of the 80$^{th}$ resistor R80 is connected to the output end of the third voltage stabilizing diode ZD3;

the third voltage stabilizing diode ZD3 is coupled to the eighth photoelectric coupler IC8;

an input end of the third voltage stabilizing diode ZD3 is grounded;

one end of the 58$^{th}$ resistor R58 is connected to the reverse-connection short-circuit detecting circuit 40;

the other end of the 58$^{th}$ resistor R58 is connected to one end of the 62 resistor R62;

the other end of the 62$^{nd}$ resistor R62 is connected to the vehicle starting circuit;

one end of the 65$^{th}$ resistor R65 is connected to the reverse-connection short-circuit detecting circuit 40;

the other end of the 65$^{th}$ resistor R65 is connected to a base of the eighth triode Q8;

one end of the 67$^{th}$ resistor R67 is connected to the base of the eighth triode Q8;

the other end of the 67$^{th}$ resistor R67 is connected to an emitter of the eighth triode Q8;

the emitter of the eighth triode Q8 is grounded;

a collector of the eighth triode Q8 is connected to the other end of the 62$^{nd}$ resistor R62;

a collector of the ninth triode Q9 is connected to the other end of the 62$^{nd}$ resistor R62;

the emitter of the ninth triode Q9 is grounded;

one end of the 71$^{st}$ resistor R71 is connected to a base of the ninth triode Q9;

the other end of the 71$^{st}$ resistor R71 is grounded;

one end of the 69$^{th}$ resistor R69 is connected to the base of the ninth triode Q9; and the other end of the 69$^{th}$ resistor R69 is connected to the microprocessor 93.

Figure 24:
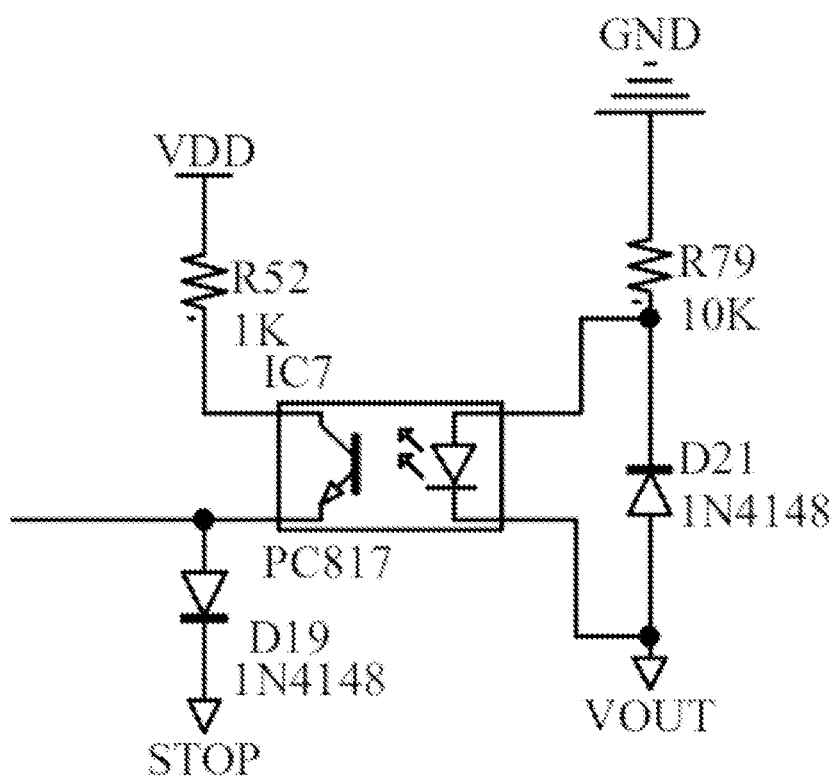
FIG. 24 is a schematic view of a circuit structure of a reverse-connection short-circuit detecting circuit in case of having a microprocessor provided in an embodiment of the present disclosure.

Referring to FIG. 24, FIG. 24 shows a schematic view of a circuit structure of the reverse-connection short-circuit detecting circuit 40. The reverse-connection short-circuit detecting circuit 40 is also called as a reverse-connection short-circuit detecting module. In the above, the reverse-connection short-circuit detecting circuit 40 includes a seventh photoelectric coupler IC7, a 52$^{nd}$ resistor R52, a 79$^{th}$ resistor R79, a 21$^{st}$ diode D21, and a 19$^{th}$ diode D19, wherein one end of the 79$^{th}$ resistor R79 is grounded;

the other end of the 79$^{th}$ resistor R79 is connected to an output end of the 21$^{st}$ diode D21;

an input end of the 21$^{st}$ diode D21 is grounded;

the seventh photoelectric coupler IC7 is coupled to a 21$^{st}$ diode D21;

one end of the 52$^{nd}$ resistor R52 is connected to the microprocessor 93;

the other end of the 52$^{nd}$ resistor R52 is connected to the seventh photoelectric coupler IC7;

an input end of the 19$^{th}$ resistor R19 is connected to the seventh photoelectric coupler IC7;

the input end of the 19$^{th}$ resistor R19 is connected to the load access detecting circuit 20; and an output end of the 19$^{th}$ resistor R19 is connected to the microprocessor 93.

Figure 25:
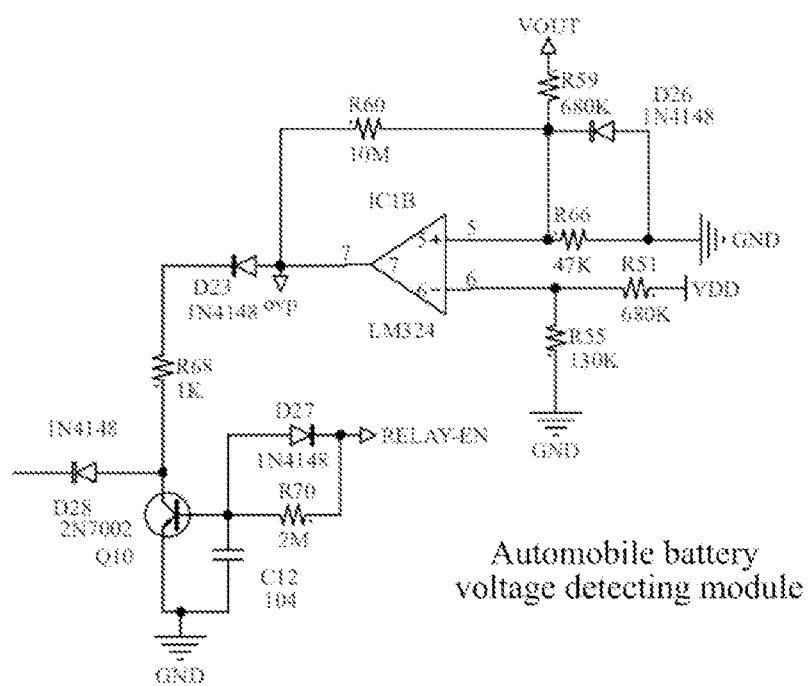
FIG. 25 is a schematic view of a circuit structure of a load voltage detecting circuit in case of having a microprocessor provided in an embodiment of the present disclosure.

Refer to FIG. 25, FIG. 25 shows a schematic view of a circuit structure of the load voltage detecting circuit 50. The load voltage detecting circuit 50 is also called as a voltage detecting module of the battery of the automobile. In the above, the load voltage detecting circuit 50 includes a 27$^{th}$ resistor R27, a 51$^{st}$ resistor R51, a 55$^{th}$ resistor R55, a 59$^{th}$ resistor 259, a 60$^{th}$ resistor R60, a 66$^{th}$ resistor R66, a 68$^{th}$ resistor R68, a 70$^{th}$ resistor R70, a 12$^{th}$ capacitor C12, a 23$^{rd}$ diode D23, a 26$^{th}$ diode D26, a 27$^{th}$ diode D27, a 28$^{th}$ diode D28, a tenth triode Q10, and a load detection operational amplifier IC1B, wherein one end of the 59$^{th}$ resistor R59 is connected to a battery circuit 10;

the other end of the 59$^{th}$ resistor R59 is connected to a positive input end of the load detection operational amplifier IC1B;

an output end of the 26$^{th}$ diode D26 is connected to the positive input end of the load detection operational amplifier IC1B;

an input end of the 26$^{th}$ diode D26 is grounded;

one end of the 66$^{th}$ resistor R66 is grounded;

the other end of the 66$^{th}$ resistor R66 is connected to the positive input end of the load detection operational amplifier IC1B;

one end of the 51$^{st}$ resistor R51 is connected to the microprocessor 93;

the other end of the 51$^{st}$ resistor R51 is connected to a negative input end of the load detection operational amplifier IC1B;

one end of the 55$^{th}$ resistor R55 is grounded;

the other end of the 55$^{th}$ resistor R55 is connected to the negative input end of the load detection operational amplifier IC1B;

one end of the 60$^{th}$ resistor R60 is connected to the positive input end of the load detection operational amplifier IC1B;

the other end of the 60$^{th}$ resistor R60 is connected to an output end of the load detection operational amplifier IC1B;

the output end of the load detection operational amplifier IC1B is connected to the microprocessor 93;

an input end of the 23$^{rd}$ diode D23 is connected to the output end of the load detection operational amplifier IC1B;

the output end of the 23$^{rd}$ diode D23 is connected to one end of the 68 resistor R68;

the other end of the 68$^{th}$ resistor R68 is connected to a collector of the tenth triode Q10;

an input end of the 28$^{th}$ diode D28 is connected to a collector of the tenth triode Q10;

an output end of the 28$^{th}$ diode D28 is connected to the microprocessor 93;

one end of the 12$^{th}$ capacitor C12 is connected to a base of the tenth triode Q10;

the other end of the 12$^{th}$ capacitor C12 is connected to an emitter of the tenth triode Q10;

the other end of the 12$^{th}$ capacitor C12 is further grounded;

one end of the 70$^{th}$ resistor R70 is connected to a base of the tenth triode Q10;

the other end of the 70$^{th}$ resistor R70 is connected to the vehicle starting circuit;

an input end of the 27$^{th}$ diode D27 is connected to the base of the tenth triode Q10; and an output end of the 27$^{th}$ diode D27 is connected to the vehicle starting circuit.

Figure 26:
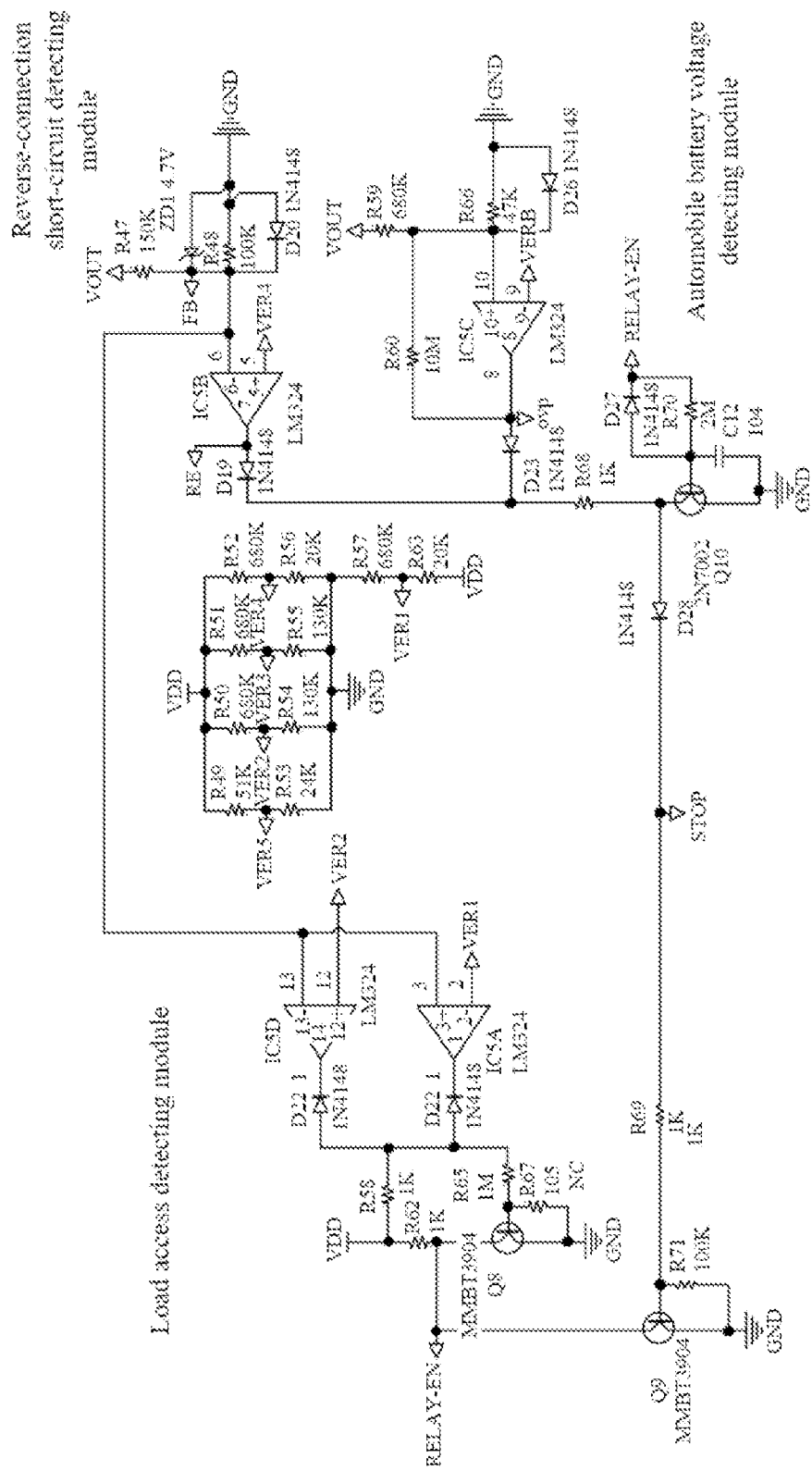
FIG. 26 is a schematic view of a combined circuit structure of the three, i.e., the load access detecting circuit, the load voltage detecting circuit, and the reverse-connection short-circuit detecting circuit in case of having a microprocessor provided in an embodiment of the present disclosure.

Referring to FIG. 26, FIG. 26 shows a schematic view of a combined circuit structure of the three, i.e. the load access detecting circuit 20, the reverse-connection short-circuit detecting circuit 40, and the load voltage detecting circuit 50. It should be understood that what is shown in FIG. 26 is not a combined schematic view of FIG. 23, FIG. 24, and FIG. 25, but is a schematic view of an independent and complete circuit structure that can be implemented. Thus, no matter which structure is used, the effect achieved thereby is the same.

Figure 27:
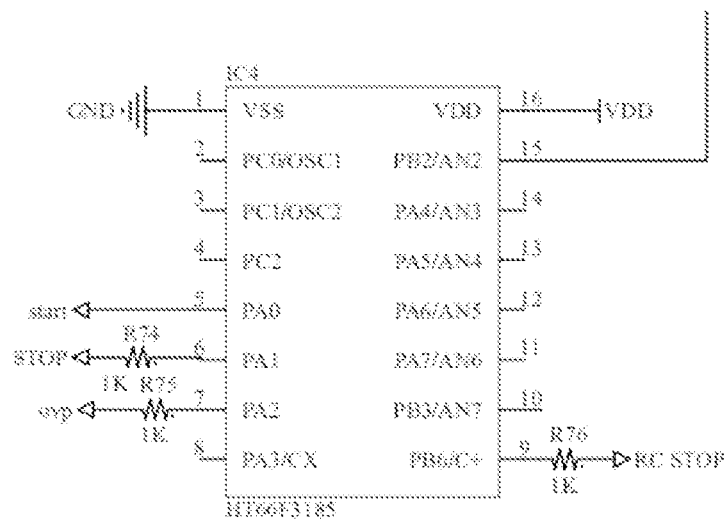
FIG. 27 is a structural schematic view of the microprocessor provided in an embodiment of the present disclosure.

Referring to FIG. 27, FIG. 27 shows a structural schematic view of a microprocessor 93. In the above, the microprocessor 93 is also called as a processor module. The connection relationships between the microprocessor 93 and other circuits may be learned with reference to various pins shown in FIG. 9.

In the present embodiment, the portable standby starting device 100 further includes the reverse-charge detecting circuit 60 and the over-current detecting circuit 70, wherein the reverse-charge detecting circuit 60 is coupled to the load access detecting circuit 20 and the microprocessor 93, and is configured to detect whether the voltage of the vehicle load is higher than the output voltage of the battery circuit 10 or not, and control the vehicle starting circuit to be prohibited from outputting the vehicle starting current when the voltage of the vehicle load is higher than the output voltage of the battery circuit 10; and the over-current detecting circuit 70 is coupled to the vehicle starting circuit 30 and the microprocessor 93, and is configured to detect whether the vehicle starting current output by the vehicle starting circuit is greater than a preset current threshold value, and control the vehicle starting circuit to be prohibited from outputting the vehicle starting current when the vehicle starting current output by the vehicle starting circuit is greater than the preset current threshold value.

Figure 28:
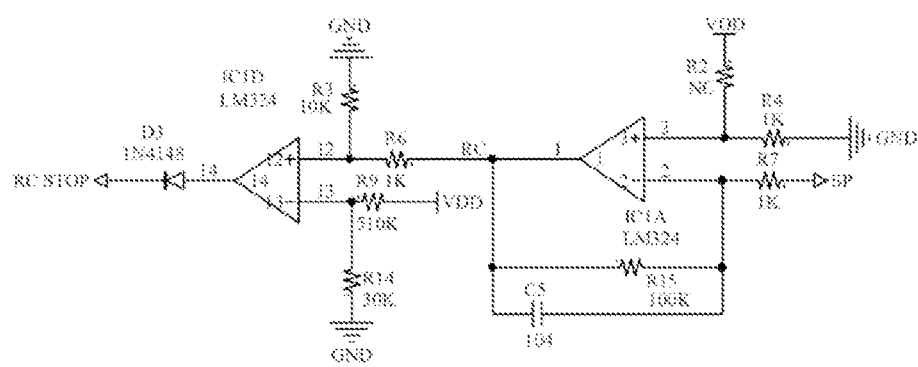
FIG. 28 is a schematic view of a circuit structure of a reverse-charge detecting circuit in case of having a microprocessor provided in an embodiment of the present disclosure.

Referring to FIG. 28, FIG. 28 shows a schematic view of a circuit structure of a reverse-charge detecting circuit 60. The reverse-charge detecting circuit 60 is also called as a reverse-charge detecting module.

Figure 29:
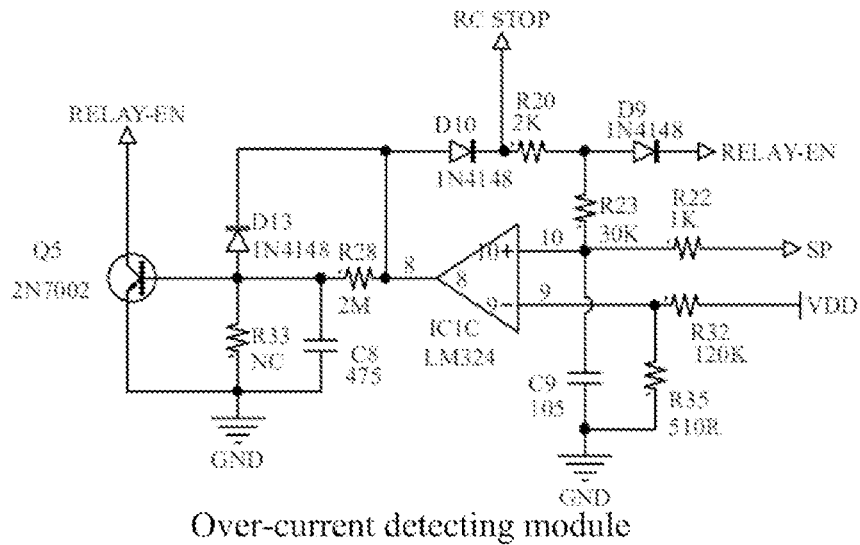
FIG. 29 is a schematic view of a circuit structure of an over-current detecting circuit in case of having a microprocessor provided in an embodiment of the present disclosure.

Referring to FIG. 29, FIG. 29 shows a schematic view of a circuit structure of an over-current detecting circuit 70. The over-current detecting circuit 70 is also called as an over-current detecting module.

In the present embodiment, the battery circuit 10 includes the battery 11, a voltage regulating circuit 12, and a battery voltage detecting circuit 13, wherein the battery 11 is coupled to the voltage regulating circuit 12 and the battery voltage detecting circuit 13, and is configured to supply power to other circuits;

the voltage regulating circuit 12 is configured to regulate an output voltage of the battery 11; and the battery voltage detecting circuit 13 is configured to detect whether the battery 11 is in a high-voltage state or a low-voltage state, and control the vehicle starting circuit 30 to be prohibited from outputting the vehicle starting current when the battery 11 is in the high-voltage state or the low-voltage state.

Figure 30:
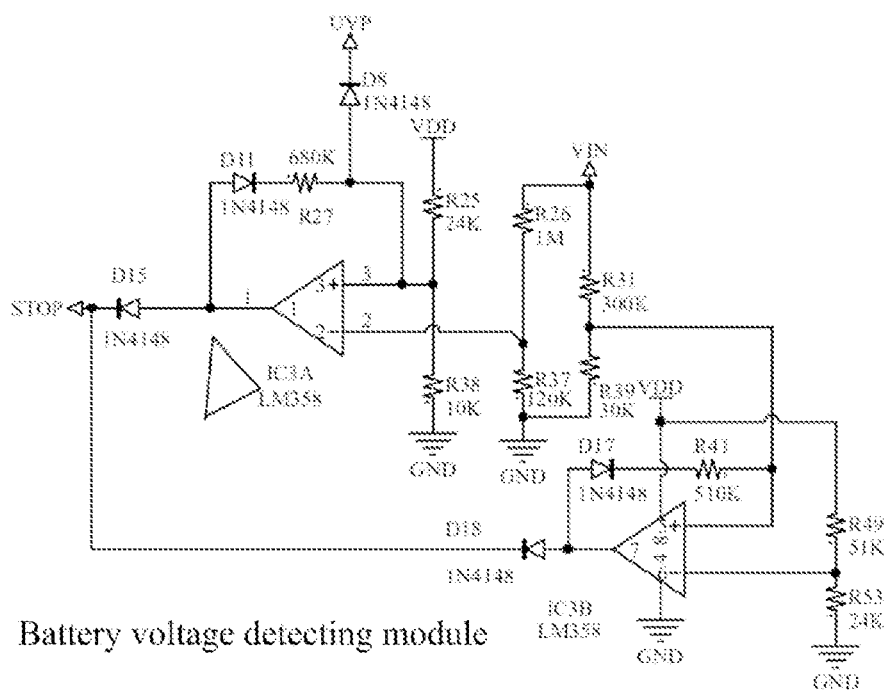
FIG. 30 is a schematic view of a circuit structure of a battery voltage detecting circuit in case of having a microprocessor provided in an embodiment of the present disclosure.

Referring to FIG. 30, FIG. 30 shows a schematic view of a circuit structure of the battery voltage detecting circuit 13. The battery voltage detecting circuit 13 is also called as a battery 11 voltage detecting module. In the above, the battery voltage detecting circuit 13 includes a first detection operational amplifier IC3A, a second detection operational amplifier IC3B, an eighth diode D8, an 11$^{th}$ diode D11, a 15$^{th}$ diode D15, a 17$^{th}$ diode D17, an 18$^{th}$ diode D18, a 25$^{th}$ resistor R25, a 26$^{th}$ resistor R26, a 27$^{th}$ resistor R27, a 31$^{st}$ resistor R31, a 37$^{th}$ resistor R37, a 38$^{th}$ resistor R38, a 39$^{th}$ resistor R39, a 41$^{st}$ resistor R41, a 49$^{th}$ resistor R49, and a 53$^{rd}$ resistor R53, wherein one end of the 53th resistor R53 is grounded;

the other end of the 53$^{rd}$ resistor R53 is connected to a negative input end of the second detection operational amplifier IC3B;

one end of the 49$^{th}$ resistor R49 is connected to the negative input end of the second detection operational amplifier IC3B;

the other end of the 49$^{th}$ resistor R49 is connected to the microprocessor 93;

one end of the 41$^{st}$ resistor R41 is connected to a positive input end of the second detection operational amplifier IC3B;

the other end of the 41$^{st}$ resistor R41 is connected to an output end of the 17$^{th}$ diode D17;

an input end of the 17$^{th}$ diode D17 is connected to an output end of the second detection operational amplifier IC3B;

an input end of the 18$^{th}$ diode D18 is connected to the output end of the second detection operational amplifier IC3B;

an output end of the 18$^{th}$ diode D18 is connected to the microprocessor 93;

one end of the 31$^{st}$ resistor R31 is connected to the positive input end of the second detection operational amplifier IC3B;

the other end of the 31$^{st}$ resistor R31 is connected to one end of the 26$^{th}$ resistor R26;

the other end of the 26$^{th}$ resistor R26 is connected to the negative input end of the first detection operational amplifier IC3A;

one end of the 39$^{th}$ resistor R39 is connected to the positive input end of the second detection operational amplifier IC3B;

the other end of the 39$^{th}$ resistor R39 is connected to one end of the 37$^{th}$ resistor;

the other end of the 39$^{th}$ resistor R39 is further grounded;

the other end of the 37$^{th}$ resistor R37 is connected to the negative input end of the first detection operational amplifier IC3A;

one end of the 38$^{th}$ resistor R38 is grounded;

the other end of the 38$^{th}$ resistor R38 is connected to the positive input end of the first detection operational amplifier IC3A;

one end of the 25$^{th}$ resistor R25 is connected to the microprocessor 93;

the other end of the 25$^{th}$ resistor R25 is connected to the positive input end of the first detection operational amplifier IC3A;

an output end of the eighth diode D8 is connected to the vehicle starting circuit;

an input end of the eighth diode D8 is connected to the positive input end of the first detection operational amplifier IC3A;

one end of the 27$^{th}$ resistor R27 is connected to the positive input end of the first detection operational amplifier IC3A;

the other end of the 25$^{th}$ resistor R25 is connected to the output end of the 11$^{th}$ diode D11;

an input end of the 11$^{th}$ diode D11 is connected to an output end of the first detection operational amplifier IC3A;

an input end of the 15$^{th}$ diode D15 is connected to the output end of the first detection operational amplifier IC3A; and an output end of the 15$^{th}$ diode D15 is connected to the microprocessor 93.

In the present embodiment, reference can be made to the contents of the accompanying drawings for the chip model, and details are not repeatedly described in the present embodiment.

It should be understood that various circuits controlled by the microprocessor 93 described in the present embodiment can be adaptively replaced with circuits without the control of the microprocessor 93. It can be understood that circuits with the same function in different embodiments may use any one of the specific circuit structures mentioned, and combinations thereof will not be repeatedly described in the present embodiment.

In the present embodiment, the portable standby starting device 100 for a vehicle further includes a starting control power supply. The starting control power supply is electrically connected to the vehicle starting circuit 30 and the load access detecting circuit 20, respectively.

The starting control power supply is configured to supply power to the vehicle starting circuit 30 or control the battery circuit 10 to supply power to the vehicle starting circuit 30. Specifically, the starting control power supply may control on and off of the vehicle starting circuit 30 according to the drive signal and/or the control signal, wherein the vehicle starting circuit 30 is in an on-state when being turned on and in an off-state when being turned off.

In the present embodiment, the starting control power supply is provided thereon with a starting control power supply input end and a starting control power supply control switch, and the starting control power supply control switch is electrically connected between the starting control power supply input end and the vehicle starting circuit 30, wherein the starting control power supply control switch turns on or off the electrical connection between the starting control power supply input end and the vehicle starting circuit 30 based on the drive signal and/or the control signal.

In the present embodiment, when being in the off state based on the control signal, the vehicle starting circuit 30 cannot be turned on based on the drive signal.

In the present embodiment, the vehicle starting circuit 30 includes:

a first switch device, electrically connected between the battery circuit 10 and a load; and a switch drive device, electrically connected to the first switch device, and configured to turn on or off the first switch device based on the drive signal and the control signal.

In the present embodiment, the switch drive device is specifically configured to, when the drive signal and the control signal are in an off state, control the vehicle starting circuit 30 not to be turned on based on the drive signal.

In the present embodiment, the portable standby starting device 100 further includes an enable control circuit, wherein the enable control circuit is electrically connected to the load access detecting circuit 20 and the vehicle starting circuit 30 and is configured to turn on or off the vehicle starting circuit 30 according to the drive signal and the control signal.

In the present embodiment, the vehicle starting circuit 30 includes:

a second switch device, electrically connected between the battery circuit 10 and the load; and a switch drive device, electrically connected to the second switch device and the enable control circuit, and configured to turn on or off the second switch device based on the drive signal and the control signal.

In the present embodiment, the switch drive device includes:

a third switch device, electrically connected in series in a circuit loop of the second switch device, wherein the third switch device is configured to control an on/off state of the circuit loop, and wherein when the circuit loop is in an on state, the third switch device is capable of receiving power supply, and enters an on state.

In the present embodiment, the switch drive device may turn on or off the third switch device through the drive signal received by a drive signal input end provided thereon.

In the present embodiment, the switch drive device may turn on or off the third switch device through an enable control signal received by an enable control signal input end provided thereon.

In the present embodiment, the third switch device, when being in the off state based on the enable control signal, cannot be turned on based on the drive signal.

In the present embodiment, the enable control circuit is provided therein with an enable control signal output end and an enable control switch, wherein the enable control signal output end is electrically connected to the switch drive module, and the enable control switch is electrically connected between the enable control signal output end and the ground terminal.

In the present embodiment, the load access detecting circuit 20 is electrically connected to the control end of the enable control switch, and sends the control signal to the control end of the enable control switch, so as to turn on or off the enable control switch.

In the present embodiment, the portable standby starting device 100 further includes a drive signal transmission circuit, wherein the drive signal transmission circuit is electrically connected to the vehicle starting circuit and the microprocessor, and transmits the drive signal to the vehicle starting circuit, the load access detecting circuit 20 is electrically connected to the drive signal circuit, and transmits the control signal to the drive signal circuit, so as to control the transmission of the drive signal by the drive signal transmission circuit.

In the present embodiment, the drive signal transmission circuit is provided thereon with:

a first input end, electrically connected to the microprocessor 93 and configured to receive the drive signal, a second input end, electrically connected to the load access detecting circuit 20 and configured to receive the control signal, and an output end, electrically connected to the vehicle starting circuit 30.

In the present embodiment, the drive signal transmission circuit includes a logic AND gate that performs a logic AND operation on the drive signal and the control signal, wherein the control signal for suspending the transmission of the drive signal is a low level signal.

In the present embodiment, the vehicle starting circuit 30 includes:

a fourth switch device, electrically connected between a power supply connection end and a load connection end, and a switch drive circuit, electrically connected between the fourth switch device and the drive signal transmission circuit, wherein the switch drive circuit is configured to turn on or off the fourth switch device, and the drive signal transmission circuit is configured to transmit the drive signal to the switch drive circuit so as to turn on or off the fourth switch device.

In the present embodiment, the portable standby starting device 100 further includes a drive power supply circuit electrically connected to the vehicle starting circuit 30 and configured to supply power to the vehicle starting circuit 30 or control the battery circuit to supply power to the vehicle starting circuit, and the vehicle starting circuit 30, when being powered on, can be in an on or off state based on the drive signal and the control signal.

In the present embodiment, the voltage-stabilized power supply is configured to receive an input voltage of the battery circuit 10, and output a stable voltage to the microprocessor 93.

In the present embodiment, the voltage-stabilized power supply can supply power to or cut off power of the microprocessor based on the control signal, and the microprocessor cannot output the drive signal when being powered off.

In the present embodiment, the voltage-stabilized power supply is provided thereon with:

a power supply input end, electrically connected to a battery circuit connection end;

a power supply output end;

a voltage-stabilized power supply generation circuit, electrically connected between the power supply input end and the power supply output end, and configured to convert an input voltage and output a stable voltage at the power supply output end; and a voltage stabilizing control switch, electrically connected between the power supply output end and the microprocessor 93, wherein a control end of the voltage stabilizing control switch is electrically connected to the load access detecting circuit 20.

In the present embodiment, the voltage-stabilized power supply is provided thereon with:

a power supply input end, electrically connected to a battery circuit connection end;

a power supply output end;

a voltage-stabilized power supply generation circuit, electrically connected between the power supply input end and the power supply output end, and configured to convert an input voltage and output a stable voltage at the power supply output end; and a voltage stabilizing control switch, electrically connected between the power supply input end and the voltage-stabilized power supply generation circuit, wherein a control end of the voltage stabilizing control switch is electrically connected to the load access detecting circuit 20.

In the present embodiment, the portable standby starting device 100 further includes a forced starting circuit.

It can thus be seen that, by implementing the portable standby starting device 100 for a vehicle described in the present embodiment, dual control can be performed on the vehicle starting circuit 30 according to the load access condition and the user operation, thus realizing precise control of vehicle starting; and meanwhile, the use of the microprocessor 93 also enables an overall control of the portable standby starting device 100.

Figure 31:
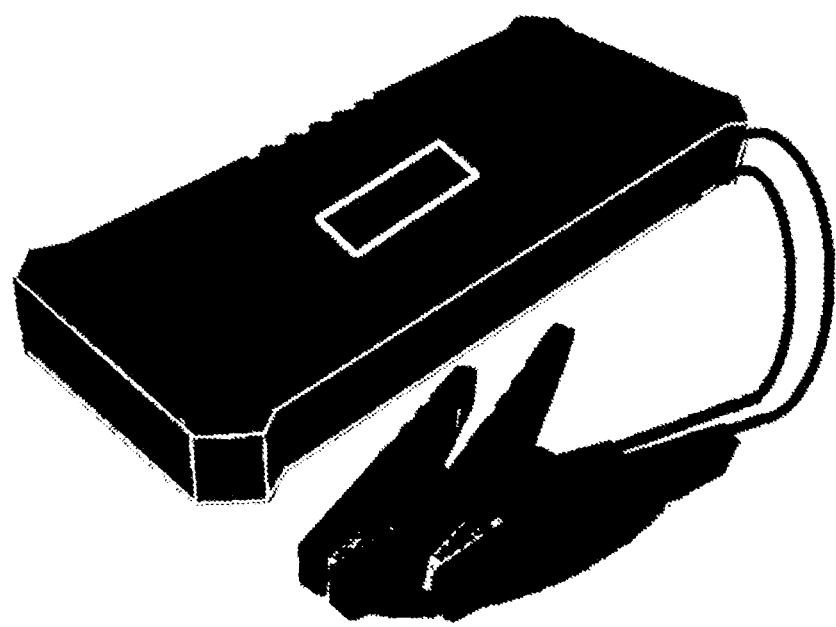
FIG. 31 is a structural schematic view of a standby starting tool for a vehicle provided in an embodiment of the present disclosure.

Referring to FIG. 31, FIG. 31 is a structural schematic view of a standby starting tool for a vehicle provided in an embodiment of the present disclosure. As shown in FIG. 31, the standby starting tool includes a clamp 200 and the portable standby starting device 100 described in the embodiments, wherein the clamp 200 is connected to the portable standby starting device 100, and is configured to connect the portable standby starting device 100 and a vehicle load of the vehicle.

In the present embodiment, the tool can connect the portable standby starting device 100 to the vehicle load through the clamp 200, so that the portable standby starting device 100 can supply power to and ignite the vehicle load.

In the present embodiment, the clamp 200 is a combined structure with pliers and a wire, and when the pliers are connected to the vehicle load, an electrode of the vehicle load is transmitted to the other end of the wire (namely, the portable standby starting device) via the pliers-wire.

As an optional embodiment, all of the circuits in the portable standby starting device 100 are provided in a housing.

As an optional embodiment, a clamp 200 connection port is provided on the housing, and the clamp 200 is connected to the portable standby starting device 100 through the clamp 200 connection port.

As an optional embodiment, in the portable standby starting device 100, the battery circuit is provided in a first housing, and the other circuits are provided in a second housing.

As an optional embodiment, the second housing is provided thereon with the clamp 200 connection port, and the clamp 200 is connected to the portable standby starting device 100 through the clamp 200 connection port.

It can thus be seen that by implementing the standby starting tool for a vehicle described in the present embodiment, when the clamp in the standby starting tool is connected to the vehicle load, the portable standby starting device can detect whether the load is connected; and when the load is connected to the circuit through the clamp, it is time-saving and labor-saving to perform the ignition operation for the vehicle.

Figure 32:
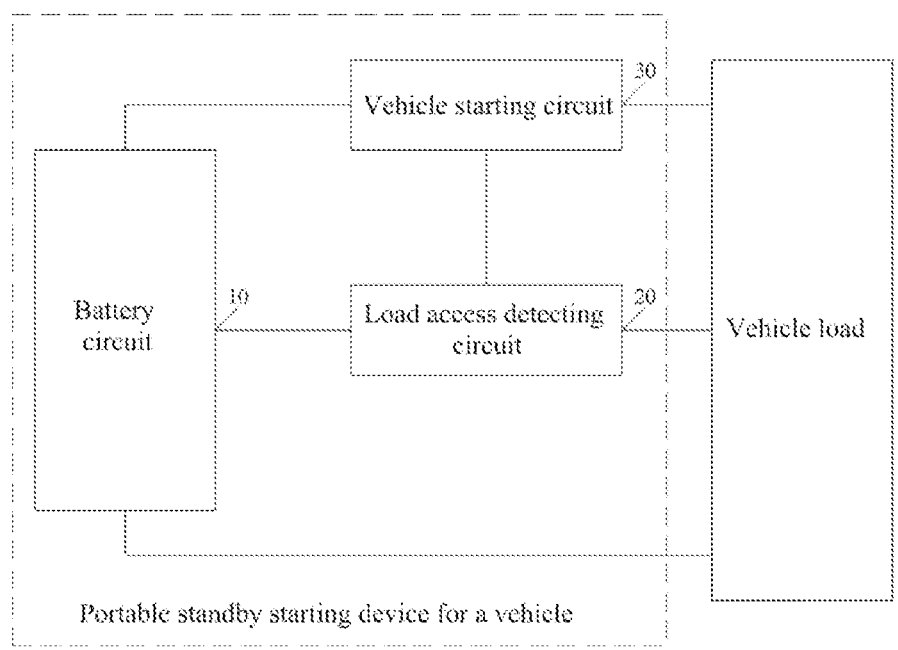
FIG. 32 is another structural schematic view of the portable standby starting device for a vehicle provided in an embodiment of the present disclosure.
Figure 33:
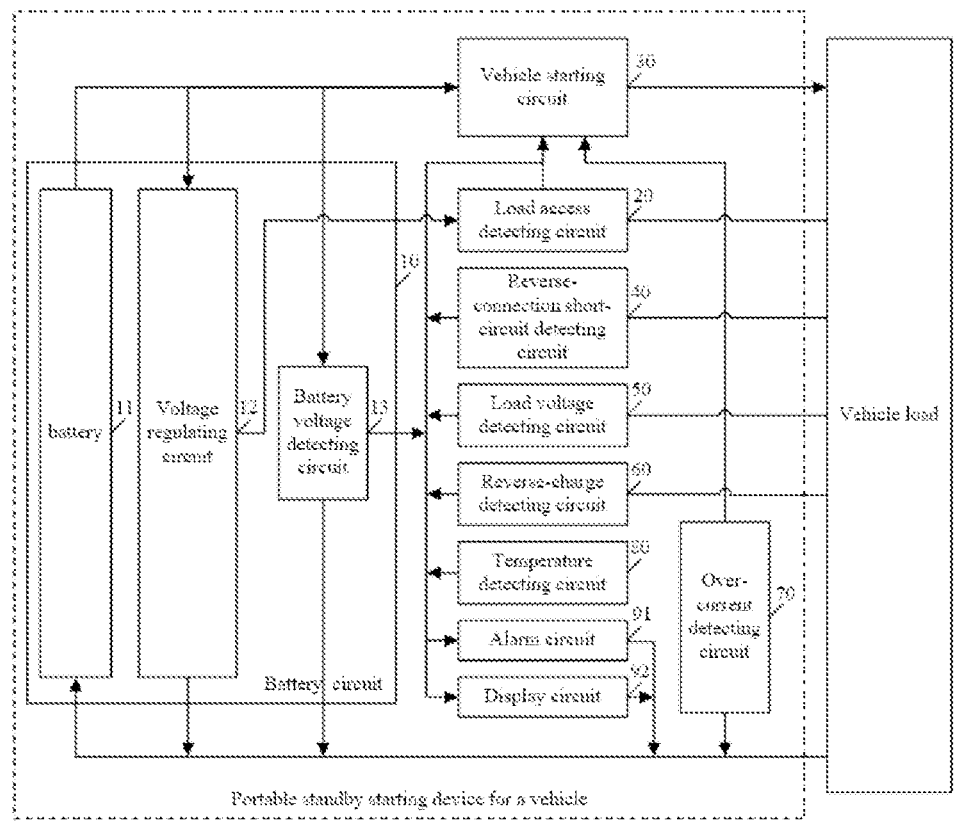
FIG. 33 is another structural schematic view of the portable standby starting device for a vehicle provided in an embodiment of the present disclosure.

Referring to FIG. 32, FIG. 32 is another structural schematic view of the portable standby starting device 100 for a vehicle provided in an embodiment of the present disclosure. In the above, the portable standby starting device 100 includes a battery circuit 10, a load access detecting circuit 20, and a vehicle starting circuit 30, wherein the battery circuit 10 is coupled to the load access detecting circuit 20 and the vehicle starting circuit 30, and is configured to supply power to the load access detecting circuit 20 and the vehicle starting circuit 30; and the load access detecting circuit 20 is coupled to the vehicle starting circuit 30, and is configured to detect whether the vehicle starting circuit 30 is connected to the vehicle load; and the load access detecting circuit 20, when detecting that the vehicle load is connected, controls the vehicle starting circuit 30 to output a vehicle starting current for controlling the ignition operation performed for the vehicle, and the load access detecting circuit 20, when detecting that the vehicle load is not connected, controls the vehicle starting circuit 30 to be prohibited from outputting the vehicle starting current for controlling the ignition operation performed for the vehicle.

In the present embodiment, the term "couple" is used to indicate that an output end and an input end of this circuit are both connected to another circuit.

Figure 36:
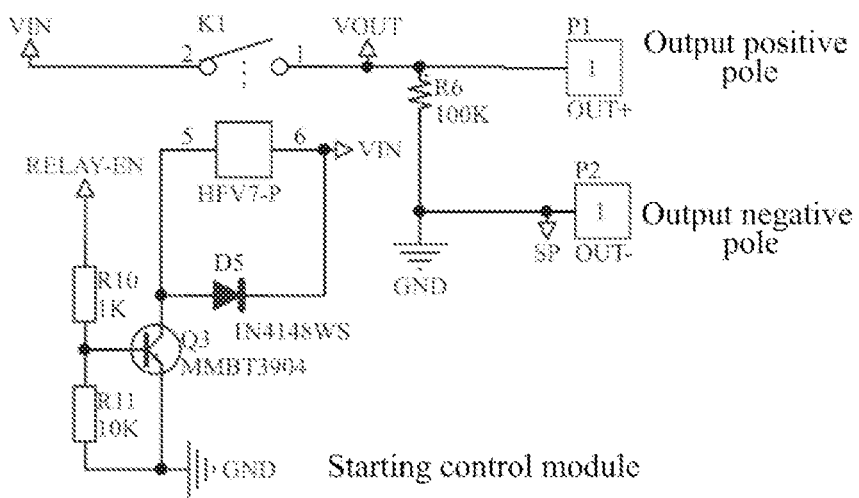
FIG. 36 is a schematic view of a circuit structure of a vehicle starting circuit provided in an embodiment of the present disclosure.

Referring to FIG. 36, FIG. 36 shows a schematic view of a circuit structure of the vehicle starting circuit 30. In the above, the vehicle starting circuit 30 is also called as a starting control module, and may be composed of peripheral components such as K1/Q3/R10/R11/IC1A/IC1B. When the PIN3 of the IC1A is at a high level, the PIN3 of the IC1A outputs a high level, Q3 is turned on, a relay K1 is closed, a positive pole of the battery is connected to an output positive pole of the clamp through the relay, and output positive and negative poles of the clamp 200 are correctly connected to the battery of the automobile, respectively, then the ignition can be performed. When the PIN3 of the IC1A is at a low level, the relay K1 is open, and the positive pole of the clamp outputs.

Figure 37:
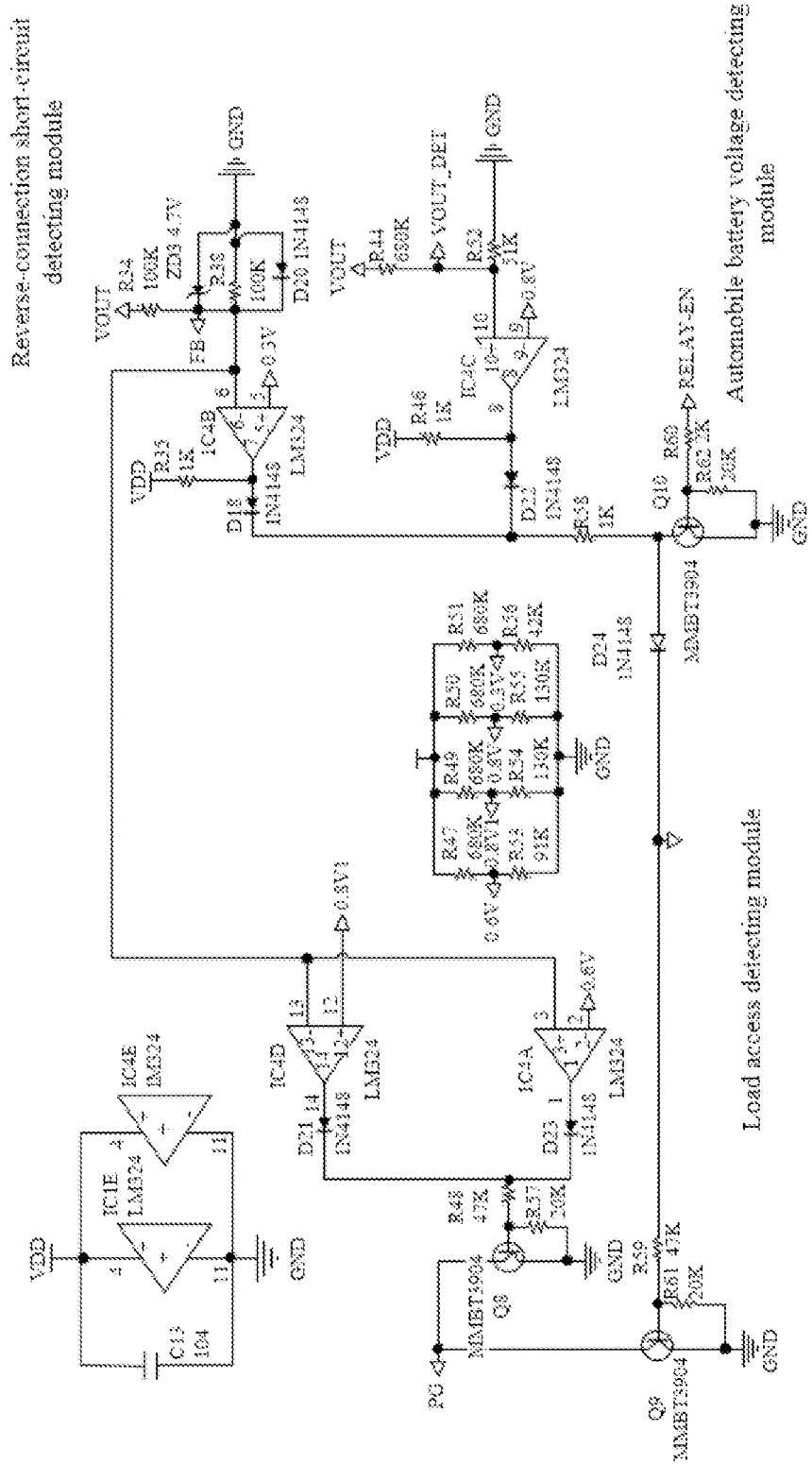
FIG. 37 is a schematic view of a combined circuit structure of the three, i.e., the load access detecting circuit, the load voltage detecting circuit, and the reverse-connection short-circuit detecting circuit provided in an embodiment of the present disclosure.

Referring to FIG. 37, FIG. 37 shows a schematic view of a combined circuit structure of the three, i.e. the load access detecting circuit 20, the load voltage detecting circuit 50, and the reverse-connection short-circuit detecting circuit 40. In the above, the load access detecting circuit 20 is also called as a load detecting module, and is composed of peripheral components such as IC4D/IC4A/R47/R53/R49/R54. When positive and negative poles of an output end of a clamp 200 are connected to a load, voltages of PIN13 of the IC4D and PIN3 of the IC4A will correspondingly change, so that level of the PIN14 of the IC4D or PIN1 of the IC4A flips to change from a high level to a low level. This low level makes Q8 cut off. After the Q8 is cut off, the PIN3 of a starting control module IC1A is at a high level, and the relay K1 for output of clamp is closed.

In the present embodiment, the IC4D and relevant components constitute a voltage type load detecting sub-circuit.

As an optional embodiment, the load access detecting circuit 20 includes:
- a ninth triode, having an emitter being connected to the ground terminal and one end of a $61^{st}$ resistor, a base being connected to both the other end of the $61^{st}$ resistor and one end of a $59^{th}$ resistor, and a collector being connected to the vehicle starting circuit;
- an eighth triode, having an emitter being connected to the ground terminal and one end of a $57^{th}$ resistor, a base being connected to both the other end of the $57^{th}$ resistor and one end of a $48^{th}$ resistor, and a collector being connected to the vehicle starting circuit;
- the $59^{th}$ resistor, with the other end being connected to an output end of a $24^{th}$ diode;
- the $24^{th}$ diode, with an input end being connected to a collector of the $10^{th}$ triode;
- the $48^{th}$ resistor, with the other end being connected to both an output end of a $21^{st}$ diode and an output end of a $23^{rd}$ diode;
- the $21^{st}$ diode, having an input end being connected to a fourth access operational amplifier;
- the $23^{rd}$ diode, having an input end being connected to a first access operational amplifier; an output end of the $21^{st}$ diode and an output end of the $23^{rd}$ diode both being connected to a collector of the $10^{th}$ triode;
- the $10^{th}$ triode, having an emitter being connected to the ground terminal and one end of a $62^{nd}$ resistor, and a base being connected to both the other end of the $62^{nd}$ resistor and one end of a $60^{th}$ resistor; and
- the $60^{th}$ resistor, with the other end being connected to the vehicle starting circuit.

As an optional embodiment, the portable standby starting device 100 further includes a reverse-connection short-circuit detecting circuit 40, wherein the reverse-connection short-circuit detecting circuit 40 is coupled to the load access detecting circuit 20 and is configured to detect whether a vehicle load is in a reverse-connection state or a short-circuit state, and control the vehicle starting circuit 30 to be prohibited from outputting the vehicle starting current when the vehicle load is in the reverse-connection state or the short-circuit state.

In the present embodiment, the reverse-connection short-circuit detecting circuit 40 is connected to the battery circuit 10.

In the present embodiment, the term "couple" is specifically used to indicate that the output end of this circuit and an output end of the another circuit are both connected to the same position of a further circuit, and that the input end of this circuit and an input end of the another circuit are also both connected to the same position of the further circuit.

Referring to FIG. 37, FIG. 37 shows a schematic view of a combined circuit structure of the three, i.e. the load access detecting circuit 20, the load voltage detecting circuit 50, and the reverse-connection short-circuit detecting circuit 40. In the above, the reverse-connection short-circuit detecting circuit 40 is also called as a reverse-connection short-circuit detecting module, and is composed of IC4B/R34/R38/R51/R56/ZD3/D20, etc. When a battery (i.e., the vehicle load) connected to an automobile is reversely connected or short-circuited, a high level output from PIN7 of the IC4B passes through D18 to turn on the Q9, so that the PIN3 of the starting control module IC1A is at a low level, and the relay K1 for output of clamp is open.

As an optional embodiment, the reverse-connection short-circuit detecting circuit 40 includes:
- a second access operational amplifier, having an output end being connected to one end of a $35^{th}$ resistor and an input end of a $18^{th}$ diode, and an input end being connected to the load access detecting circuit;
- the $35^{th}$ resistor, with the other end being connected to a drive voltage end;
- the $18^{th}$ diode, having an output end being connected to the load access detecting circuit;
- a third voltage stabilizing diode, having an input end being connected to the ground terminal, and an output end being connected to the load access detecting circuit 20;
- a $20^{th}$ diode, having an input end being connected to the ground terminal, and an output end being connected to the load access detecting circuit;
- a $38^{th}$ resistor, having one end being connected to the ground terminal, and the other end being connected to the load access detecting circuit 20; and
- a $34^{th}$ resistor, having one end being connected to the vehicle load, and the other end being connected to the load access detecting circuit.

As an optional embodiment, the portable standby starting device 100 further includes a load voltage detecting circuit 50, wherein the load voltage detecting circuit 50 is coupled to the load access detecting circuit 20, and is configured to detect whether the vehicle load is in a high-voltage state or a low-voltage state, and control the vehicle starting circuit 30 to be prohibited from outputting the vehicle starting current when the vehicle load is in the high-voltage state or the low-voltage state.

In the present embodiment, the load voltage detecting circuit 50 is connected to the battery circuit 10.

Referring to FIG. 37, FIG. 37 shows a schematic view of a combined circuit structure of the three, i.e. the load access detecting circuit 20, the load voltage detecting circuit 50, and the reverse-connection short-circuit detecting circuit 40. As the vehicle load is the battery of the automobile, the load voltage detecting circuit 50 is also called as an automobile voltage detecting module. The load voltage detecting circuit 50 is composed of IC4C/R44/R52/R50/R55, etc. When the voltage of the battery connected to the automobile is higher than 11 V, a high level output from PIN8 of the IC4C passes through D22 to turn on the Q9, so that the PIN3 of the starting control module IC1A is at a low level, and the relay K1 for output of clamp is open.

As shown in FIG. 37, IC4D, D21, and other peripheral components constitute a voltage type load detecting sub-circuit. The other peripheral components include R47, R49, R50, R51, R53, R54, R55, and R56.

As shown in FIG. 37, IC4A, D23, and other peripheral components constitute a resistance type load detecting sub-circuit. The other peripheral components include R47, R49, R50, R51, R53, R54, R55, and R56.

As an optional embodiment, the load voltage detecting circuit 50 includes:
- a $58^{th}$ resistor, having one end being connected to both an output end of a $22^{nd}$ diode and the load access detecting circuit, and the other end being connected to the load access detecting circuit;
- the $22^{nd}$ diode, having an output end connected to the load access detecting circuit, and an input end of the load access detecting circuit and one end of a $46^{th}$ resistor both being connected an output end of a third access operational amplifier;
- the $46^{th}$ resistor, with the other end being connected to the drive voltage end;
- the third access operational amplifier, having an input end being connected to one end of a $52^{nd}$ resistor and one end of a $44^{th}$ resistor;
- the $52^{nd}$ resistor, with the other end being connected to the ground terminal; and
- the $44^{th}$ resistor, with the other end being connected to the vehicle starting circuit.

As an optional embodiment, the portable standby starting device 100 further includes a reverse-charge detecting circuit 60, wherein the reverse-charge detecting circuit 60 is coupled to the load access detecting circuit 20, and is configured to detect whether the voltage of the vehicle load is higher than an output voltage of the battery circuit 10 or not, and control the vehicle starting circuit 30 to be prohibited from outputting the vehicle starting current when the voltage of the vehicle load is higher than the output voltage of the battery circuit 10.

In the present embodiment, the reverse-charge detecting circuit 60 is connected to the battery circuit 10.

Figure 39:
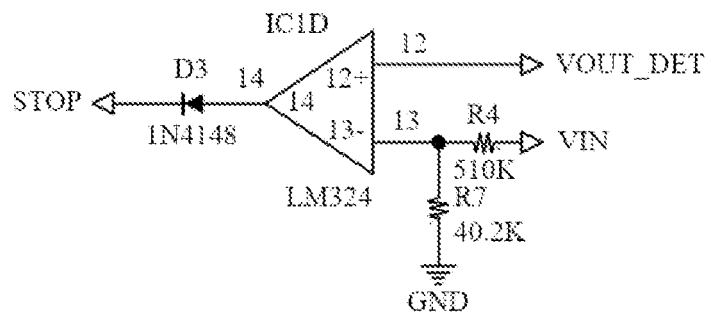
FIG. 39 is a schematic view of a circuit structure of a reverse-charge detecting circuit provided in an embodiment of the present disclosure.

Referring to FIG. 39, FIG. 39 shows a schematic view of a circuit structure of the reverse-charge detecting circuit 60. In the above, the reverse-charge detecting circuit 60 is also called as a reverse-charge detecting module, and is specifically composed of peripheral components such as IC1D/R4/R7/D3. When the voltage of the battery connected to the automobile is higher than the voltage input into the battery by 0.5 V, a high level output from the PIN14 of the IC1D passes the D22 to turn on the Q9, so that the PIN3 of the starting control module IC1A is at a low level, and the relay K1 for output of clamp is open.

As an optional embodiment, the reverse-charge detecting circuit 60 includes:
- a third diode, having an output end being connected to the load access detecting circuit, and an input end being connected to an output end of a reverse-charge operational amplifier;
- a fourth detection operational amplifier, having a positive input end being connected to the vehicle load, and a negative input end of the reverse-charge operational amplifier being connected to both one end of a fourth resistor and one end of the seventh resistor;
- the fourth resistor, with the other end being connected to the battery circuit; and
- the seventh resistor, with the other end being connected to the ground terminal.

As an optional embodiment, the portable standby starting device 100 further includes an over-current detecting circuit 70, wherein the over-current detecting circuit 70 is coupled to the vehicle starting circuit 30, and is configured to detect whether the vehicle starting current output by the vehicle starting circuit 30 is greater than a preset current threshold value, and control the vehicle starting circuit 30 to be prohibited from outputting the vehicle starting current when the vehicle starting current output by the vehicle starting circuit 30 is greater than the preset current threshold value.

Figure 43:
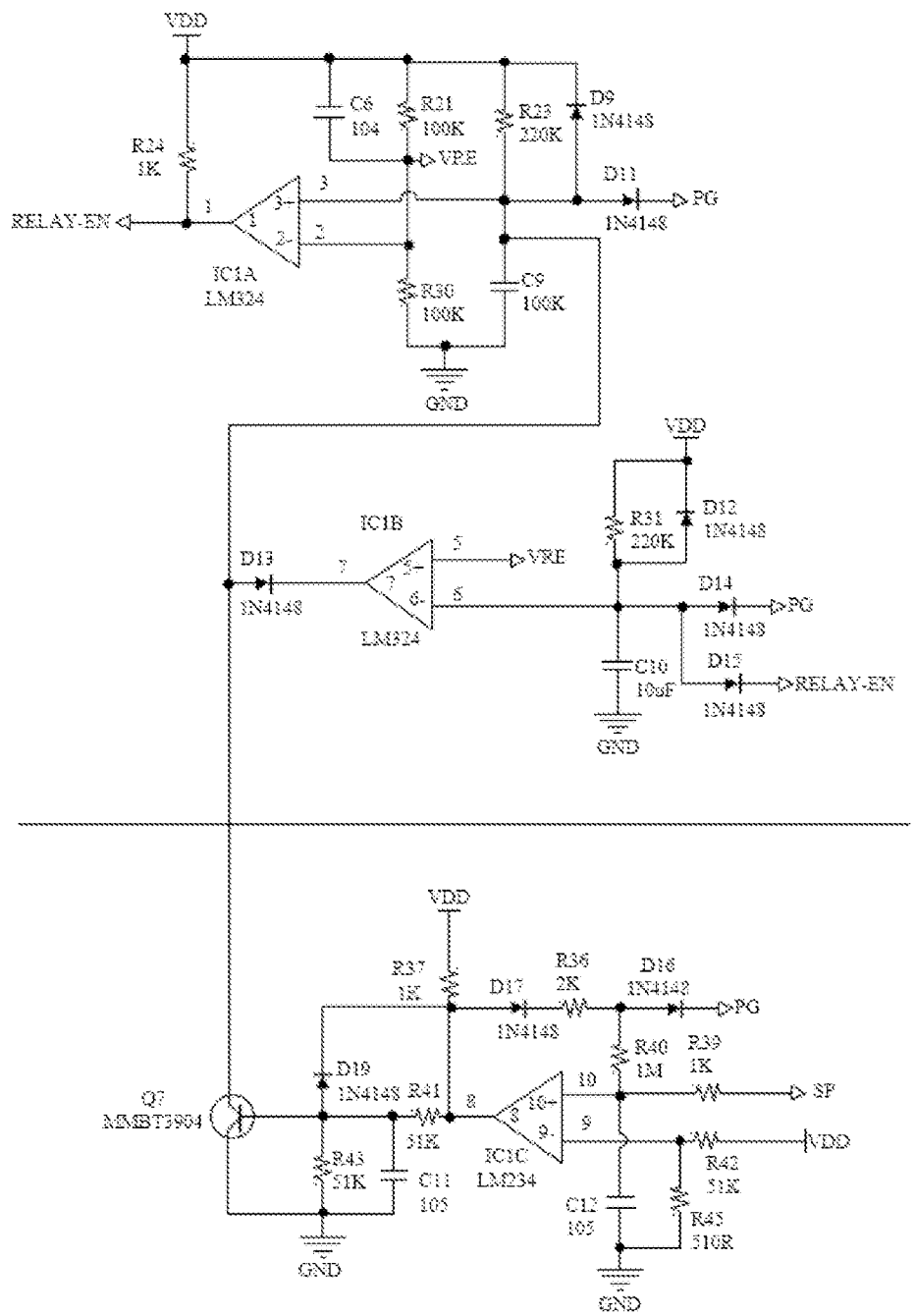
FIG. 43 is a structural schematic view of a circuit structure of an over-current detecting circuit provided in an embodiment of the present disclosure.

Referring to FIG. 43, FIG. 43 shows a structural schematic view of a circuit structure of the over-current detecting circuit 70. In the above, the over-current detecting circuit 70 is also called as an over-current detecting module, and may be composed of peripheral components such as IC1C/R40/R39/R42/R45/R36/D17/R41/R43/D19/Q7. When the output current is detected to be too large, the voltage of PIN10 of IC1C rises, a high level output from the PIN8 of the IC1C turns on Q7, so that the PIN3 of the starting control module IC1A is at a low level, and the relay K1 for output of clamp is open.

In the present embodiment, the portable standby starting device further includes a first time delay circuit and/or a second time delay circuit, and the first time delay circuit and/or the second time delay circuit are both coupled to the vehicle starting circuit, wherein the first time delay circuit is configured to control the vehicle starting circuit to be disconnected in a delayed way; and the second time delay circuit is configured to control the vehicle starting circuit to be started in a delayed way.

In the present embodiment, the first time delay circuit may be a 30-second time delay circuit, and this circuit mainly plays a timing function. In the above, when the first time delay circuit completes the timing, the vehicle starting circuit is turned off, thus realizing the effect of disconnecting the output.

In the present embodiment, the second time delay circuit may be a 3-second time delay circuit, and this circuit mainly plays a role of delaying the starting. In the above, there is a slight time delay when the clamp is connected to the vehicle load, thus achieving the effect of eliminating contact sparks.

Referring to FIG. 43, in FIG. 43, D13, IC1B, C10, R31, D12, D14, and D15 constitute the first time delay circuit. Specifically, the first time delay circuit is the 30-second time delay sub-circuit.

Meanwhile, in FIG. 43, R24, IC1A, C6, R21, R23, D9, D11, R30, and C9 constitute the second time delay circuit. Specifically, the second time delay circuit is the 3-second time delay sub-circuit.

Figure 51:
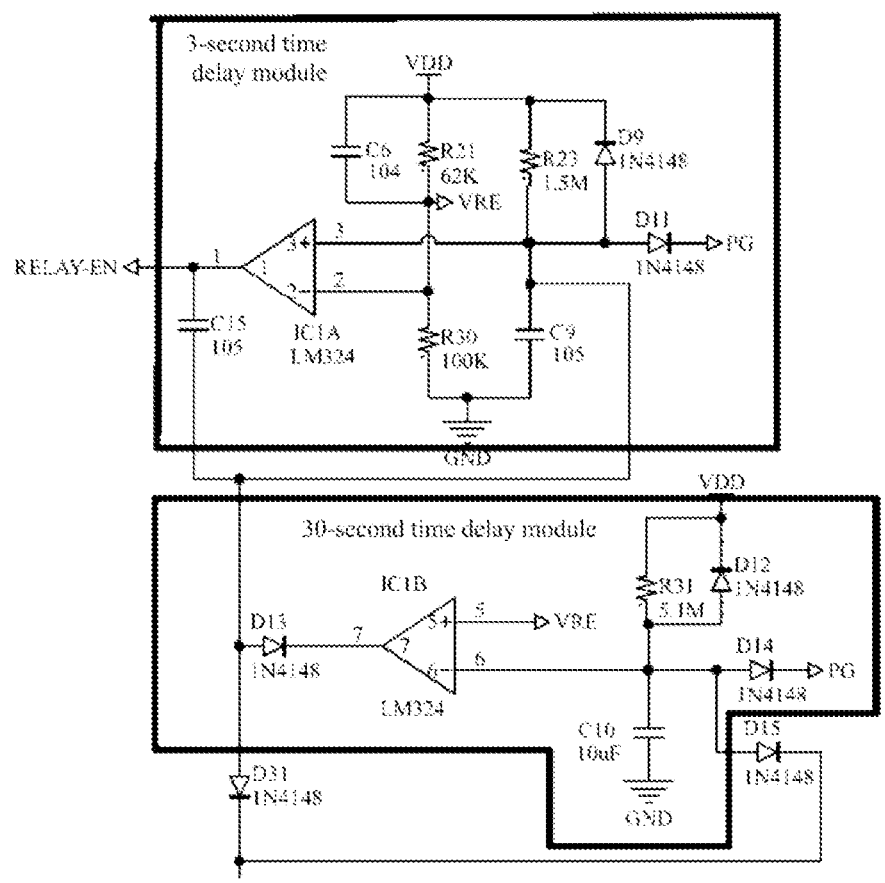
FIG. 51 is another schematic view of a circuit structure of the first time delay circuit and the second time delay circuit provided in an embodiment of the present disclosure.

Referring to FIG. 51, FIG. 51 shows another schematic view of a circuit structure of the first time delay circuit and the second time delay circuit. In the above, the first time delay circuit is the 30-second time delay sub-circuit, and the second time delay circuit is the 3-second time delay sub-circuit.

As an optional embodiment, the over-current detecting circuit 70 includes:
- a seventh triode, having a collector being connected to the vehicle starting circuit, an emitter being connected to the ground terminal, and a base being connected to an input end of a $19^{th}$ diode, one end of a $43^{rd}$ resistor, one end of a $11^{th}$ capacitor, and one end of a $41^{st}$ resistor;
- the $43^{rd}$ resistor, with the other end being connected to the ground terminal; the $11^{th}$ capacitor, with the other end being connected to the ground terminal;
- the $19^{th}$ diode, with an output end being connected to the four, i.e. one end of a $37^{th}$ resistor, an input end of a $17^{th}$ diode, the other end of the $41^{st}$ resistor, and an output end of a third detection operational amplifier;
- the $37^{th}$ resistor, with the other end being connected to the drive voltage end;
- the $17^{th}$ diode, with an output end being connected to one end of a $36^{th}$ resistor;
- the $36^{th}$ resistor, with the other end being connected to both an input end of a $16^{th}$ diode and one end of a $40^{th}$ resistor;
- the $16^{th}$ diode, with an output end being connected to the vehicle starting circuit;
- the $40^{th}$ resistor, with the other end being connected to a positive input end of the third detection operational amplifier, one end of a $39^{th}$ resistor, and one end of a $12^{th}$ capacitor;
- the $39^{th}$ resistor, with the other end being connected to the vehicle starting circuit 30;
- the third detection operational amplifier, with a negative input end being connected to both one end of a $45^{th}$ resistor and one end of a $42^{nd}$ resistor;
- the $45^{th}$ resistor, with the other end being connected to the ground terminal; and
- the $42^{nd}$ resistor, with the other end being connected to the drive voltage end.

As an optional embodiment, the portable standby starting device further includes a forced starting circuit, wherein the forced starting circuit includes:
- a $36^{th}$ diode, wherein an input end of the $36^{th}$ diode is connected to the load access detecting circuit; an output end of the $36^{th}$ diode is connected to both an output end of the $32^{nd}$ diode and one end of the first switch;
- the $32^{nd}$ diode, with an input end being connected to the load access detecting circuit; and
- the first switch, with the other end being connected to the ground terminal.

Figure 50:
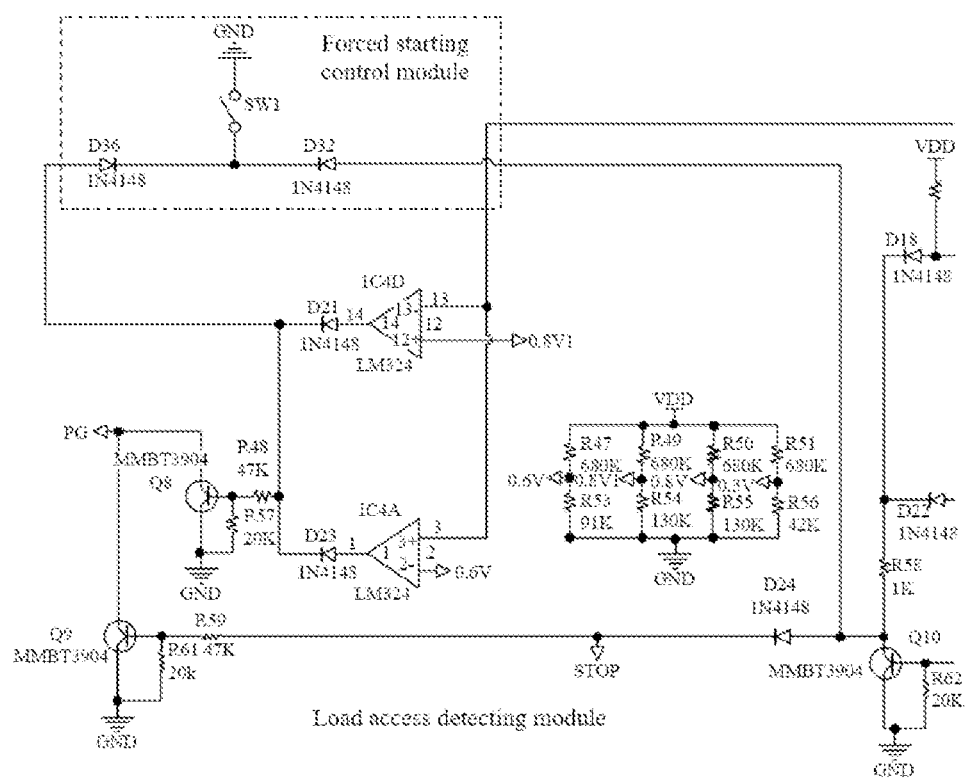
FIG. 50 is a schematic view of a circuit combination of the load access detecting circuit and the forced starting circuit provided in an embodiment of the present disclosure.

Referring to FIG. 50, FIG. 50 shows a schematic view of a circuit combination of the load access detecting circuit and the forced starting circuit. In the drawing, the forced starting control module is just the forced starting circuit.

As an optional embodiment, the battery circuit 10 includes the battery 11, a voltage regulating circuit 12, and a battery voltage detecting circuit 13, wherein
- the battery 11 is coupled to the voltage regulating circuit 12 and the battery voltage detecting circuit 13, and is configured to supply power to other circuits;
- the voltage regulating circuit 12 is configured to regulate an output voltage of the battery 11; and
- the battery voltage detecting circuit 13 is configured to detect whether the battery 11 is in a high-voltage state or a low-voltage state, and control the vehicle starting circuit 30 to be prohibited from outputting the vehicle starting current when the battery 11 is in the high-voltage state or the low-voltage state.

Figure 35:
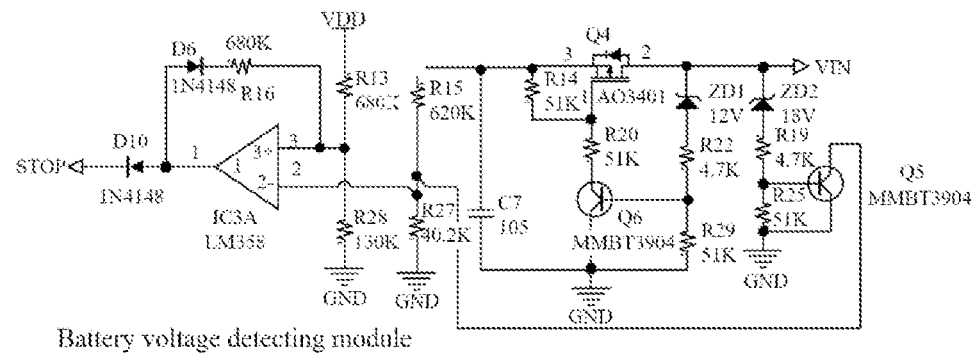
FIG. 35 is a schematic view of a circuit structure of a voltage regulating circuit provided in an embodiment of the present disclosure.

Referring to FIG. 35, FIG. 35 shows a schematic view of a circuit structure of the voltage regulating circuit 12. In the above, the voltage regulating circuit 12 is a DC-DC circuit, and is also called as a DC-DC module. In this circuit, the voltage of the battery passes through a linear step-down circuit composed of D1/R3/U1/C4, etc. to output a stable 5 V voltage to various circuits.

Figure 38:
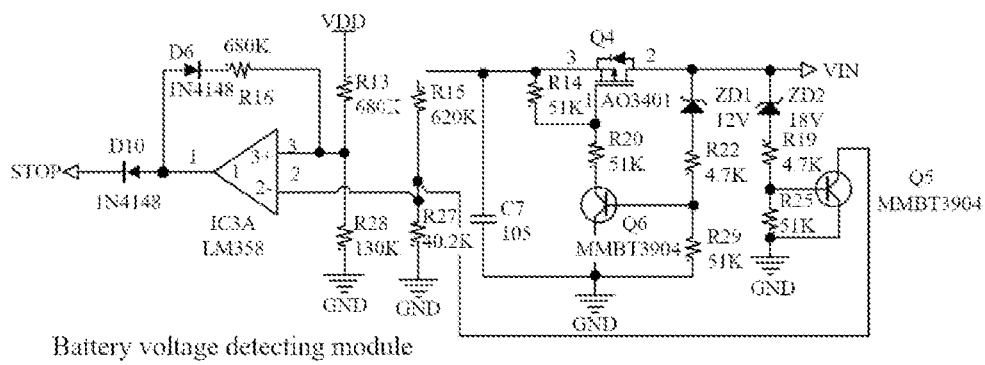
FIG. 38 is a schematic view of a circuit structure of a battery voltage detecting circuit provided in an embodiment of the present disclosure.

Referring to FIG. 38, FIG. 38 shows a schematic view of a circuit structure of the battery voltage detecting circuit 13. In the above, the battery voltage detecting circuit 13 is also called as a battery voltage detecting module, and is specifically composed of peripheral components such as IC3A/R13/R28/R15/R27/Q4/Q6/ZD1/R22/R29/ZD2/R19/R25/Q5/D10. When the battery voltage is too low or high, the voltage of PIN2 of the IC3A becomes low, so that a high level output from the PIN1 of the IC3A passes through the D22 to turn on the Q9, so that the PIN3 of the starting control module IC1A is a low level, and the relay K1 for output of clamp is open.

In FIG. 38, the battery under-voltage detecting sub-circuit includes: IC3A, D6, D10, R16, R13, R28, R27, R15, R14, Q4, R20, Q6, R29, R22, C7, and ZD1.

In FIG. 38, the battery over-voltage detecting sub-circuit further includes: ZD2, R19, R25, and Q5.

Figure 49:
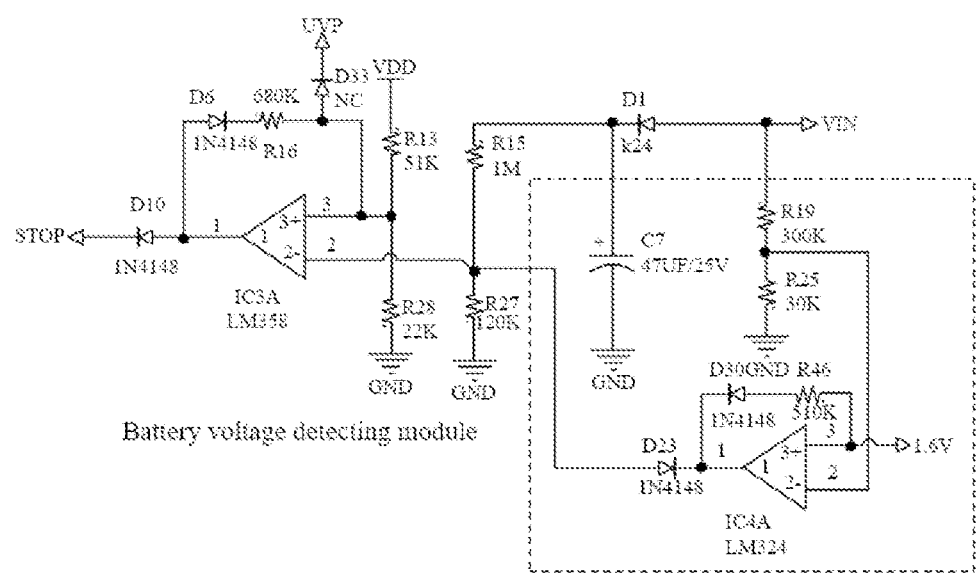
FIG. 49 is another schematic view of the circuit structure of the battery voltage detecting circuit provided in an embodiment of the present disclosure.

In FIG. 49, the battery under-voltage detecting sub-circuit includes: IC3A, D6, D10, D33, R13, R28, R27, R15, D1, and C7.

In FIG. 49, the battery over-voltage detecting sub-circuit further includes: R19, R25, IC4A, R46, D30, and D23.

As an optional embodiment, the portable standby starting device 100 further includes a temperature detecting circuit 80, wherein
the temperature detecting circuit 80 is coupled to the vehicle starting circuit 30, and is configured to detect whether the portable standby starting device 100 is in a preset high-temperature state, and control the vehicle starting circuit 30 to be prohibited from outputting the vehicle starting current when the portable standby starting device 100 is in a high-temperature state.

In the present embodiment, the temperature detecting circuit 80 is connected to the battery circuit 10.

Figure 40:
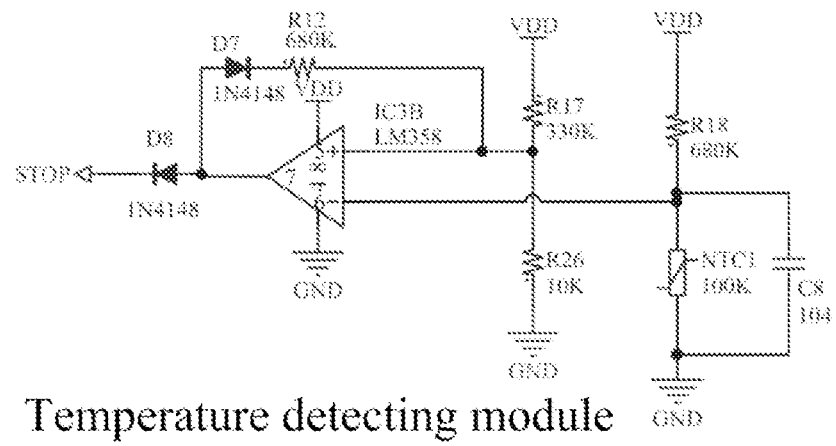
FIG. 40 is a schematic view of a circuit structure of a temperature detecting circuit provided in an embodiment of the present disclosure.

Referring to FIG. 40, FIG. 40 shows a schematic view of a circuit structure of the temperature detecting circuit 80. In the above, the temperature detecting circuit 80 is also called as a temperature detecting module, and may be specifically composed of peripheral components such as IC3B/R17/R26/R18/NTC1/D8. When an NTC sensor detects that the temperature is too high, the voltage of PIN6 of the IC3B becomes low, a high level output from PIN7 of the IC3B passes through the D22 to turn on Q9, so that the PIN3 of the starting control module IC1A is at a low level, and the relay K1 for output of clamp is open.

As an optional embodiment, the portable standby starting device 100 further includes an alarm circuit 91, wherein the alarm circuit 91 is coupled to the vehicle starting circuit 30, and is configured to control a buzzer to send out an alarm when the vehicle starting circuit 30 is in a state of being prohibited from outputting the vehicle starting current.

In the present embodiment, the alarm circuit 91 is connected to the battery circuit 10.

Figure 41:
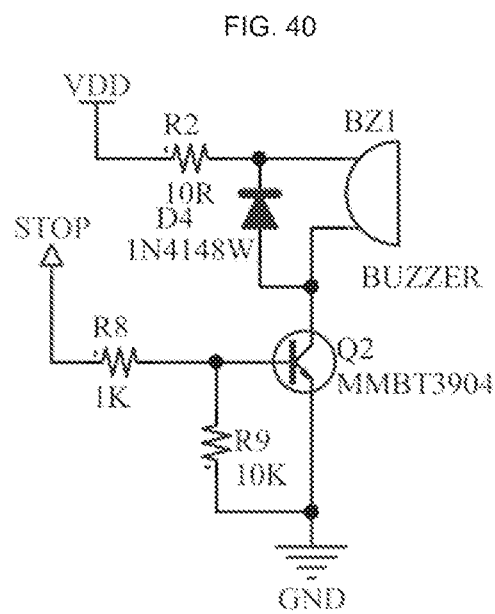
FIG. 41 is a schematic view of a circuit structure of an alarm circuit provided in an embodiment of the present disclosure.

Referring to FIG. 41, FIG. 41 shows a schematic view of a circuit structure of the alarm circuit 91. In the above, the alarm circuit 91 is also called as an alarm module, and may be specifically composed of R2/BZ1/D4/Q2/R8/R9 etc. When an access error occurs or other protection takes place, a B pole of the Q2 will input a high level, to turn on Q2, so that a buzzer BZ1 sends out an alarm sound.

As an optional embodiment, the portable standby starting device 100 further includes a display circuit 92, wherein the display circuit 92 is coupled to the vehicle starting circuit 30, and is configured to display an indicator light corresponding to an operation state of the portable standby starting device 100.

In the present embodiment, the display circuit 92 is connected to the battery circuit 10.

Figure 42:
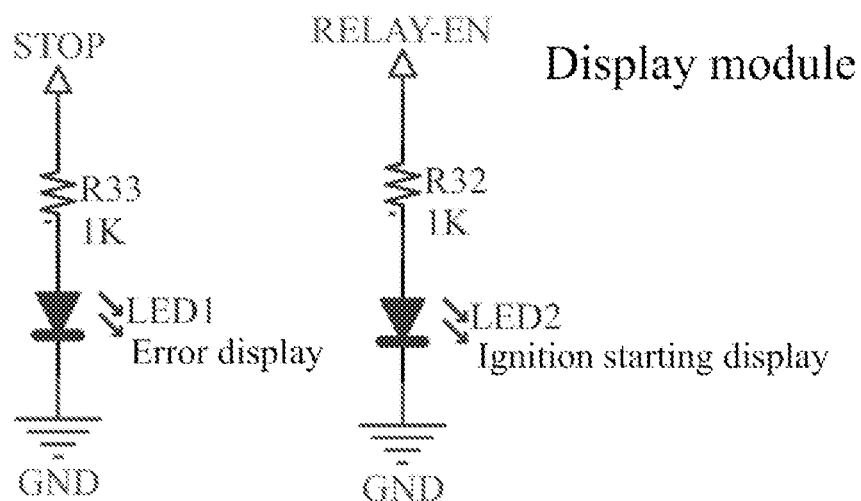
FIG. 42 is a schematic view of a circuit structure of a display circuit provided in an embodiment of the present disclosure.

Referring to FIG. 42, FIG. 42 shows a schematic view of a circuit structure of the display circuit 92. In the above, the display circuit 92 is also called as a display module, and is composed of LED1/R33/LED2/R32. LED1 is configured for error display. When an error occurs, STOP is at a high level, and LED1 is lighted. LED2 is configured for normal display. When the relay is closed, the PIN3 of the IC1A is at a high level, and LED2 is lighted.

It should be noted that terms of order (xx$^{th}$) described in the present embodiment correspondingly refer to elements in corresponding accompanying drawings, for example, the ninth triode is corresponding to Q9, and the 23$^{rd}$ diode is corresponding to D23.

More particularly, the first access operational amplifier is corresponding to IC4A, the second access operational amplifier is corresponding to IC4B, the third access operational amplifier is corresponding to IC4C, and the fourth access operational amplifier is corresponding to IC4D; the first detection operational amplifier is corresponding to IC1A, the second detection operational amplifier is corresponding to IC1B, the third detection operational amplifier is corresponding to IC1C, and the fourth detection operational amplifier is corresponding to IC1D.

As an optional embodiment, the load access detecting circuit further includes:
a ninth triode, having an emitter being connected to a ground terminal and one end of a 61$^{th}$ resistor, a base being connected to both the other end of the 61$^{st}$ resistor and one end of a 59$^{th}$ resistor, and a collector being connected to the vehicle starting circuit;
an eighth triode, having an emitter being connected to the ground terminal and one end of a 57$^{th}$ resistor, a base being connected to both the other end of the 57$^{th}$ resistor and one end of a 48$^{th}$ resistor, and a collector being connected to the vehicle starting circuit;
the 59$^{th}$ resistor, with the other end being connected to an output end of a 24$^{th}$ diode;
the 24$^{th}$ diode, with an input end being connected to a collector of the 10$^{th}$ triode;
the 48$^{th}$ resistor, with the other end being connected to both an input end of a 21$^{st}$ diode and one end of a 65$^{th}$ diode;
the 65$^{th}$ resistor, with the other end being connected to a fourth access operational amplifier;

the 21$^{st}$ diode, an output end of the 21$^{st}$ diode and an output end of the 32$^{th}$ diode both being connected to a first switch;
the first switch, connected to one end of a 53$^{rd}$ resistor, one end of a 54$^{th}$ resistor, one end of a 55$^{th}$ resistor, one end of a 56$^{th}$ resistor, and the ground terminal;
the 53$^{rd}$ resistor, with the other end being connected to a 47$^{th}$ resistor;
the 54$^{th}$ resistor, with the other end being connected to a 49$^{th}$ resistor;
the 55$^{th}$ resistor, with the other end being connected to a 50$^{th}$ resistor;
the 56$^{th}$ resistor, with the other end being connected to a 51$^{st}$ resistor;
the four, i.e. a 47$^{th}$ resistor, a 49$^{th}$ resistor, the 50$^{th}$ resistor, and the 51$^{st}$ resistor, being all connected to the drive voltage end;
a 32$^{nd}$ diode, having an input end being connected to a collector of a 10$^{th}$ triode;
the 10$^{th}$ triode, having an emitter being connected to both the ground terminal and one end of a 14$^{th}$ capacitor; and a base being connected to the three, i.e. one end of a 60$^{th}$ resistor, one end of a 64$^{th}$ resistor, and the other end of the 14$^{th}$ capacitor; and
the 60$^{th}$ resistor, with the other end being connected to the vehicle starting circuit.

Figure 45:
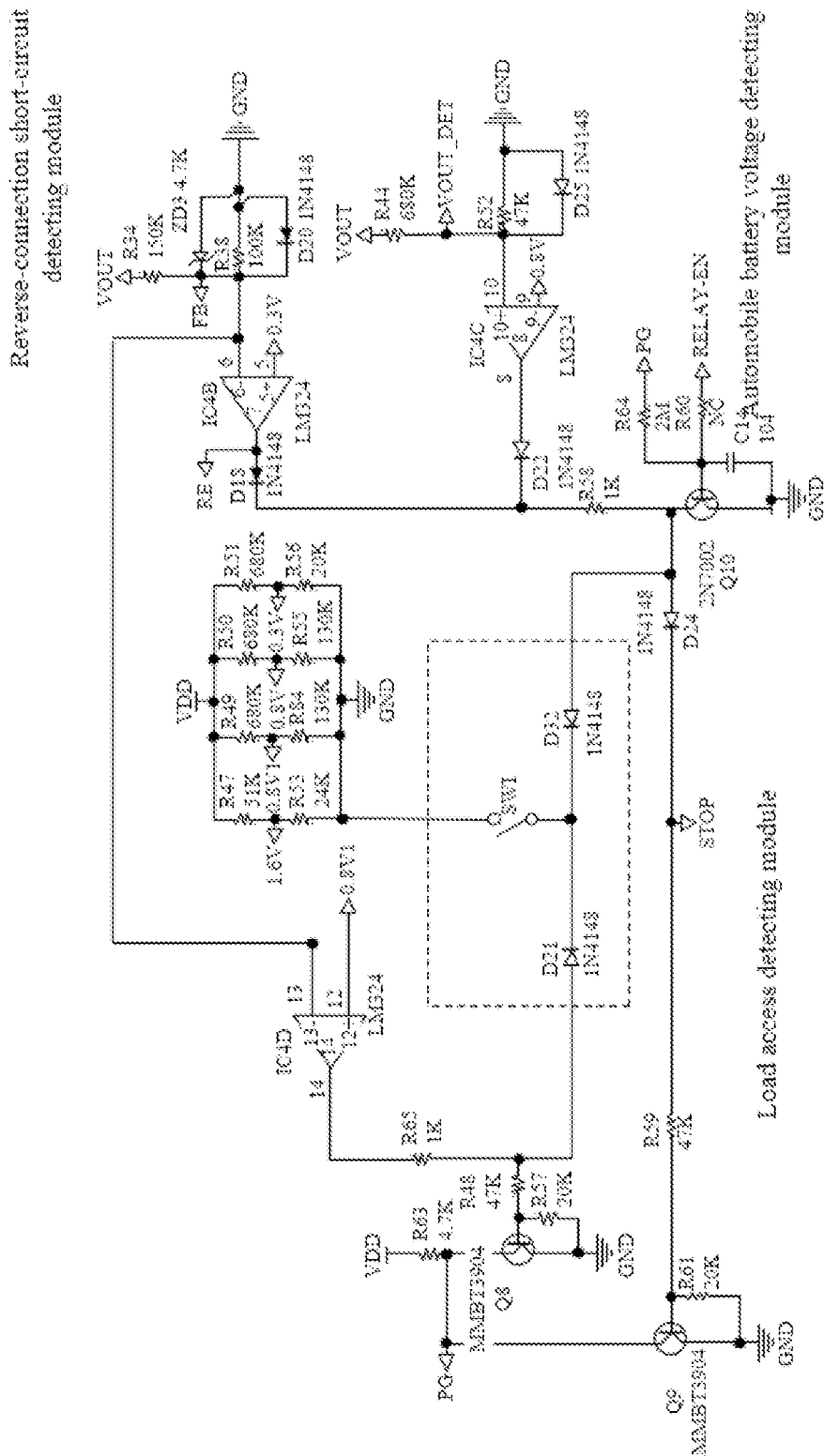
FIG. 45 is another schematic view of the combined circuit structure of the three, i.e., the load access detecting circuit, the load voltage detecting circuit, and the reverse-connection short-circuit detecting circuit provided in an embodiment of the present disclosure.

Referring to FIG. 45, a forced starting function can be added to the circuit structure, so that the clamp still can be opened to ignite the automobile when the battery of the automobile is 0 V.

Specifically, the working principle of the circuit with the forced starting function is as follows: the forced starting circuit is composed of the 21$^{st}$ diode D21, the 32$^{rd}$ diode D32, and a first switch SW1. When the first switch SW1 is closed, positive poles of the 21$^{st}$ diode D21 and the 32$^{nd}$ diode D32 are short-circuited to the ground, a negative pole of the 21$^{st}$ diode D21 is connected to the base of the eighth triode Q8 via the 48$^{th}$ resistor R48, a negative pole of the 32$^{nd}$ diode D32 is connected to the base of the ninth triode Q9 via the 24$^{th}$ diode D24 and the 59$^{th}$ resistor R59, which is equivalent to connecting the bases of the eighth triode Q8 and the ninth triode Q9 to the ground, so that the eighth triode Q8 and the ninth triode Q9 enter an off state, the PIN3 of the starting first access operational amplifier IC1A is at a high level, and the relay K1 for output of clamp is closed.

As an optional embodiment, the reverse-charge detecting circuit includes:
the fourth detection operational amplifier, having a positive input end being connected to both one end of a 24$^{th}$ resistor and one end of a 35$^{th}$ resistor;
the 24$^{th}$ resistor, with the other end being connected to the ground terminal;
the 35$^{th}$ resistor, with the other end being connected to the three, i.e. an output end of a fifth detection operational amplifier, one end of a 69$^{th}$ resistor, and a 16$^{th}$ capacitor;
the fifth detection operational amplifier, having a negative input end being connected to one end of a 68$^{th}$ resistor, the other end of the 69$^{th}$ resistor, and the other end of the 16$^{th}$ capacitor;
a positive input end of the fifth detection operational amplifier being connected to both one end of a 66$^{th}$ resistor and one end of a 67$^{th}$ resistor;
the 66$^{th}$ resistor, with the other end being connected to the drive voltage end; and
the 67$^{th}$ resistor, with the other end being connected to the ground terminal.

Figure 46:
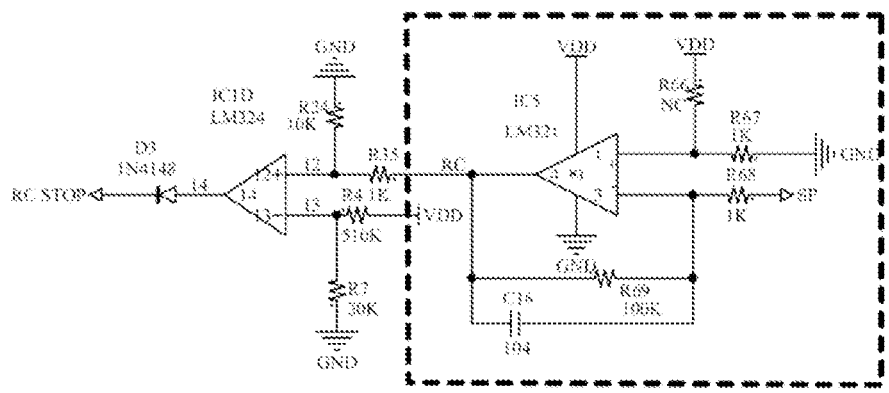
FIG. 46 is another schematic view of the circuit structure of the reverse-charge detecting circuit provided in an embodiment of the present disclosure.

Referring to FIG. 46, the reverse-charge protection in the circuit is changed from an original voltage detection mode to a current detection mode, because the current detection mode facilitates production and test. Therefore, a reverse-charge current detecting circuit composed of IC5, R67, R68, R69, C16 etc. is added.

In the present embodiment, the working principle of the reverse-charge detecting module is as follows: the reverse-charge detecting module is composed of peripheral components such as IC1D, R4, R7, D3, IC5, R67, R68, R69, and C16. After the clamp is opened and the automobile is successfully started, when the voltage of the battery of the automobile is higher than the voltage input into the battery, the reverse-charge current flows through a negative wire, then is sent from R67 to PIN1 of IC5 to be amplified, and then sent to PIN12 of IC1D. Compared with the PIN13 of the IC1D, when a signal of amplified reverse-charge current is higher than the voltage of the PIN13 of the IC1D, a high level output from PIN14 of the IC1D is sent to PIN10 of the IC1C through D3, R36, and R40, so that PIN8 of the IC1C outputs a high level to turn on Q7, and PIN3 of the starting control module IC1A is at a low level, and the relay K1 for output of clamp is open.

As an optional embodiment, the display circuit includes:
a first light-emitting diode, wherein an input end of the first light-emitting diode is connected to the drive voltage end;
an output end of the first light-emitting diode being connected to one end of a $33^{rd}$ resistor;
the $33^{rd}$ resistor, with the other end being connected to a collector of a fifth triode; the fifth triode, having an emitter being connected to the ground terminal and one end of a $71^{st}$ resistor; a base of the fifth triode being connected to one end of a $70^{th}$ resistor and the other end of the $71^{st}$ resistor;
a $32^{nd}$ resistor, one end of the $32^{nd}$ resistor being connected to the vehicle starting circuit;
the other end of the $32^{nd}$ resistor being connected to an input end of a second light-emitting diode;
the second light-emitting diode, with an output end being connected to the ground terminal;
a $62^{nd}$ resistor, one end of the $62^{nd}$ resistor being connected to the drive voltage end; and the other end of the $62^{nd}$ resistor being connected to an input end of a third light-emitting diode; and
the third light-emitting diode, with an output end being connected to the ground terminal.

Figure 47:
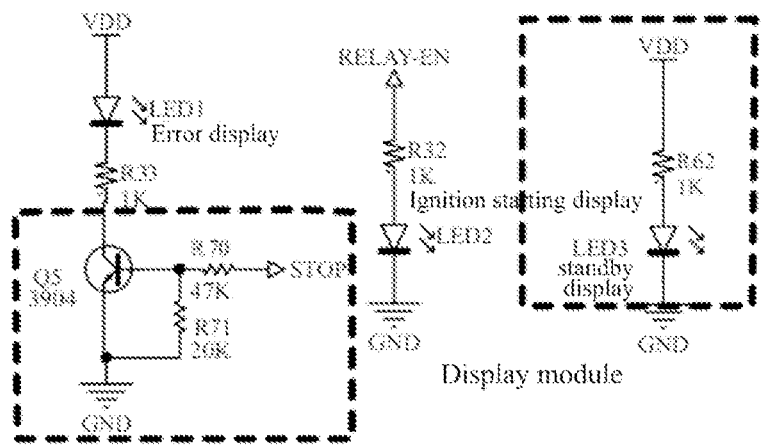
FIG. 47 is another schematic view of the circuit structure of the display circuit provided in an embodiment of the present disclosure.
Figure 48:
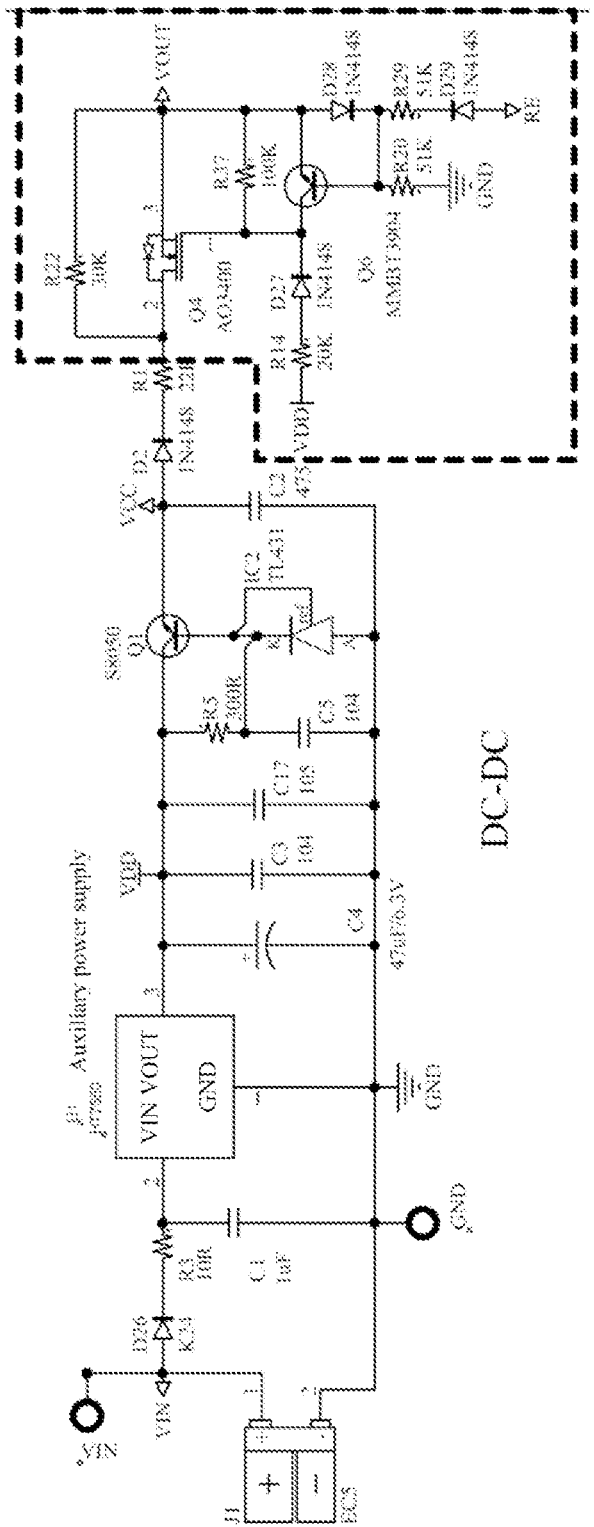
FIG. 48 is a schematic view of a circuit combination of a voltage bias switch circuit and a voltage regulating circuit provided in an embodiment of the present disclosure.

Referring to FIG. 47, a standby display circuit is added to the circuit shown in FIG. 47, then the display is more intuitive and meanwhile it is convenient to adjust randomly.

In the present embodiment, for the luminance of the LED1 for error display, a separate drive circuit for the LED1 is also added.

In the present embodiment, the working principle of the standby display circuit is as follows: standby display is composed of LED3/R62, when the battery is connected, a DC-DC circuit voltage stabilizing circuit composed of U1 supplies power to the LED3 in a current-limited manner through R62, so as to make the LED3 to be lighted.

In the present embodiment, the working principle of the error display circuit is as follows: when an error occurs, STOP is at a high level and turns on the LED1 by turning on Q5 via R70/R71. The brightness of the LED1 can be adjusted by adjusting a resistance value of R33.

As an optional embodiment, the portable standby starting device further includes a voltage bias switch circuit, and the voltage bias switch circuit includes:

a $22^{nd}$ resistor, wherein one end of the $22^{nd}$ resistor is connected to the four, i.e. a source of a fourth field-effect transistor, one end of a $37^{th}$ resistor, an emitter of a sixth triode, and an input end of a $28^{th}$ diode; the other end of the $22^{nd}$ resistor, a drain of the fourth field-effect transistor, and the voltage regulating circuit are connected;
the fourth field-effect transistor, having a gate being connected to the other end of the $37^{nd}$ resistor, an output end of a $27^{nd}$ diode, and a collector of the sixth triode;
the $27^{nd}$ diode, with an input end being connected to one end of a $14^{nd}$ resistor;
the $14^{nd}$ resistor, with the other end being connected to the drive voltage end;
the sixth triode, with a base being connected to the three, i.e. one end of a $20^{nd}$ resistor, an output end of a $28^{nd}$ diode, and one end of a $29^{nd}$ resistor;
the $20^{nd}$ resistor, with the other end being connected to the ground terminal;
the $29^{nd}$ resistor, with the other end being connected to an output end of the $29^{nd}$ diode; and
the $29^{nd}$ diode, with an input end being connected to the second access operational amplifier.

Referring to FIG. 18, an electronic switch circuit can be added to the circuit, so as to reduce the problem of excessive power consumption when U1 is reversely connected or short-circuited at an output end of the clamp.

In the present embodiment, the working principle of the bias voltage electronic switch circuit is as follows: the bias voltage electronic switch circuit is composed of R22, R14, R20, R29, R37, D27, D28, D29, Q4, Q6, etc. When reverse connection or short circuit occurs, a high level output from PIN7 of the IC4B passes through D29, R29, and R20 to turn on Q6, and Q4 is turned off, and the voltage output of the bias circuit is turned off, thus achieving the effect of reducing the power consumption of U1.

As an optional embodiment, the battery voltage detecting circuit includes:
a first access operational amplifier, having a positive input end being connected to one end of the $46^{nd}$ resistor and the 1.6 V voltage end; a negative input end being connected to both one end of the $25^{nd}$ resistor and one end of the $19^{nd}$ resistor; and an output end being connected to both the output end of the $30^{nd}$ diode and the output end of the $23^{rd}$ diode;
the $30^{nd}$ diode, with an input end being connected to the other end of the $46^{nd}$ resistor; and
the $25^{nd}$ resistor, with the other end being connected to the ground terminal.

As a further optional embodiment, the battery voltage detecting circuit includes a battery over-voltage detecting sub-circuit, and the battery over-voltage detecting sub-circuit includes:
a first access operational amplifier, having a positive input end being connected to one end of the $46^{nd}$ resistor and the 1.6 V voltage end; a negative input end being connected to both one end of the $25^{th}$ resistor and one end of the $19^{th}$ resistor; and an output end being connected to both the output end of the $30^{th}$ diode and the output end of the $23^{rd}$ diode;
the $30^{th}$ diode, with an input end being connected to the other end of the $46^{th}$ resistor; and
the $25^{th}$ resistor, with the other end being connected to the ground terminal.

Referring to FIG. 49, the battery high-voltage detecting circuit uses an operational amplifier as a hysteresis voltage comparator, and can solve the problem of flickering when switching the LED lamps when the high voltage protection is critical. Meanwhile, in order to save the costs, the IC4A originally for the load access detection is used as a high-voltage detecting circuit of the battery.

In the present embodiment, the working principle of the battery voltage detecting module is as follows: the battery voltage detecting module is composed of peripheral components, such as IC3A, R13, R28, R15, R27, R19, R25, R46, IC4A, D1, D23, D30, and D10. When the battery voltage is too low or high, the voltage of PIN2 of the IC3A becomes low, so that a high level output from the PIN1 of the IC3A passes through D10 to turn on Q9, so that the PIN3 of the starting control module IC1A is at a low level, and the relay K1 for output of clamp is open.

As an optional embodiment, in order to save the costs, four pull-up resistors R35, R46, R24, and R37, i.e., R35 originally connected to the IC4B, R46 originally connected to the IC4C, R24 originally connected to the IC1A, and R37 originally connected to the IC1A, are all moved to other places for use.

In the present embodiment, reference can be made to the contents of the accompanying drawings for the chip model, and details are not repeatedly described in the present embodiment.

It can thus be seen that by implementing the portable standby starting device 100 for a vehicle described in the present embodiment, the detection and ignition for the vehicle load can be completed without any microprocessor 93; meanwhile, the complete portable standby starting device 100 further can be constituted only by three parts of circuits, so as to achieve the effect of convenient ignition for the automobile.

Figure 34:
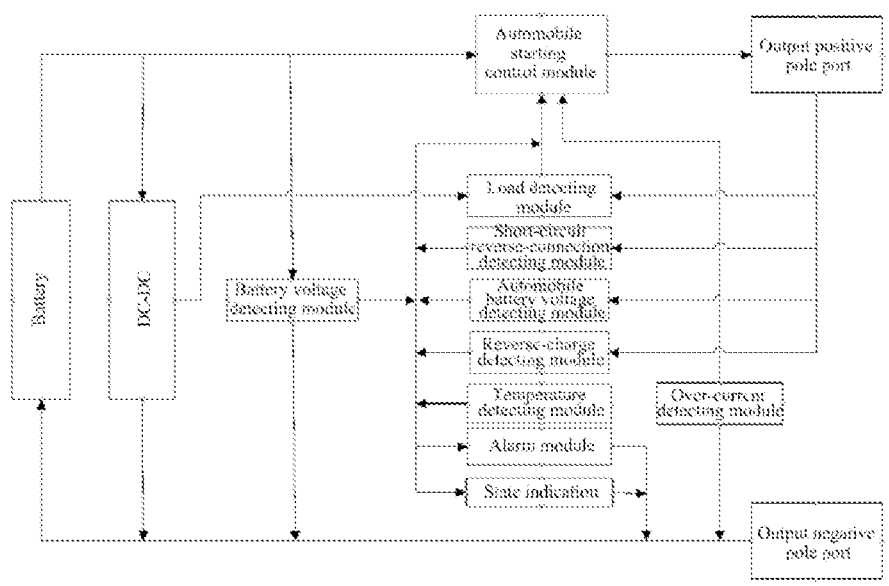
FIG. 34 is another structural schematic view of the portable standby starting device for a vehicle provided in an embodiment of the present disclosure.

Referring to FIG. 34, FIG. 34 is a structural schematic view of a further standby starting tool for a vehicle provided in an embodiment of the present disclosure. As shown in FIG. 34, the standby starting tool includes a clamp 200 and the portable standby starting device 100 described in the embodiments, wherein the clamp 200 is connected to the portable standby starting device 100, and is configured to connect the portable standby starting device 100 and a vehicle load of the vehicle.

Figure 44:
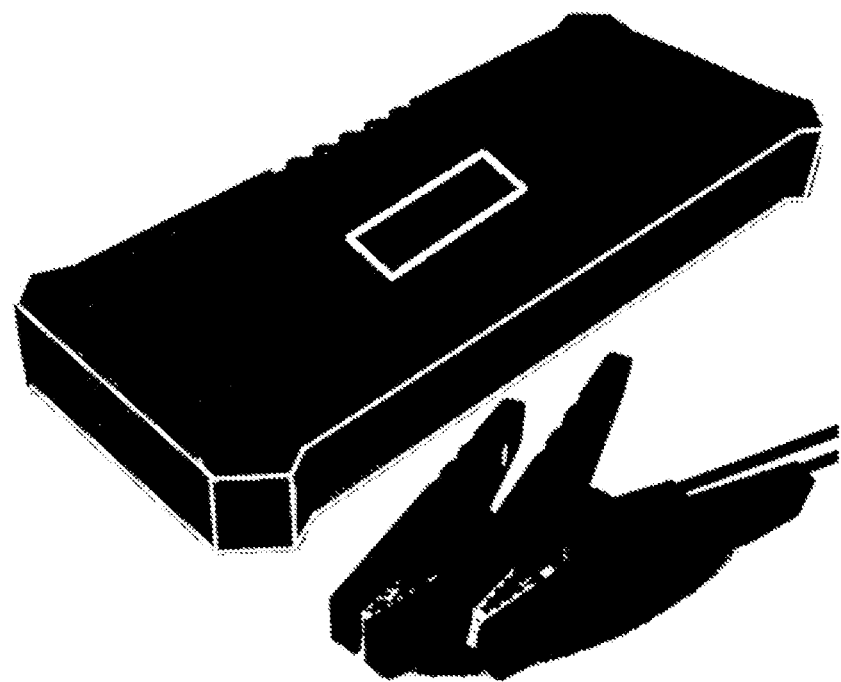
FIG. 44 is a structural schematic view of a standby starting tool for a vehicle provided in an embodiment of the present disclosure.

Referring to FIG. 44, FIG. 44 shows a structural schematic view of a standby starting tool for a vehicle. This tool can connect the portable standby starting device 100 to the vehicle load through the clamp 200, so that the portable standby starting device 100 can supply power to and ignite the vehicle load.

It can thus be seen that by implementing the standby starting tool for a vehicle described in the present embodiment, when the clamp 200 in the standby starting tool is connected to the vehicle load, the portable standby starting device 100 can detect whether the load is connected. When the load is connected to the circuit through the clamp 200, the portable standby starting device 100 can perform the ignition operation for the vehicle. Thus, it is time-saving and labor-saving to implement such embodiment.

In all of the above embodiments, "large" and "small" are relative, "more" and "less" are relative, "upper" and "lower" are relative. Expressions of such relative terms are not repeated in the embodiments of the present disclosure.

It should be understood that reference to "in the present embodiment", "in the embodiment of the present disclosure" or "as an optional embodiment" throughout the specification means that particular features, structures or characteristics relating to the embodiment are included in at least one embodiment of the present disclosure. Therefore, "in the present embodiment", "in the embodiment of the present disclosure" or "as an optional embodiment" appearing in various places throughout the specification does not necessarily refer to the same embodiment. Besides, these specific features, structures or characteristics may be incorporated in one or more embodiments in any suitable manner. It should also be understood by those skilled in the art that all the embodiments described in the specification belong to optional embodiments, and acts and modules involved are not necessarily required in the present disclosure.

In various embodiments of the present disclosure, it should be understood that the size of serial numbers in various processes in the above does not mean necessary order of execution, while the execution order of various processes should be determined by their functions and built-in logics, and should not constitute any limitation to the implementation processes of the embodiments of the present disclosure.

The above-mentioned are merely specific embodiments of the present disclosure, but the scope of protection of the present disclosure is not limited thereto. Any change or substitution that might easily occur to those skilled in the art within the technical scope disclosed in the present disclosure should fall within the scope of protection of the present disclosure. Therefore, the scope of protection of the present disclosure should be determined by the scope of protection of the claims.

INDUSTRIAL APPLICABILITY

The portable standby starting device and the standby starting tool for a vehicle provided in the embodiments of the present disclosure can solve the problem of how to conveniently ignite the automobiles, and meanwhile improve the ignition safety, and save the time and money wasted for calling for roadside assistance.

What is claimed is:

1. A portable standby starting device for a vehicle, comprising a battery circuit, a reverse connection short-circuit detecting circuit, and a vehicle starting circuit, wherein the battery circuit is coupled to the reverse-connection short-circuit detecting circuit and the vehicle starting circuit, and is configured to supply power to the reverse-connection short circuit detecting circuit and the vehicle starting circuit;

the reverse-connection short-circuit detecting circuit is coupled to the vehicle starting circuit, and is configured to detect whether the vehicle load is in a reverse-connection state or a short-circuit state, and control the vehicle starting circuit to be prohibited from outputting a vehicle starting current when the vehicle load is in the reverse-connection state or the short-circuit state;

when the vehicle load is in the reverse-connection state, no microprocessor is involved in controlling the vehicle starting circuit; and the battery circuit comprises a battery and a voltage regulating circuit;

the portable standby starting device for a vehicle further comprising a load access detecting circuit, wherein the load access detecting circuit is coupled to the vehicle starting circuit, and is configured to detect whether the vehicle starting circuit is connected to the vehicle load; and the load access detecting circuit, when detecting that the vehicle load is not connected, controls the vehicle starting circuit to be prohibited from outputting the vehicle starting current;

wherein the load access detecting circuit comprises a microprocessor, wherein the microprocessor is coupled to the vehicle starting circuit, and when the load access detecting circuit detects that the vehicle load is not connected, the microprocessor controls the vehicle starting circuit to be prohibited from outputting the vehicle starting current.

2. The portable standby starting device for a vehicle according to claim 1, wherein the reverse connection short-circuit detecting circuit comprises an operational amplifier, and the operational amplifier controls the vehicle starting circuit to be prohibited from outputting the vehicle starting current when the vehicle load is in the reverse-connection state or the short-circuit state.

3. The portable standby starting device for a vehicle according to claim 2, wherein the reverse connection short-circuit detecting circuit comprises a microprocessor, and the microprocessor is coupled to the vehicle starting circuit, wherein the microprocessor controls the vehicle starting circuit to be prohibited from outputting the vehicle starting current when the vehicle load is in the reverse-connection state or the short-circuit state.

4. The portable standby starting device for a vehicle according to claim 1, wherein the load access detecting circuit comprises an operational amplifier, and when the load access detecting circuit detects that the vehicle load is not connected, the operational amplifier controls the vehicle starting circuit to be prohibited from outputting the vehicle starting current.

5. The portable standby starting device for a vehicle according to claim 1, wherein the load access detecting circuit comprises a voltage type load detecting sub-circuit and/or a resistance type load detecting sub-circuit.

6. The portable standby starting device for a vehicle according to claim 1, further comprising a battery voltage detecting circuit, wherein the battery voltage detecting circuit is configured to detect whether the battery is in a high-voltage state or a low-voltage state, and control the vehicle starting circuit to be prohibited from outputting the vehicle starting current when the battery is in the high-voltage state or the low-voltage state.

7. The portable standby starting device for a vehicle according to claim 6, wherein the battery voltage detecting circuit comprises a microprocessor, wherein the microprocessor is coupled to the vehicle starting circuit, and when the battery is in the high-voltage state or the low-voltage state, the microprocessor controls the vehicle starting circuit to be prohibited from outputting the vehicle starting current.

8. The portable standby starting device for a vehicle according to claim 1, wherein the vehicle starting circuit comprises a first switch device and a switch drive device, the first switch device is electrically connected to the battery circuit and the vehicle load, and the switch drive device is electrically connected to the first switch device and is configured to control connection and disconnection of the first switch device.

9. The portable standby starting device for a vehicle according to claim 1, further comprising a microprocessor and a voltage-stabilized power supply, wherein the voltage-stabilized power supply outputs a stable voltage to the microprocessor.

10. The portable standby starting device for a vehicle according to claim 1, further comprising a load voltage detecting circuit, wherein the load voltage detecting circuit is coupled to the vehicle starting circuit, and is configured to detect whether the vehicle load is in a high voltage state or a low-voltage state, and control the vehicle starting circuit to be prohibited from outputting the vehicle starting current when the vehicle load is in the high-voltage state or the low-voltage state.

11. The portable standby starting device for a vehicle according to claim 10, wherein the load voltage detecting circuit comprises a microprocessor, wherein the microprocessor is coupled to the vehicle starting circuit, and when the vehicle load is in the high-voltage state or the low-voltage state, the microprocessor controls the vehicle starting circuit to be prohibited from outputting the vehicle starting current.

12. The portable standby starting device for a vehicle according to claim 1, wherein the portable standby starting device further comprises a reverse-charge detecting circuit, wherein the reverse-charge detecting circuit is coupled to the vehicle starting circuit, and is configured to detect whether a voltage of the vehicle load is higher than an output voltage of the battery circuit or not, and control the vehicle starting circuit to be prohibited from outputting the vehicle starting current when the voltage of the vehicle load is higher than the output voltage of the battery circuit.

13. The portable standby starting device for a vehicle according to claim 12, wherein the reverse-charge detecting circuit comprises a microprocessor, wherein the microprocessor is coupled to the vehicle starting circuit, and when the voltage of the vehicle load is higher than the output voltage of the battery circuit, the microprocessor controls the vehicle starting circuit to be prohibited from outputting the vehicle starting current.

14. The portable standby starting device for a vehicle according to claim 1, wherein the vehicle starting circuit is started or disconnected in a delayed way.

15. The portable standby starting device for a vehicle according to claim 1, further comprising a voltage bias switch circuit for reducing power consumption.

16. A standby starting tool for a vehicle, comprising a clamp and the portable standby starting device for a vehicle according to claim 1, wherein the clamp is connected to the portable standby starting device, and is configured to connect the portable standby starting device and a vehicle load of the vehicle.

17. The standby starting tool according to claim 16, wherein in the portable standby starting device for a vehicle, the battery circuit is provided in a first housing, and other circuits are provided in a second housing.

18. The standby starting tool according to claim 17, wherein the second housing is provided thereon with a clamp connection port, and the clamp is connected to the portable standby starting device for a vehicle through the clamp connection port.

* * * * *